US012748510B2

(12) United States Patent
Kim et al.

(10) Patent No.: US 12,748,510 B2
(45) Date of Patent: Sep. 29, 2026

(54) TOUCH INPUT DEVICE WITH SHIELDING SHEET AND CONDUCTIVE LAYER THAT RECOGNIZE PRECISE STYLUS TOUCH

(71) Applicant: HIDEEP INC., Seongnam-si (KR)

(72) Inventors: Seyeob Kim, Seongnam-si (KR); Ho Jun Moon, Seongnam-si (KR); Bonkee Kim, Seongnam-si (KR)

(73) Assignee: HIDEEP INC. (KR)

( * ) Notice: Subject to any disclaimer, the term of this patent is extended or adjusted under 35 U.S.C. 154(b) by 0 days.

(21) Appl. No.: 18/875,124

(22) PCT Filed: Jun. 12, 2023

(86) PCT No.: PCT/KR2023/008053
§ 371 (c)(1),
(2) Date: Dec. 14, 2024

(87) PCT Pub. No.: WO2023/243965
PCT Pub. Date: Dec. 21, 2023

(65) Prior Publication Data

US 2025/0370566 A1 Dec. 4, 2025

(30) Foreign Application Priority Data

Jun. 16, 2022 (KR) ........................ 10-2022-0073662
Jun. 20, 2022 (KR) ........................ 10-2022-0075177
Dec. 14, 2022 (KR) ........................ 10-2022-0175211

(51) Int. Cl.
*G06F 3/041* (2006.01)
*G06F 3/0354* (2013.01)
(Continued)

(52) U.S. Cl.
CPC ........ *G06F 3/0418* (2013.01); *G06F 3/03545* (2013.01); *G06F 3/0446* (2019.05); (Continued)

(58) Field of Classification Search
CPC .. G06F 3/0418; G06F 3/03545; G06F 3/0446; G06F 3/0442; G06F 3/046; G06F 2203/04107
See application file for complete search history.

(56) References Cited

U.S. PATENT DOCUMENTS 12,379,794 B2 * 8/2025 Kremin ................ G06F 1/3215
2014/0267951 A1 9/2014 Lee et al.
(Continued)

FOREIGN PATENT DOCUMENTS

JP 2005142551 A1 * 6/2005
JP 2018537840 A 12/2018
(Continued)

OTHER PUBLICATIONS

Japanese Office Action 2024-569183, Issued Jul. 22, 2025.
International Search Report of PCT/KR2023/008053, Issued Sep. 7, 2023.

*Primary Examiner* — Liliana Cerullo
(74) *Attorney, Agent, or Firm* — The Belles Group, P.C.

(57) ABSTRACT

A touch input device according to an embodiment of the present invention drives a stylus pen including a resonance circuit unit and senses a pen signal from the stylus pen, and comprises: a cover layer; a sensor unit which is arranged below the cover layer, and which includes at least one pattern for driving the stylus pen and sensing the pen signal; a display unit arranged below the sensor unit; and a shielding unit arranged below the display unit, wherein the shielding unit has a permeability and a thickness that allows the change rate of an inductance value of the resonance circuit unit to be −10% to +10% of a reference inductance value.

8 Claims, 26 Drawing Sheets

(51) Int. Cl.
*G06F 3/044* (2006.01)
*G06F 3/046* (2006.01)

(52) U.S. Cl.
CPC ............ *G06F 3/0442* (2019.05); *G06F 3/046* (2013.01); *G06F 2203/04107* (2013.01)

(56) References Cited

U.S. PATENT DOCUMENTS

| | | | | |
|---|---|---|---|---|
| 2017/0185173 | A1* | 6/2017 | Ito | G06F 3/041 |
| 2023/0036968 | A1* | 2/2023 | Park | G06F 1/1643 |
| 2023/0067179 | A1* | 3/2023 | Kim | G06F 3/046 |

FOREIGN PATENT DOCUMENTS

| | | | | |
|---|---|---|---|---|
| KR | 2014-0112800 | A | 9/2014 | |
| KR | 2016-0000803 | A | 1/2016 | |
| KR | 10-1808605 | B1 | 1/2018 | |
| KR | 2018-0052740 | A | 5/2018 | |
| KR | 2020-0097570 | A | 8/2020 | |
| KR | 2021-0150942 | A | 12/2021 | |
| WO | WO-2021150045 | A1 * | 7/2021 | G06F 1/1643 |
| WO | 2021246687 | A1 | 12/2021 | |

* cited by examiner

TOUCH INPUT DEVICE WITH SHIELDING SHEET AND CONDUCTIVE LAYER THAT RECOGNIZE PRECISE STYLUS TOUCH

CROSS-REFERENCE TO RELATED APPLICATIONS

This U.S. Non-Provisional Patent Application is a U.S. National Stage Application under 35 U.S.C. § 371 of Patent Cooperation Treaty (PCT) Application No. PCT/KR2023/008053, filed Jun. 12, 2023, which claims priority to Korean Patent Application No. 10-2022-0073662, filed on Jun. 16, 2022, Korean Patent Application No. 10-2022-0075177, filed on Jun. 20, 2022, and Korean Patent Application No. 10-2022-0175211, filed on Dec. 14, 2022, the entire disclosures of all of which are hereby incorporated by reference herein, for all purposes.

TECHNICAL FIELD

The present disclosure relates to a touch input device, and more particularly, to a touch input device capable of interacting with a stylus pen, minimizing attenuation of a pen signal received from the stylus pen, and minimizing a variation of an inductance value of a resonance circuit unit of the stylus pen caused by an approaching or tilting motion of the stylus pen.

BACKGROUND ART

A touch sensor is provided in various touch input devices such as mobile phones, smart phones, laptop computers, digital broadcasting terminals, personal digital assistants (PDA), portable multimedia players (PMP), navigation units, slate PCs, tablet PCs, ultrabooks, and wearable devices.

The touch sensor in the touch input device may be disposed on a display panel that displays an image or a portion of the touch input device. As a user touches a touch sensor to interact with the touch input device, the touch input device may provide an intuitive user interface to the user.

The user may use a stylus pen for a precise touch input. The stylus pen may be classified into an active stylus pen and a passive stylus pen depending on whether the stylus pen includes a battery and an electronic component therein.

Although the active stylus pen has an advantage of having an excellent basic performance and providing additional functions (pen pressure, hovering, and buttons) in comparison with the passive stylus pen, the active stylus pen has a disadvantage in that most of users substantially do not use the active stylus pen except for some advanced users because the active stylus pen is expensive and uses a rechargeable battery as power.

Although the passive stylus pen has an advantage in that the passive stylus pen is inexpensive and does not require a battery in comparison with the active stylus pen, the passive stylus pen has a disadvantage in that the passive stylus pen is difficult to recognize a precise touch in comparison with the active stylus pen. In recent years, however, technologies of an electro magnetic resonance (EMR) method that is an inductive resonance method and a capacitive resonance method are proposed to realize a passive stylus pen capable of recognizing a precise touch.

DISCLOSURE OF THE INVENTION

Technical Problem

The present invention provides a touch input device capable of minimizing attenuation of a pen signal received from a stylus pen and minimizing a change in inductance value of a resonance circuit unit of the stylus pen caused by an approaching or tilting motion of the stylus pen.

The present invention also provides a touch input device capable of clearly distinguishing an approaching or tilting motion of a stylus pen from a pen-pressure motion of the stylus pen.

The present invention also provides a touch input device capable of improving an amplitude of a pen signal emitted from a stylus pen while maintaining a change rate in inductance value of the resonance circuit unit.

Technical Solution

An embodiment of the present invention provide a touch input device that drives a stylus pen including a resonance circuit unit and senses a pen signal from the stylus pen, the touch input device including: a cover layer; a sensor unit disposed below the cover layer and including at least one pattern for driving the stylus pen and sensing the pen signal: a display unit disposed below the sensor unit; and a shielding unit disposed below the display unit, in which the shielding unit has a permeability and a thickness, which allow a change rate of an inductance value of the resonant circuit unit to be −10% to +10% of a reference inductance value.

Here, the shielding unit may have a permeability of 10 or more to 300 or less.

Here, the shielding unit may have a thickness of 10 μm or more to 300 μm or less.

Here, the shielding unit may include a magnetic shielding sheet and a conductive layer disposed below the magnetic shielding sheet, in which an amount of increase in inductance value of the resonant circuit unit caused by the magnetic shielding sheet and an amount of decrease in inductance value of the resonant circuit unit caused by the conductive layer may be equal to each other, or a sum of the amount of increase and the amount of decrease may be −10% to +10% of the reference inductance value.

Here, the inductance value of the resonance circuit unit when the stylus pen is moved upward to a predetermined height from a touch surface of the touch input device may be −10% to +10% of an inductance value of the resonance circuit unit when the stylus pen is disposed on the touch surface.

Here, an inductance value of the resonance circuit unit when the stylus pen is disposed perpendicular to a touch surface of the touch input device and then tilted at a predetermined angle may be −10% to +10% of an inductance value when the stylus pen is disposed perpendicular to the touch surface.

Here, the shielding unit may include a magnetic shielding sheet and a conductive layer disposed below the magnetic shielding sheet, and the conductive layer may include at least one slit.

Here, the slit may have a shape extending from one edge of the conductive layer in an inward direction of the conductive layer.

Here, the slit may have a shape of a dotted line in a horizontal and/or vertical direction of the conductive layer.

In another embodiment of the present invention, a touch input device that drives a stylus pen including a resonance circuit unit and senses a pen signal from the stylus pen includes: a cover layer; a sensor unit disposed below the cover layer and including at least one pattern for driving the stylus pen and sensing the pen signal: a display unit disposed below the sensor unit: a magnetic shielding sheet disposed below the display unit; and a conductive layer disposed below the magnetic shielding sheet, in which the conductive layer includes at least one slit.

Here, the slit may have a shape extending from one edge of the conductive layer in an inward direction of the conductive layer.

Here, the slit may have a shape of a dotted line in a horizontal and/or vertical direction of the conductive layer.

Here, the touch input device may further include a conductive frame disposed below the conductive layer, in which the frame may have an opening corresponding to at least a portion of the slit of the conductive layer.

Here, the frame may include a non-conductive filling member disposed in the opening of the frame.

Advantageous Effects

The touch input device according to the embodiment of the present invention may minimize the attenuation of the pen signal received from the stylus pen and minimize the change in inductance value of the resonance circuit unit of the stylus pen caused by the approaching or tilting motion of the stylus pen.

Also, the touch input device may clearly distinguish the approaching or tilting motion of the stylus pen from the pen-pressure motion of the stylus pen.

Also, the touch input device may improve the amplitude of the pen signal emitted from the stylus pen while maintaining the change rate in inductance value of the resonance circuit unit.

The additional scope of the applicability of the present disclosure will become apparent from the following detailed description. However, since various changes and modifications within the scope of the present disclosure can be clearly understood by those skilled in the art, specific embodiments such as the detailed description and preferred embodiments of the present disclosure should be understood as being provided as examples.

BRIEF DESCRIPTION OF THE DRAWINGS

FIG. 40 is a view for explaining a first modified example of a fifth pattern 105 in

FIG. 33.

MODE FOR CARRYING OUT THE INVENTION

Figure 1:
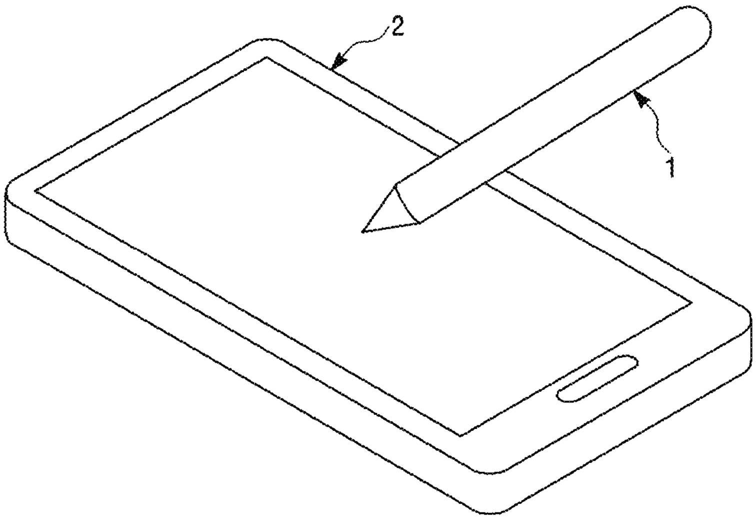
FIG. 1 is a conceptual view illustrating a stylus pen and a touch input device.

Hereinafter, the present invention will be described with reference to the accompanying drawings showing various embodiments of embodiment. The present invention may, however, be embodied in different forms and should not be construed as limited to the embodiments set forth herein. Rather, the present invention covers various modifications, equivalents, and/or alternatives of the embodiments of the invention. When the drawings are described, like reference numerals refer to like elements throughout.

Also, it will be understood that the embodiments disclosed in this specification includes some variations without limitations to the shapes as illustrated in the figures. In the drawings, the thicknesses of layers and regions are exaggerated for clarity of illustration. Also, in the drawings, the thickness of some layers and regions are exaggerated for convenience of description.

In the specification, it will be understood that when a layer (or film), a region, or a plate is referred to as being 'on' another layer, region, or plate, it can be directly on the other layer, region, or plate, or intervening layers, regions, or plates may also be present. On the other hand, it will also be understood that when a layer, a film, an area or a plate is referred to as being "directly on" another one, intervening layers, films, areas, and plates may not be present. Further, in the specification, the term "on" or "above" represents a feature of being disposed on or below the object, and does not represent a feature of being disposed "on" or "above" the object based on a gravitational direction.

In this specification, expressions such as "have", "may have", "includes", or "may include" refer to the presence of a corresponding characteristic (e.g., a numerical value, function, operation, or component such as a part), and does not exclude the presence of additional features.

In this specification, expressions such as "A or B", "at least one of A or/and B", or "one or more of A and/or B" may include all possible combinations of the items listed together. For example, the expressions "A or B", "at least one of A and B", or "at least one of A or B" may refer to all of (1) including at least one A, (2) including at least one B, or (3) a case of including both at least one A and at least one B.

In this specification, expressions such as "first" or "second" used herein may modify various components regardless of order and/or importance and be used only to distinguish one component from another component instead of limiting the corresponding component. For example, a first user device and a second user device may represent different user devices regardless of order or importance. For example, a first component referred to as a first component in one embodiment can be referred to as a second component in another embodiment without departing from the scope of the appended claims, and similarly, the second component may also be renamed as the first component.

When a component (e.g., a first component) is (operatively or communicatively) "coupled or connected with/to" another component (e.g., a second component), it should be understood that one component may be connected to another component in a direct way or through another component (e.g., a third component). When a component (e.g., a first component) is directly "coupled or connected with/to" another component (e.g., a second component), it may be understood that no other component (e.g., a third component) exists between one component and another component.

In this specification, the expression "configured to (or set to)" may be used interchangeably with, e.g., "suitable for", "having the capacity to", "designed to", "adapted to", "made to", or "capable of" depends on situations. The term "configured to (or set to)" may not necessarily refer to only "specifically designed to" in terms of hardware. Instead, in some circumstances, the expression "a device configured to~" may indicate that the device is "capable of~" with other devices or components. For example, the phrase "a processor configured to (or set to) perform A, B, and C" may indicate a generic-purpose processor (e.g., a CPU or an application processor) capable of performing corresponding operations by executing one or more software programs stored in a dedicated processor (e.g., an embedded processor) or memory device for performing the corresponding operation.

Terms used herein may be used only to describe specific embodiments, and may not be intended to limit the scope of other embodiments. The terms of a singular form may include plural forms unless referred to the contrary. Terms used herein, including technical or scientific terms, may have the same meanings as commonly understood by a person skilled in the art described in this document. Among the terms used in this specification, terms defined in a general dictionary may be interpreted as having the same or similar meaning as the meaning in the context of the related art, and unless explicitly defined in this specification, it should not be construed in an ideal or overly formal sense. In some cases, even terms defined in this document may not be construed to exclude embodiments of this document.

A touch input device according to various embodiments of the present document may include at least one of, e.g., a smartphone, a tablet personal computer (PC), a mobile phone, a video phone, an e-book reader, a laptop personal computer (PC), a netbook computer, a mobile medical device, a camera, or a wearable device. According to various embodiments, the wearable device may include at least one of an accessory (e.g., a watch, a ring, a bracelet, an anklet, a necklace, glasses, contact lenses, or a head-mounted-device (HMD)), a fabric or integrated garment (e.g., electronic clothing), a body attachable (e.g., a skin pad or tattoo), and a bio-implantable (e.g., an implantable circuit).

Hereinafter, a touch input device according to embodiments will be described with reference to the accompanying drawings.

FIG. 1 is a conceptual view illustrating a pen and touch input system including a stylus pen and a touch input device.

Referring to FIG. 1, a stylus pen 1 may receive a first signal generated by a touch input device 2 and transmit a second signal to the touch input device 2. Here, the second signal may be referred to as a pen signal.

Figure 2:
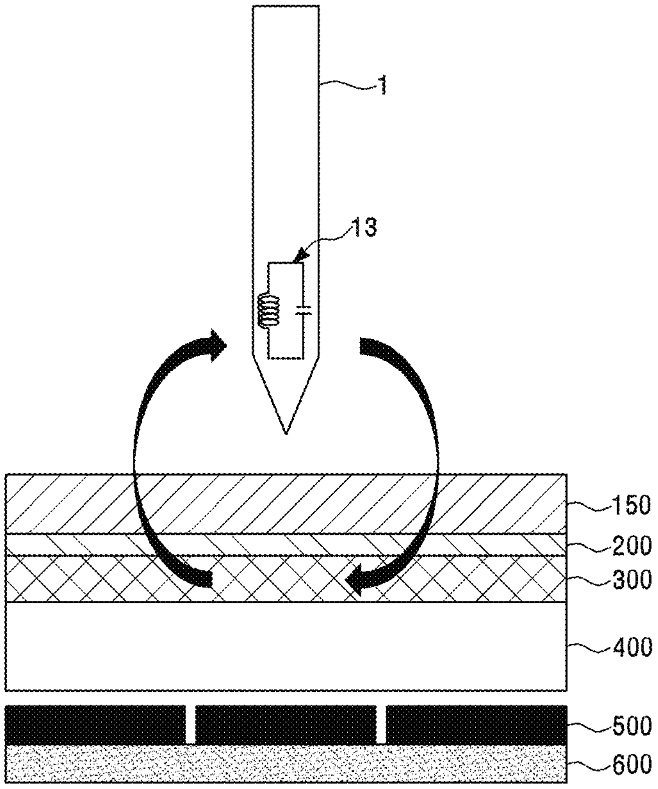
FIG. 2 is a cross-sectional view illustrating a portion of a touch input device according to an embodiment of the present invention.
Figure 3:
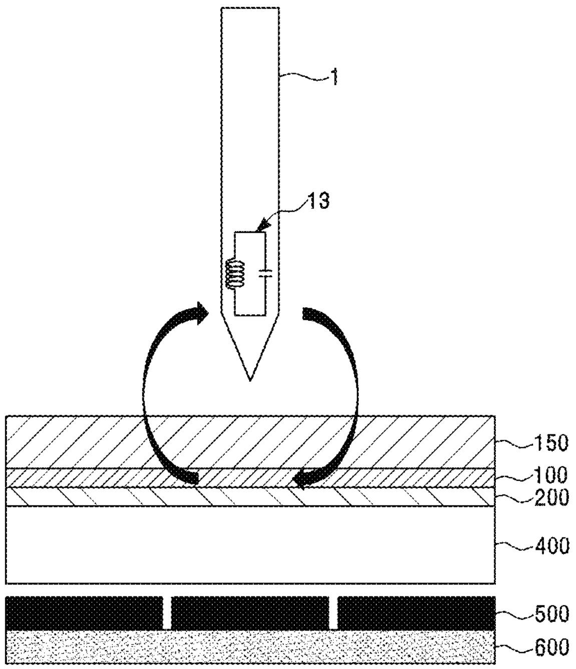
FIG. 3 is a cross-sectional view illustrating a portion of a touch input device according to another embodiment of the present invention.

As illustrated in FIGS. 2 and 3, the stylus pen 1 includes a resonance circuit unit 13. The resonance circuit unit 13 may resonate in response to the first signal from the touch input device 2. The resonance circuit unit 13 includes an inductor part having a predetermined inductance value and a capacitor part connected with the inductor part and having a predetermined capacitance value. This resonance circuit unit 13 may include an LC resonance circuit.

The inductor part may include a core and at least one coil. For example, the core may be a ferrite core. The coil may surround the core. An inductance of the inductor part is proportional to a permeability u, a cross-sectional area S of a coil 131*b*, and a square of the number of winding N of the coil, and inversely proportional to a length 1 of the coil as in $L=\mu SN^2/l$. The capacitor part may include a plurality of capacitors connected in series and/or parallel. Each capacitor may have a different capacitance and be trimmed during a manufacturing process.

The stylus pen 1 may further include a tip and a housing that accommodates the tip and the resonance circuit unit. Although a portion of the tip may be exposed through an opening defined in the housing, the embodiment of the present invention is not limited thereto. For example, the tip may provide visual effects of a touch position of the stylus pen 1 to a user.

The housing may accommodate elements of the stylus pen 1 in an inner empty space thereof. Although the housing may have a cylindrical shape, a polygonal column shape, a column shape in which at least a portion is curved, an entasis shape, a frustum of pyramid shape, and a circular truncated cone shape, the embodiment of the present invention is not limited thereto.

For example, the housing may accommodate the tip and the resonance circuit unit 13 in the inner empty space. Also, the housing may accommodate a portion of the tip in the inner empty space. Although the rest of the tip may be exposed to the outside of the housing, the embodiment of the present invention is not limited thereto.

The touch input device 2 may include at least one of a portable communication device (e.g., a smartphone and a tablet PC), a computer device, a portable multimedia device, a portable medical device, a wearable device, or a household appliance. Also, the touch input device 2 may be a flexible device or a flexible display device.

The touch input device 2 generates a first signal for driving the stylus pen 1 and sense a second signal (or pen signal) emitted from the stylus pen 1. The touch input device 2 may sense or detect a position of the stylus pen 1 by sensing the second signal.

The first signal may include a signal (e.g., a sine wave, a square wave, etc.) having a frequency corresponding to a resonance frequency of the resonance circuit unit 13. The resonance frequency is determined based on a design value of the resonance circuit unit of the stylus pen 1. The resonance frequency of the resonance circuit unit and the frequency of the first signal of the touch input device 2 are required to be identical or similar to each other for resonance. The second signal is generated through the resonance of the resonance circuit unit 13.

Embodiments of the touch input device 2 will be described in more detail with reference to FIGS. 2 and 3.

FIG. 2 is a cross-sectional view illustrating a portion of the touch input device according to an embodiment of the present invention.

Referring to FIG. 2, the touch input device according to an embodiment of the present invention includes a cover layer 150, a display unit 200, a digitizer 300, and a shielding unit 400. Here, the touch input device may further include at least one electronic component 500 disposed below the shielding unit 400 and a substrate 600 on which the electronic component 500 is mounted.

The cover layer 150 may be disposed on the display unit 200 and made of a transparent material. The tip of the stylus pen 1 may direct contact a top surface of the cover layer 150.

The display unit 200 is disposed below the cover layer 150 to provide predetermined visual information according to control of a control unit in the touch input device. For example, the display unit 200 may be an LCD module or an OLED module.

Although not shown in the drawings, a touch sensor capable of sensing a position of an object such as a finger may be disposed between the cover layer 150 and the display unit 200 or in the display unit 200. Although the touch sensor may be a capacitive touch sensor, the embodiment of the present invention is not limited thereto. For example, the touch sensor may include various types of touch sensors such as resistive touch sensors.

The digitizer 300 is disposed below the display unit 200. The digitizer 300 may emit the first signal for resonating the resonance circuit unit 13 of the stylus pen 1 according to the control of the control unit and receive the second signal from the stylus pen 1.

The shielding unit 400 may block a magnetic field so that the electronic components 500 are not affected by the magnetic field. Also, the shielding unit 400 may diffuse heat emitted from the electronic components 500 and block electromagnetic interference (EMI) from the electronic components 500.

The electronic components 500 may include a battery, a processor, a sensor, and a digital or analog circuit for performing an operation or specific function of the touch input device.

FIG. 3 is a cross-sectional view illustrating a portion of a touch input device according to another embodiment of the present invention.

Referring to FIG. 3, the touch input device according to another embodiment of the present invention includes a cover layer 150, a sensor unit 100, a display unit 200, and a shielding unit 400. Here, the touch input device may further include at least one electronic component 500 disposed below the shielding unit 400 and a substrate 600 on which the electronic component 500 is mounted.

Since the cover layer 150, the display unit 200, and the shielding unit 400 are the same as those in FIG. 2, a detailed description thereof will be replaced with the previous explanation.

The sensor unit 100 is disposed between the cover layer 150 and the display unit 200. The sensor unit 100 may detect a position of an object such as a finger, generate a first signal (or pen driving signal) to resonate the resonance circuit unit 13 of the stylus pen 1, and receive a second signal (or pen signal) emitted from the stylus pen 1. The sensor unit 100 capable of performing various functions is described in detail in FIGS. 16 to 45.

Although not shown separately in the drawings, the touch input device may further include a control unit (not shown) for controlling an operation of the sensor unit 100, and the control unit (not shown) may be electrically connected to the sensor unit 100 and disposed in the touch input device. The control unit (not shown) may be realized as an integrated circuit (IC). Here, the control unit (not shown) may also perform a function of controlling the display unit 200 and a function of controlling the electronic component 500 in the touch input device.

Referring to FIGS. 2 and 3, the touch input device according to embodiments of the present invention includes the shielding unit 400. Before explaining the shielding unit 400, a problem associated with a shielding structure used in a typical touch input device will be described.

Figure 4:
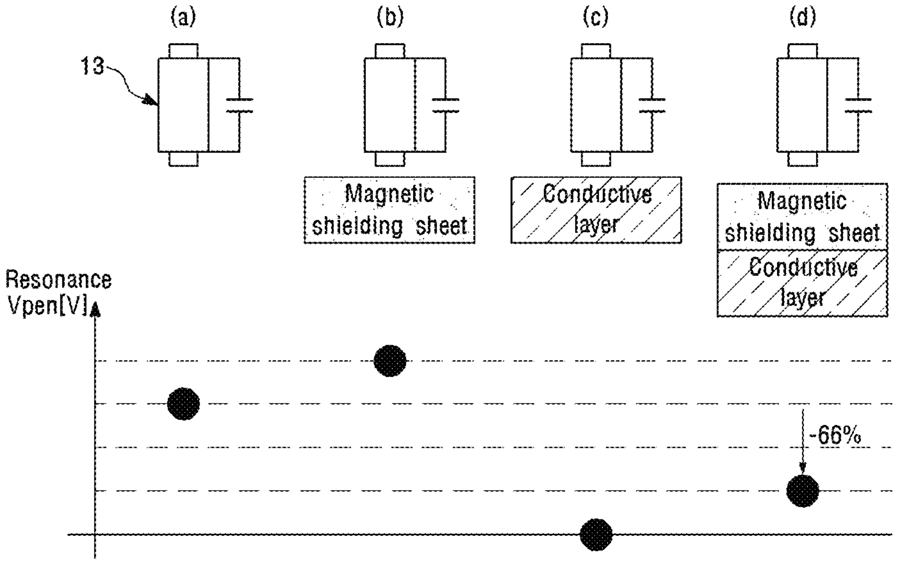
FIG. 4 is a view for explaining a problem in which an amplitude of a pen signal emitted from the stylus pen is reduced due to a shielding structure of a typical touch input device.

FIG. 4 is a view for explaining a problem in which an amplitude of a pen signal $V_{pen}$ received from the stylus pen is reduced due to the shielding structure of the typical touch input device.

The shielding structure of the typical touch input device includes a magnetic shielding sheet and a conductive layer. The magnetic shielding sheet is disposed on the conductive layer.

(a) of FIG. 4 shows an amplitude (amplitude of a reference pen signal) of the pen signal $V_{pen}$ emitted from the resonance circuit unit 13 of the stylus pen 1 when the shielding structure is not provided, (b) of FIG. 4 shows a relative amplitude of the pen signal $V_{pen}$ emitted from the resonance circuit unit 13 of the stylus pen 1 when only the magnetic shielding sheet is provided in the shielding structure of the typical touch input device, (c) of FIG. 4 shows a relative amplitude of the pen signal $V_{pen}$ emitted from the resonance circuit unit 13 of the stylus pen 1 when only the conductive layer is provided in the shielding structure of the typical touch input device, and (d) of FIG. 4 shows a relative amplitude of the pen signal $V_{pen}$ emitted from the resonance circuit unit 13 of the stylus pen 1 due to the shielding structure of the typical touch input device.

Referring to (b) of FIG. 4, when the shielding structure include only the magnetic shielding sheet, the pen signal $V_{pen}$ increases compared to a case ((a) of FIG. 4) without the shielding structure. This increase is generated as an inductance (L) value of the resonance circuit unit 13 increases by the magnetic shielding sheet, and accordingly, a Q value increases.

On the other hand, referring to (c) of FIG. 4, the pen signal ($V_{pen}$) is almost disappeared when the shielding structure includes only the conductive layer. This is because an eddy current occurs in the conductive layer.

Thus, as illustrated in (d) of FIG. 4, in the typical shielding structure including the magnetic shielding sheet and the conductive layer, the pen signal received from the stylus pen increases compared to when only the conductive layer is provided, but decreases compared to when no shielding structure is used. Also, in the typical shielding structure, the pen signal of the stylus pen is reduced by about ⅔ (66%) in comparison with the reference pen signal.

Referring to FIGS. 2 and 3 again, the shielding unit 400 of the touch input device according to the embodiments of the present invention may solve the problem caused by the shielding structure of typical touch input device, which is described in FIG. 4.

The shielding unit 400 of the touch input device according to the embodiments of the present invention illustrated in FIGS. 2 and 3 may minimize not only attenuation of the pen signal received from the stylus pen 1, but also a change of the inductance value of the resonance circuit unit 13 of the stylus pen 1 caused by an approaching or tilting motion of the stylus pen 1.

The shielding unit 400 has a permeability and a thickness, which allow the inductance value of the resonance circuit unit 13 of the stylus pen 1 is not substantially changed by the approaching or tilting motion of the stylus pen 1.

Specifically, the shielding unit 400 may have a predetermined permeability and thickness. Thus, the shielding unit 400 may minimize the attenuation of the pen signal $V_{pen}$ from the stylus pen 1.

Here, the permeability of the shielding unit 400 may be 10 or more to 300 or less. The shielding unit 400 may not be used when the permeability is greater than 300 because the change in the inductance value of the resonance circuit unit 13 is too large and may not exhibit a magnetic shielding effect when the permeability is less than 10.

The thickness of the shielding unit 400 may be ranged from 10 μm to 300 μm. When the thickness is less than 10 μm, the magnetic shielding effect may not be exhibited, and when the thickness is greater than 300 μm, a space in which the shielding unit 400 is disposed in the touch input device may not be secured.

The shielding unit 400 may have a permeability and thickness that allows a change rate of the inductance (L) value of the resonance circuit unit 13 of the stylus pen 1 within a range from −10% to +10%. Thus, the attenuation of the pen signal $V_{pen}$ from the stylus pen 1 may be minimized.

An example of the shielding unit 400 of the touch input device according to the embodiments of the present invention in FIGS. 2 and 3 will be described with reference to FIG. 5.

Figure 5:
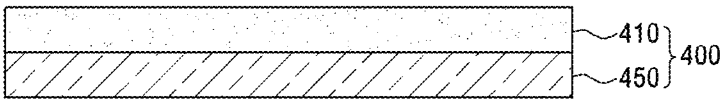
FIG. 5 is a cross-sectional view illustrating one example of a shielding unit 400 illustrated in FIGS. 2 and 3.

FIG. 5 is a cross-sectional view illustrating one example of the shielding unit 400 illustrated in FIGS. 2 and 3.

Referring to FIG. 5, the shielding unit 400 includes at least one magnetic shielding sheet 410 and a conductive layer 450 disposed below the magnetic shielding sheet 410. Alternatively, the shielding unit 400 may include a conductive layer 450 and at least one magnetic shielding sheet 410 disposed on the conductive layer 450.

The magnetic shielding sheet 410 blocks the magnetic field to prevent the electronic component 500 from being affected by the magnetic field generated by the digitizer 300 in FIG. 2 or the sensor unit 100 in FIG. 3.

The conductive layer 450 may be made of metal such as copper or aluminum or an alloy formed by adding another metal or non-metallic elements to at least one metal. The conductive layer 450 may be electrically grounded.

The shielding unit 400 including the magnetic shielding sheet 410 and conductive layer 450 illustrated in FIG. 5 may minimize the change in the inductance value of the resonance circuit unit 13 of the stylus pen 1 caused by the approaching motion and/or the tilting motion of the stylus pen 1. Here, the approaching motion may be a motion by which the user allows the stylus pen 1 to approach to the touch input device 2 in a hover state in which the stylus pen 1 and touch input device 2 are spaced a predetermined distance from each other. The tilting motion may be a motion by which the user allows the stylus pen 1 to be inclined at a predetermined angle above the touch input device 2.

The touch input device including the shielding unit 400 according to an embodiment of the present invention, which may minimize the change in the inductance value of the resonance circuit unit 13 of the stylus pen 1 caused by the approaching motion or tilting motion of the stylus pen 1, will be described in detail with reference to FIGS. 6A to 11B. Here, other components of the touch input device except for the shielding unit 400 in FIG. 2 or 3 are omitted in FIGS. 6A to 11B for convenience of description.

Figure 6A:
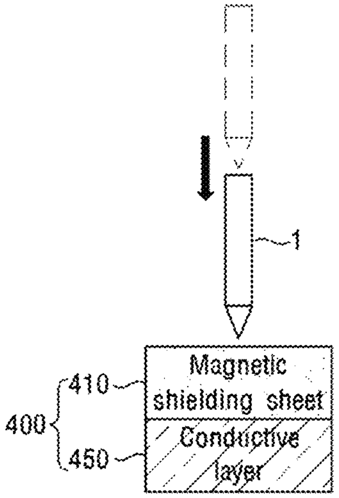
FIGS. 6A and 6B are a view for explaining a change in resonance frequency of a pen signal of the stylus pen caused by an approaching motion of the stylus pen 1 on the shielding unit 400 of the touch input device according to embodiments of the present invention.
Figure 6B:
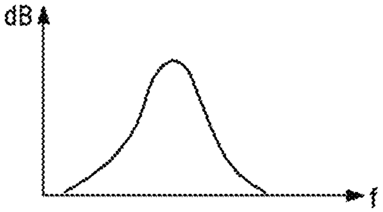
Figure 7A:
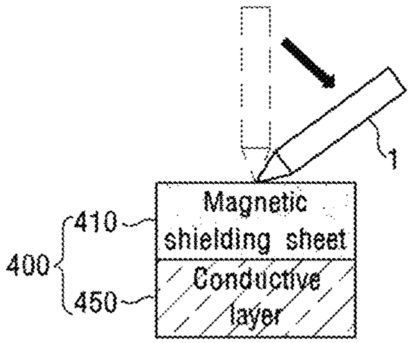
FIGS. 7A and 7B are a view for explaining a change in resonance frequency of the pen signal of the stylus pen caused by a tilting motion of the stylus pen 1 on the shielding unit 400 of the touch input device according to embodiments of the present invention.
Figure 7B:
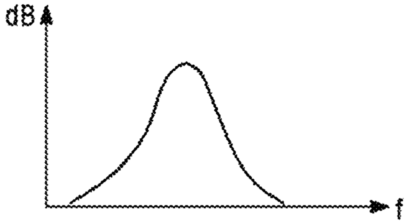

FIGS. 6A and 6B are a view for explaining a change in resonance frequency of the pen signal of the stylus pen caused by the approaching motion of the stylus pen 1 on the shielding unit 400 of the touch input device according to the embodiments of the present invention, and FIGS. 7A and 7B are a view for explaining a change in resonance frequency of the pen signal of the stylus pen caused by the tilting motion of the stylus pen 1 on the shielding unit 400 of the touch input device according to the embodiments of the present invention.

Referring to FIGS. 6A to 7B, when the stylus pen 1 performs the approaching motion or tilting motion on the touch input device including the shielding unit 400 of FIG. 2 or 3, the inductance value of the inductor part of the resonance circuit unit of the stylus pen 1 shows almost no substantial change, and accordingly, the resonance frequency of the resonance circuit unit of the stylus pen 1 is also not substantially changed. This is because the change in the inductance value of the resonance circuit unit of the stylus pen 1 caused by the magnetic shielding sheet 410 is cancelled by the change in the inductance value of the resonance circuit unit of the stylus pen 1 caused by the conductive layer 450. This will be described in detail with reference to FIGS. 8A to 11B.

Figure 8A:
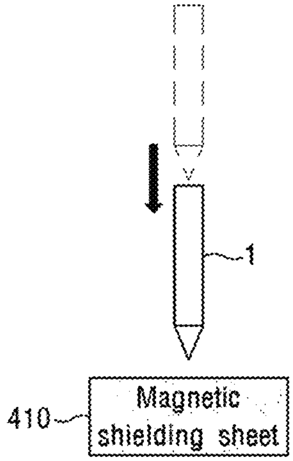
FIGS. 8A and 8B are a view for explaining a change in resonance frequency of the pen signal caused by the approaching motion of the stylus pen 1 on a magnetic shielding sheet 410 when only the magnetic shielding sheet 410 is present.
Figure 8B:
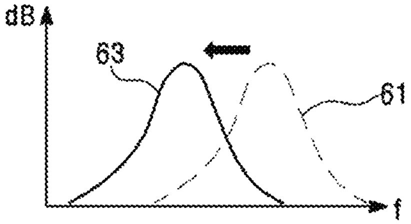
Figure 9A:
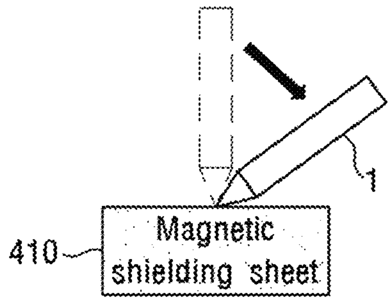
FIGS. 9A and 9B are a view for explaining a change in resonance frequency of the pen signal caused by the tilting motion of the stylus pen 1 on the magnetic shielding sheet 410.
Figure 9B:
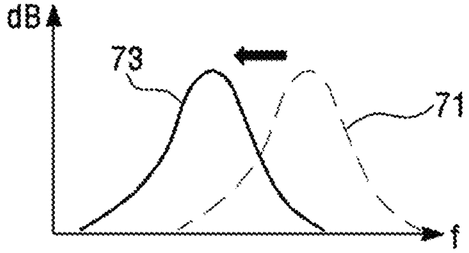

FIGS. 8A and 8B are a view illustrating the change in resonance frequency of the pen signal caused by the approaching motion of the stylus pen 1 on the magnetic shielding sheet 410 when only the magnetic shielding sheet 410 is present, and FIGS. 9A and 9B are a view illustrating the change in resonance frequency of the pen signal caused by the tilting motion of the stylus pen 1 on the magnetic shielding sheet 410.

Referring to FIGS. 8A to 9B, when the stylus pen 1 performs the approaching motion or tilting motion, as the inductance value of the inductor part of the resonance circuit unit of the stylus pen 1 increases, the resonance frequency of the resonance circuit unit of the stylus pen 1 decreases. When the resonance frequency of the pen signal of the stylus pen 1 is changed, phase shift and amplitude reduction may be changed.

As illustrated in FIGS. 8A to 9B, a principle of increase in the inductance value of the inductor part of the resonance circuit unit of the stylus pen 1 caused by the magnetic shielding sheet 410 is based on a following mathematical equation 1.

$$L = \frac{V}{di/dt} \quad \boxed{Emf = {}_{1}N\frac{\Delta\phi}{\Delta t}}$$ [Mathematical equation 1]

According to the mathematical equation 1, an inductance value is proportional to an electromotive force $V_{emf}$, and the electromotive force $V_{emf}$ is proportional to a change rate in magnetic flux Φ per time t. Thus, since the magnetic shielding sheet 410 collects the magnetic flux (i.e., increase in density), the change rate in magnetic flux increases by the magnetic shielding sheet 410, and thus, the inductance value increases.

Figure 10A:
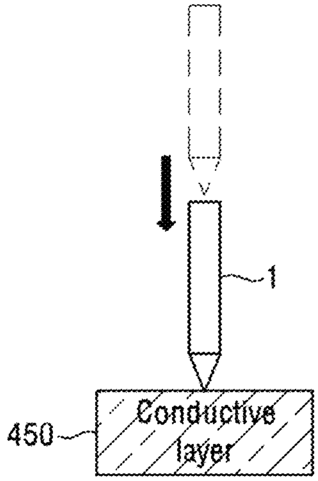
FIGS. 10A and 10B are a view for explaining a change in resonance frequency of the pen signal caused by the approaching motion of the stylus pen 1 on a conductive layer 450 when only the conductive layer 450 is present.
Figure 10B:
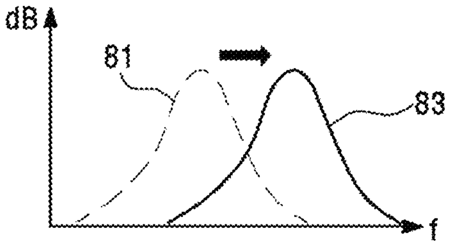
Figure 11A:
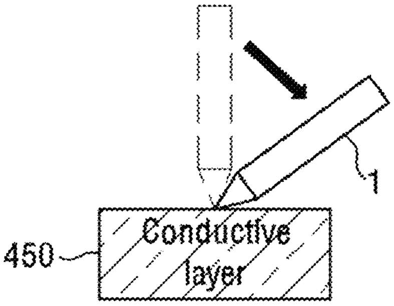
FIGS. 11A and 11B are a view for explaining a change in resonance frequency of the pen signal caused by the tilting motion of the stylus pen 1 on the conductive layer 450.
Figure 11B:
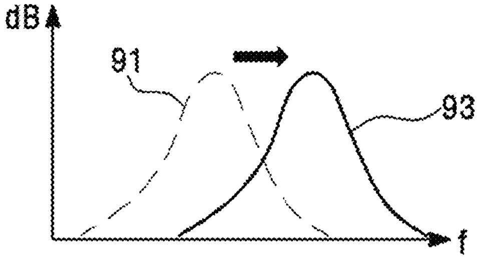

FIGS. 10A and 10B are a view for explaining a change in resonance frequency of the pen signal caused by the approaching motion of the stylus pen 1 on a conductive layer 450 when only the conductive layer 450 is present, and FIGS. 11A and 11B are a view for explaining a change in resonance frequency of the pen signal caused by the tilting motion of the stylus pen 1 on the conductive layer 450.

Referring to FIGS. 10A to 11B, when the stylus pen 1 performs the approaching or tilting motion, the inductance value of the inductor part of the resonance circuit unit of the stylus pen 1 decreases, and the resonance frequency of the resonance circuit unit of the stylus pen 1 increases. When the resonance frequency of the pen signal of the stylus pen 1 is changed, phase shift and amplitude reduction may be changed.

As illustrated in FIGS. 10A to 11B, a reason why the inductance value of the inductor part of the resonance circuit unit of the stylus pen 1 decreases by the conductive layer 450 is that the conductive layer 450 generates an eddy current that flows in a direction to block a change in the magnetic field to reduce a change in magnetic flux. That is, since the change in magnetic flux is reduced by the conductive layer 450, the inductance value decreases.

Referring to FIGS. 6A to 7B again, the shielding unit 400 according to an embodiment of the present invention includes the magnetic shielding sheet 410 and the conductive layer 450. An amount of increase in the inductance value of the resonance circuit unit of the stylus pen 1 by the magnetic shielding sheet 410 illustrated in FIGS. 8A to 9B and an amount of decrease in the inductance value of the resonance circuit unit of the stylus pen by the conductive layer 450 illustrated in FIGS. 10A to 11B are substantially equal to each other. Alternatively, a sum of the amount of increase and the amount of decrease is ranged from −10% to +10% of a reference inductance value. Here, the reference inductance value represents an inductance value when the resonance circuit unit of the stylus pen 1 is not affected by the shielding unit 400 at all.

Thus, the touch input device including the shielding unit 400 according to an embodiment of the present invention may minimize the change in the inductance value of the resonance circuit unit 13 of the stylus pen 1 according to the approaching motion and/or tilting motion of the stylus pen 1.

Since the touch input device including the shielding unit 400 according to an embodiment of the present invention may prevent the inductance value of the resonance circuit unit of the stylus pen from being changed by the approaching or tilting of the stylus pen, a phase shift of the pen signal received from the stylus pen may be clearly distinguished based on various factors.

For example, when the phase of the received pen signal is shifted in comparison with the resonance frequency, the touch input device according to an embodiment of the present invention may determine that the phase shift is caused by pressure applied to the stylus pen 1.

Thus, the touch input device including the shielding unit 400 according to an embodiment of the present invention may clearly distinguish that the phase shift in the frequency of the pen signal from the stylus pen 1 is generated by the pressure applied to the stylus pen 1 and also determined an amplitude of the pressure applied to the stylus pen 1 based on an amount of the phase shift.

Referring to FIGS. 6A to 7B again, the touch input device according to an embodiment of the present invention may further have following characteristics by including the shielding unit 400.

1) In FIGS. 6A and 6B, the touch input device has a characteristic in which the inductance (L) value of the resonance circuit unit 13 when the stylus pen 1 is moved upward by a predetermined height from a touch surface of the touch input device is ranged from −10% to +10% of the inductance (L) value of the resonance circuit unit 13 when the stylus pen 1 is disposed on the touch surface. Here, although the predetermined height may be 10 mm, the embodiment of the present invention is not limited thereto. For example, the predetermined height may be set to various heights.

Alternatively, in FIGS. 6A and 6B, the touch input device has a characteristic in which the inductance (L) value of the resonance circuit unit 13 when the stylus pen 1 is moved from the predetermined height to the touch surface is ranged from −10% to +10% of the inductance (L) value of the resonance circuit unit 13 when the stylus pen 1 is disposed at the predetermined height.

2) In FIGS. 7A and 7B, the touch input device has a characteristic in which the inductance (L) value of the resonance circuit unit 13 when the stylus pen 1 is tilted by a predetermined angle from a state in which the stylus pen 1 is disposed perpendicular to the touch surface of the touch input device is ranged from −10% to +10% of the inductance (L) value of the resonance circuit unit 13 when the stylus pen 1 is disposed perpendicular to the touch surface. Here, although the predetermined angle may be 60°, the embodiment of the present invention is not limited thereto. For example, the predetermined angle may be set to various angles.

Alternatively, in FIGS. 7A and 7B, the touch input device has a characteristic in which the inductance (L) value of the resonance circuit unit 13 when the stylus pen 1 is tilted from a state of being inclined by a predetermined angle to a state of being perpendicular to the touch surface is ranged from −10% to +10% based on the inductance (L) value of the resonance circuit unit 13 when the stylus pen 1 is tilted by the predetermined angle.

According to the characteristics of 1) or 2), there may be an advantage of minimizing the attenuation of the pen signal $V_{pen}$ from the stylus pen 1.

Figure 12A:
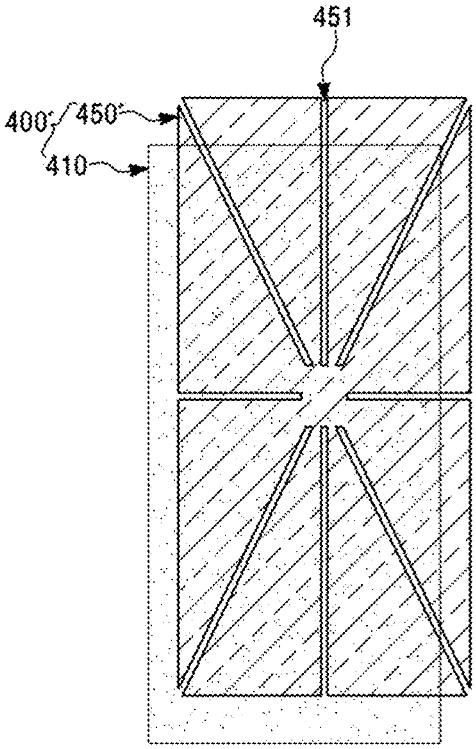
FIGS. 12A and 12B are views for explaining modified examples 400' and 400" of the shielding unit 400 in FIG. 2 or 3.
Figure 12B:
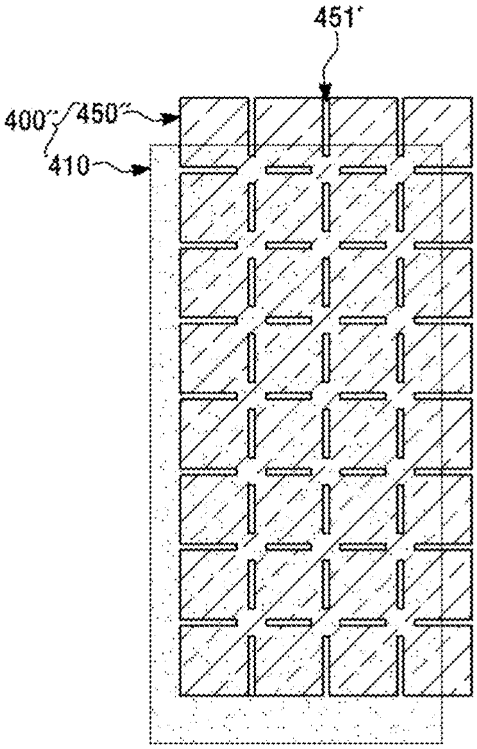

FIGS. 12A and 12B are views for explaining modified examples 400' and 400" of the shielding unit 400 in FIG. 2 or 3.

Referring to FIGS. 12A and 12B, the conductive layer 450' and 450" has at least one slit 451 and 451'.

In FIG. 12A, the slit 451 may have a shape extending from one edge of the conductive layer 450' in an inward direction of the conductive layer 450'. Alternatively, the slit 451 may be a narrow gap extending from each corner and/or each side of the conductive layer 450' in a direction toward a central portion of the conductive layer 450'.

In FIG. 12B, the slit 451' in the conductive layer 450" may have a shape of a plurality of dotted lines in rows and/or columns of the conductive layer 450".

The slits 451 and 451' shown in FIGS. 12A and 12B may reduce occurrence of an eddy current in the conductive layers 450' and 450" to exhibit an effect of improving an amplitude of the pen signal emitted from the stylus pen 1 in FIG. 1.

Thus, the touch input device including the shielding units 400' and 400" having the conductive layers 450' and 450" has an advantage of improving the amplitude of the pen signal received from the stylus pen while maintaining the inductance change rate of the resonance circuit unit 13 of the stylus pen 1 nearly constant.

Figure 13:
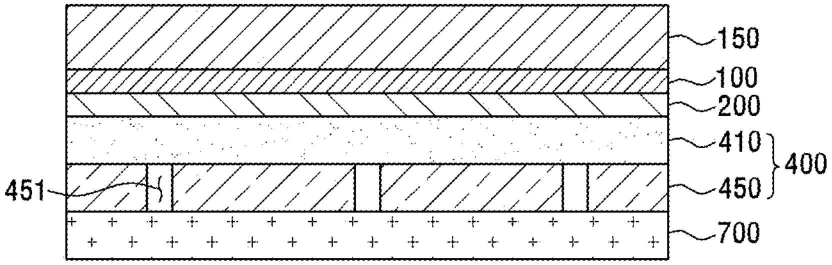
FIG. 13 is a cross-sectional view illustrating a touch input device that further includes the shielding units 400' and 400" in FIGS. 12A and 12B and a frame 700 disposed below the shielding units 400' and 400".

FIG. 13 is a cross-sectional view of a touch input device that further includes the shielding units 400' and 400" in FIGS. 12A and 12B and a frame 700 below the shielding units 400' and 400".

The shielding unit 400 in FIG. 13 includes a magnetic shielding sheet 410 and a conductive layer 450 disposed below the magnetic shielding sheet 410 and having the slit 451 in FIGS. 12A and 12B.

The frame 700 that is made of a conductive material may be disposed below the shielding unit 400' and 400". Although not shown in FIG. 13, the electronic component 500 and the substrate 600 illustrated in FIG. 3 may be disposed below the frame 700. The frame 700 may be referred to as a mid frame or SUS.

As described with reference to FIGS. 12A and 12B, when the conductive layer 450 has the slit 451, the pen signal of the stylus pen 1 may reduce the eddy current generated from the conductive layer 450 to improve the amplitude of the pen signal. However, in case of the touch input device in FIG. 13 may not obtain the effect of reducing the eddy current caused by the slit 451 because the frame 700 made of the conductive material is disposed below the conductive layer 450.

Thus, hereinafter, a structure capable of improving the amplitude of the pen signal received in the touch input device including the shielding layer and the frame disposed below the shielding layer will be described with reference to FIGS. 14 and 15.

Figure 14:
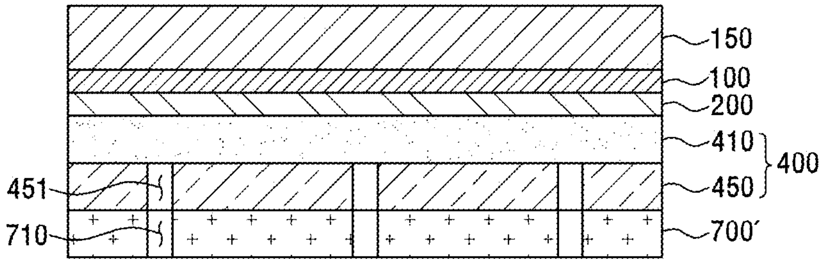
FIG. 14 is a cross-sectional view illustrating a touch input device according to another embodiment of the present invention.

FIG. 14 is a cross-sectional view illustrating a touch input device according to another embodiment of the present invention.

The touch input device illustrated in FIG. 14 is different from the touch input device in FIG. 13 in terms of a frame 700'.

The frame 700' of the touch input device in FIG. 14 has an opening 710 corresponding to at least a portion of the slit 451 of the conductive layer 450. Here, as illustrated in FIG. 14, the opening 710 may have the same size or shape as the slit 451 of the conductive layer 450. Although not shown in FIG. 14, the opening 710 may have a shape that vertically overlaps at least a portion of the slit 451 of the conductive layer 450 with a predetermined size.

As described above, the eddy current caused by the pen signal of the stylus pen may be reduced by forming, in the frame 700', the opening 710 corresponding to at least a portion of the slit 451 of the conductive layer 450, and thus the amplitude of the received pen signal may be improved.

Figure 15:
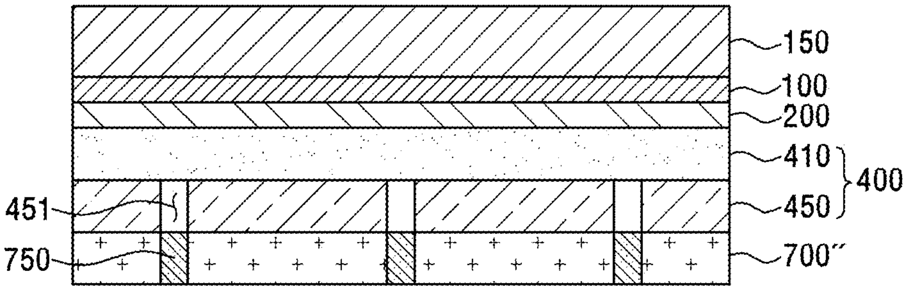
FIG. 15 is a cross-sectional view illustrating a touch input device according to another embodiment of the present invention.

FIG. 15 is a cross-sectional view illustrating a touch input device according to another embodiment of the present invention.

The touch input device illustrated in FIG. 15 is different from the touch input device in FIG. 14 in terms of a frame 700".

The frame 700" of the touch input device in FIG. 15 has an opening corresponding to at least a portion of the slit 451 of the conductive layer 450, and a non-conductive filling member 750 is disposed in the opening. Here, the non-conductive filling member 750 may be made of a resin material such as plastic.

The eddy current caused by the pen signal of the stylus pen may be reduced by providing the opening corresponding to at least a portion of the slit 451 of the conductive layer 450 in the frame 700" and the filling member 750 in the opening, and thus the amplitude of the received pen signal may be improved.

Hereinafter, various embodiments of the sensor unit 100 in FIG. 3 will be described with reference to the accompanying drawings.

Figure 16:
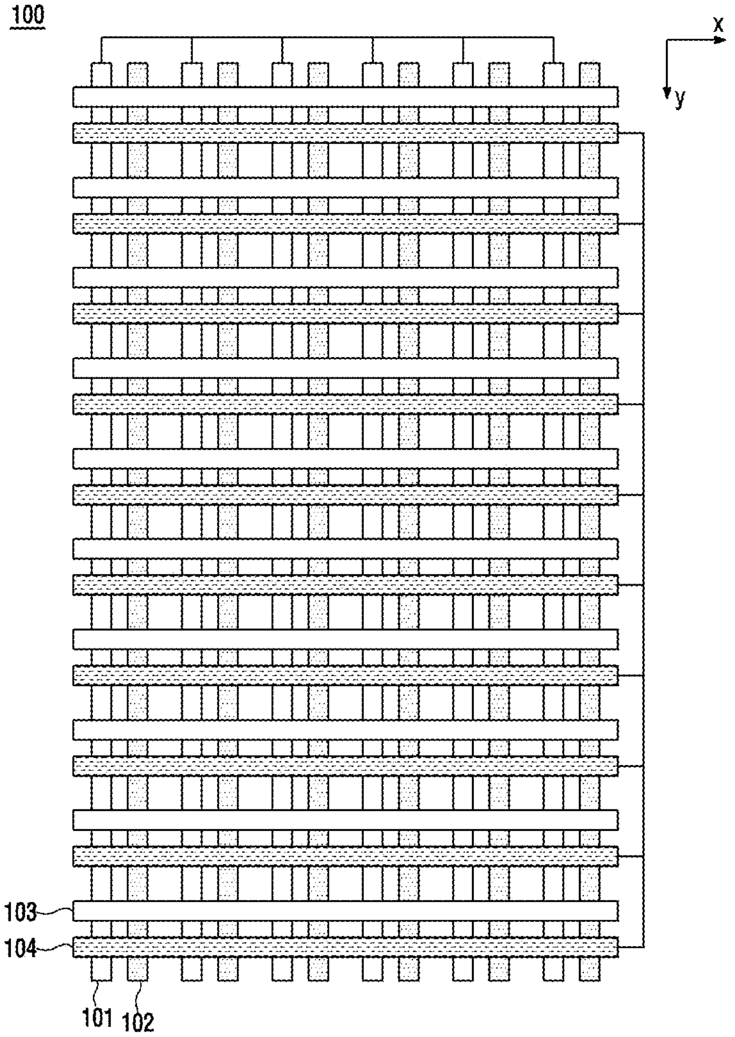
FIG. 16 is a schematic configuration view illustrating a sensor unit 100 of a touch input device according to a first embodiment of the present invention.

FIG. 16 is a schematic configuration view illustrating the sensor unit 100 in a touch input device according to a first embodiment of the present invention.

The touch input device according to the first embodiment of the present invention may be a portrait-type touch input device. In this portrait type touch input device, a width is smaller than a height, and a control unit (not shown) for controlling the sensor unit 100 may be disposed below the sensor unit 100. For example, the touch input device corresponds to a shape of a smartphone.

The sensor unit 100 may detect a position of an object such as a finger disposed on the screen, drive the stylus pen 1 in FIG. 1, and detect a position of the stylus pen on the screen by detecting a signal (stylus pen signal) emitted from the stylus pen.

The sensor unit 100 includes a plurality of patterns (or a plurality of electrodes).

The sensor unit 100 may include a plurality of first to fourth patterns 101, 102, 103, and 104.

Each of the first patterns 101 has a shape extending in an arbitrary first direction y. The first direction may be a direction of a major axis of the screen of the touch input device. The first pattern 101 may be also referred to as active TX (ATX). The first pattern 101 has a predetermined shape in which an electrical path is formed along the arbitrary first direction y.

Each of the second patterns 102 has a shape extending in the first direction y, is disposed adjacent to the first pattern 101, and is spaced a predetermined distance from the first pattern 101. The second pattern 102 may be also referred to as dummy TX (DTX). The second pattern 102 may be disposed adjacent to the first pattern 101 and have a predetermined shape in which an electrical path is formed along the arbitrary first direction y.

Each of the third patterns 103 has a shape extending in a second direction x different from the first direction. The second direction x may be a direction perpendicular to the first direction y, and may be a direction of a minor axis of the screen of the touch input device. The third pattern 103 may be also referred to as active RX (ARX). The third pattern 103 has a predetermined shape in which an electrical path is formed along the arbitrary second direction x.

Each of the fourth patterns 104 has a shape extending in the second direction x, is disposed adjacent to the third pattern 103, and is spaced a predetermined distance from the third pattern 103. The fourth pattern 104 may be also referred to as dummy RX (DRX). The fourth pattern 104 may be disposed adjacent to the first pattern 103 and have a predetermined shape in which an electrical path is formed along the arbitrary second direction x.

The third and fourth patterns 103 and 104 are disposed on the first and second patterns 101 and 102 and are spaced a predetermined distance from the first and second patterns 101 and 102. The sensor unit in which the first to fourth patterns are disposed on the same layer will be described in detail with reference to FIG. 27.

The plurality of first patterns 101 are arranged in the second direction x, and the plurality of second patterns 102 are also arranged in the second direction x. The plurality of third patterns 103 are arranged in the first direction y, and the plurality of fourth patterns 104 are also arranged in the first direction y.

Since the first pattern 101 extends in the first direction y, the third pattern 103 extends in the second direction x, and the first direction y is longer than the second direction x, the number of the plurality of first patterns 101 is less than the number of the plurality of third patterns 103. Thus, the number of channels of the plurality of first patterns 101 is less than that of channels of the plurality of third patterns 103.

Here, the number of the plurality of first patterns 101 and the number of the plurality of third patterns 103 may increase or decrease according to a size of the screen of the touch input device.

The number of the plurality of second patterns 102 may be equal to that of the plurality of first patterns 101 in a one-to-one correspondence manner. The other ends (or second ends) of the plurality of second patterns 102 are electrically connected to each other through a conductive pattern. Here, the conductive pattern may be a metal mesh or a silver trace.

Figure 17:
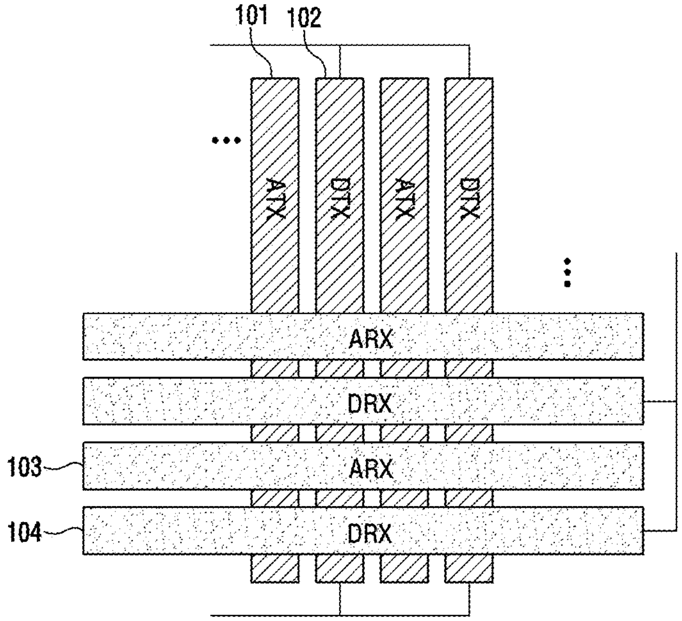
FIG. 17 is a schematic configuration view illustrating an example of the sensor unit 100 in FIG. 16.

One ends (or first ends) of the plurality of second patterns 102 may be electrically connected to a control unit (not shown). Here, as illustrated in FIG. 17, one ends of two or more second patterns 102 among the plurality of second patterns 102 may be electrically connected to each other through a conductive pattern. Due to this configuration, the number of channels of the plurality of second patterns 102 may be reduced to a half of the number of the channels of the plurality of first patterns 101. Here, two or more second patterns 102 among the plurality of second patterns 102 may be adjacent to each other.

Figure 18:
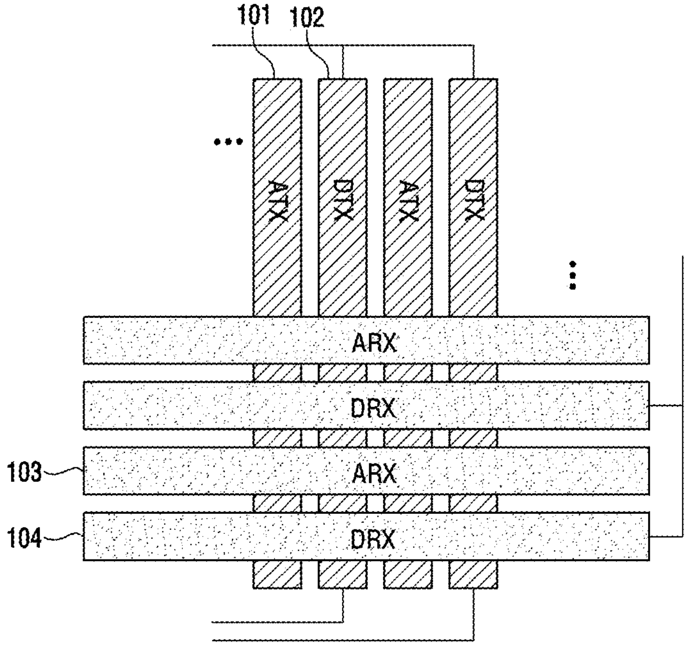
FIG. 18 is a schematic configuration view illustrating another example of the sensor unit 100 in FIG. 16.

As illustrated in FIG. 18, each of the one ends of the plurality of second patterns 102 may be individually connected to one conductive pattern.

Referring to FIG. 16 again, since the plurality of third patterns 103 are arranged in the first direction y, the number of the plurality of third patterns 103 is greater than that of the plurality of first patterns 101. Thus, the number of the channels of the plurality of third patterns 103 is greater than that of the channels of the plurality of first patterns 101.

The number of the plurality of fourth patterns 104 may be equal to that of the plurality of third patterns 103 in a one-to-one correspondence manner. The other ends (or second ends) of the plurality of fourth patterns 104 are electrically connected to each other through a conductive pattern.

In the sensor unit 100 of the touch input device in FIG. 16, the plurality of first patterns 101 and the plurality of third patterns 103 basically sense a touch of an object such as a finger. To this end, the plurality of first patterns 101 operate as touch driving electrodes (TX electrodes) to which a touch driving signal is applied, and the plurality of third patterns 103 operate as touch sensing electrodes (RX electrodes or touch receiving electrodes) to which a touch sensing signal is received. Alternatively, the opposite may be also true.

Various combinations of the plurality of first to fourth patterns 101, 102, 103, and 104 may be used so that the sensor unit 100 of the touch input device in FIG. 16 drives and senses the stylus pen. The various combinations are shown in <Table 1> below. In <Table 1> below, '1' indicates the plurality of first patterns 101, '2' indicates the plurality of second patterns 102, '3' indicates the plurality of third patterns 103, and '4' indicates the plurality of fourth patterns 104.

TABLE 1

| | Finger Touch Operation | | Stylus Operation | | | | Uplink signal amplitude | | Downlink signal amplitude | | Stylus additional channel | |
|---|---|---|---|---|---|---|---|---|---|---|---|---|
| | | | Driving | | Sensing | | | | | | | |
| | Driving | Sensing | Major | Minor | X- | Y- | Major | Minor | | | | |
| No. | Tx | Rx | axis | axis | axis | axis | axis | axis | X-axis | Y-axis | Driving | Sensing |
| 1 | 1 | 3 | 2 | | 1 | 3 | Large | | Small | Small | Yes | No |
| 2 | 1 | 3 | 2 | | 1 | 4 | Large | | Small | Large | Yes | Yes |
| 3 | 1 | 3 | 2 | | 2 | 3 | Large | | Large | Small | Yes | Yes |
| 4 | 1 | 3 | 2 | | 2 | 4 | Large | | Large | Large | Yes | Yes |
| 5 | 1 | 3 | | 4 | 1 | 3 | | Large | Small | Small | Yes | No |
| 6 | 1 | 3 | | 4 | 1 | 4 | | Large | Small | Large | Yes | Yes |
| 7 | 1 | 3 | | 4 | 2 | 3 | | Large | Large | Small | Yes | Yes |
| 8 | 1 | 3 | | 4 | 2 | 4 | | Large | Large | Large | Yes | Yes |
| 9 | 1 | 3 | 2 | 4 | 1 | 3 | Large | Large | Small | Small | Yes | No |
| 10 | 1 | 3 | 2 | 4 | 1 | 4 | Large | Large | Small | Large | Yes | Yes |
| 11 | 1 | 3 | 2 | 4 | 2 | 3 | Large | Large | Large | Small | Yes | Yes |
| 12 | 1 | 3 | 2 | 4 | 2 | 4 | Large | Large | Large | Large | Yes | Yes |
| 13 | 1 | 3 | 1 | | 1 | 3 | Small | | Small | Small | No | No |
| 14 | 1 | 3 | 1 | | 1 | 4 | Small | | Small | Large | No | Yes |
| 15 | 1 | 3 | 1 | | 2 | 3 | Small | | Large | Small | No | Yes |
| 16 | 1 | 3 | 1 | | 2 | 4 | Small | | Large | Large | No | Yes |
| 17 | 1 | 3 | | 3 | 1 | 3 | | Small | Small | Small | No | No |
| 18 | 1 | 3 | | 3 | 1 | 4 | | Small | Small | Large | No | Yes |
| 19 | 1 | 3 | | 3 | 2 | 3 | | Small | Large | Small | No | Yes |
| 20 | 1 | 3 | | 3 | 2 | 4 | | Small | Large | Large | No | Yes |
| 21 | 1 | 3 | 1 | 3 | 1 | 3 | Small | Small | Small | Small | No | No |
| 22 | 1 | 3 | 1 | 3 | 1 | 4 | Small | Small | Small | Large | No | Yes |
| 23 | 1 | 3 | 1 | 3 | 2 | 3 | Small | Small | Large | Small | No | Yes |
| 24 | 1 | 3 | 1 | 3 | 2 | 4 | Small | Small | Large | Large | No | Yes |
| 25 | 1 | 3 | 2 | 3 | 1 | 3 | Large | Small | Small | Small | Yes | No |
| 26 | 1 | 3 | 2 | 3 | 1 | 4 | Large | Small | Small | Large | Yes | Yes |
| 27 | 1 | 3 | 2 | 3 | 2 | 3 | Large | Small | Large | Small | Yes | Yes |
| 28 | 1 | 3 | 2 | 3 | 2 | 4 | Large | Small | Large | Large | Yes | Yes |
| 29 | 1 | 3 | 1 | 4 | 1 | 3 | Small | Large | Small | Small | Yes | No |
| 30 | 1 | 3 | 1 | 4 | 1 | 4 | Small | Large | Small | Large | Yes | Yes |
| 31 | 1 | 3 | 1 | 4 | 2 | 3 | Small | Large | Large | Small | Yes | Yes |
| 32 | 1 | 3 | 1 | 4 | 2 | 4 | Small | Large | Large | Large | Yes | Yes |

Referring to the <Table 1> above, in various combinations No. 1 to No. 32, the plurality of first patterns 101 and the plurality of third patterns 103 are used for sensing a touch of an object such as a finger. Specifically, the plurality of third patterns 101 operate as touch driving electrodes, and the plurality of first patterns 103 operate as touch receiving electrodes. Alternatively, the opposite may be also true.

At least one or two of the plurality of first to fourth patterns 101, 102, 103, and 104 may operate as a stylus driving electrode for driving the stylus pen. At least One or two of the plurality of first to fourth patterns 101, 102, 103, and 104 may be used to form a current loop for driving the stylus pen. For example, an X-axis driving may be performed by one of the plurality of first patterns 101 and the plurality of second patterns 102, and a Y-axis driving may be performed by one of the plurality of third patterns 103 and the plurality of fourth patterns 104. The driving of the stylus pen may be performed by either the X-axis driving or the Y-axis driving or by both the X-axis driving and the Y-axis driving.

At least one or two of the plurality of first to fourth patterns 101, 102, 103, and 104 may operate as a sensing electrode for sensing a stylus pen signal emitted from the stylus pen. Since both X-axis sensing and Y-axis sensing are required to sense the stylus pen signal, two patterns of the plurality of first to fourth patterns 101, 102, 103, and 104 are used. The X-axis sensing may be performed by one of the plurality of first patterns 101 and the plurality of second patterns 102, and the Y-axis sensing may be performed by one of the plurality of third patterns 103 and the plurality of fourth patterns 104.

In the <Table 1> above, the 'uplink signal amplitude' represents an amplitude of a driving signal for driving the stylus pen 1 of FIG. 1. When the same stylus pen driving signal is applied to each of the plurality of first patterns 101 and the plurality of second patterns 102, and amplitudes of signals received by the stylus pen are compared, the uplink signal is relatively greater when the stylus pen driving signal is applied to the plurality of second patterns 102 than when the stylus pen driving signal is applied to the plurality of first patterns 101.

This is because the other ends (or second ends) of the plurality of first patterns 101 are not electrically connected not to form a current loop while the other ends (or the second end) of the plurality of second patterns 102 are electrically connected to form at least one current loop when two or more second patterns to which the stylus pen driving signal is applied are properly selected. When current flows through each first pattern 101, since RC of each first pattern 101 is charged, the current may not flow smoothly from one end (or the first end) to the other end (or the second end) of each first pattern 101. Also, the stylus pen driving signal applied through the plurality of first patterns 101 is transmitted to the plurality of second patterns 101 in which the current loop is formed through capacitive coupling. Here, signal attenuation occurs by the capacitive coupling.

Likewise, the uplink signal is relatively greater when the stylus pen driving signal is applied to the plurality of fourth patterns 104 than when the stylus pen driving signal is applied to the plurality of third patterns 103.

In the <Table 1> above, the 'downlink signal amplitude' represents an amplitude of stylus pen signal received from the stylus pen 1 of FIG. 1. When the same stylus pen signal is received by each of the plurality of first patterns 101 and the plurality of second patterns 102, and amplitudes of the signals are compared, the downlink signal is relatively greater when the stylus pen signal is received by the plurality of second patterns 102 than when the stylus pen signal is received by the plurality of first patterns 101.

This is because, although the other ends (the second end) of the plurality of second patterns 102 are electrically connected to form a current loop, the other ends (the first end) of the plurality of first patterns 101 are not electrically connected to each other, particularly, the stylus pen signal is transmitted to the plurality of first patterns 101 from the plurality of second patterns 101 in which the current loop is formed through the capacitive coupling, and thus attenuation of the downlink signal occurs.

Likewise, the downlink signal is relatively greater when the stylus pen signal is received through the plurality of fourth patterns 104 than when the stylus pen signal is received through the plurality of third patterns 103.

In <Table 1> above, the 'stylus additional channel' represents whether an additional channel is necessary for the stylus pen in addition to the touch sensing. When the plurality of second patterns 102 and/or the plurality of fourth patterns 104 are used for driving or sensing the stylus pen, an additional channel is required (marked by 'Yes' in the <Table 1>). Also, when the plurality of first patterns 101 and/or the plurality of third patterns 103 for touch sensing are used for driving or sensing the stylus pen, an additional channel is not required (marked by 'No' in the <Table 1>).

Hereinafter, some examples of the various combinations No. 1 to No. 32 of the <Table 1> above will be described in detail below. Here, combinations that are not described will be sufficiently understood by a person skilled in the art through following detailed descriptions.

In case of No. 1, the plurality of first patterns 101 are used as a touch driving electrode for sensing a touch of an object and a stylus sensing electrode for sensing a stylus pen signal. The plurality of second patterns 102 are used as a stylus driving electrode for driving the stylus pen. The plurality of third patterns 103 are used as the stylus sensing electrode for sensing the stylus pen signal as well as the touch sensing electrode for sensing the touch of the object. Also, the plurality of fourth patterns 104 are electrically floating. Here, the feature of being electrically floated may represent that only the other ends (second ends) of the plurality of fourth patterns 104 are electrically connected to each other, and one end (first ends) of the plurality of fourth patterns 104 are not connected to each other.

In case of No. 1, since the plurality of second patterns 102 are used as the stylus driving electrode, the uplink signal has a relatively large amplitude. Since the plurality of first patterns 101 and the plurality of third patterns 103 are used as the stylus sensing electrode, the downlink signal has a relatively small amplitude. Also, since the plurality of second patterns 102 are separately used as the stylus driving electrode, an additional channel for driving the stylus pen is required, but an additional channel for sensing the stylus pen is not required.

In case of No. 4, the plurality of first patterns 101 are used as the touch driving electrode for sensing the touch of the object. The plurality of second patterns 102 are used as the stylus sensing electrode for sensing the stylus pen signal as well as the stylus driving electrode for driving the stylus pen. The plurality of third patterns 103 are used as the touch sensing electrode for sensing the touch of the object. The plurality of fourth patterns 104 are used as the stylus sensing electrode for sensing the stylus pen signal.

In case of No. 4, since the plurality of second patterns 102 are used as the stylus driving electrode, the uplink signal has a relatively large amplitude. Since the plurality of second patterns 102 and the plurality of fourth patterns 104 are used as the stylus sensing electrode, the downlink signal has a relatively large amplitude. Also, since the plurality of second patterns 102 are separately used as the stylus driving electrode and the stylus sensing electrode, and the plurality of fourth patterns 104 are separately used as the stylus sensing electrode, a separate additional channel for driving and sensing the stylus pen is required.

In case of No. 8, the plurality of first patterns 101 are used as the touch driving electrode for sensing the touch of the object. The plurality of second patterns 102 are used as the stylus sensing electrode for sensing the stylus pen signal. The plurality of third patterns 103 are used as the touch sensing electrode for sensing the touch of the object. Also, the plurality of fourth patterns 104 are used as the stylus sensing electrode for sensing the stylus pen signal as well as the stylus driving electrode for driving the stylus pen.

In case of No. 8, since the plurality of fourth patterns 104 are used as the stylus driving electrode, the uplink signal has a relatively large amplitude. Since the plurality of second patterns 102 and the plurality of fourth patterns 104 are used as the stylus sensing electrode, the downlink signal has a relatively large amplitude. Also, since the plurality of second patterns 102 are separately used as the stylus sensing electrode, and the plurality of fourth patterns 104 are separately used as the stylus driving electrode and the stylus sensing electrode, a separate additional channel for driving and sensing the stylus pen is required.

In case of No. 12, the plurality of first patterns 101 are used as the touch driving electrode for sensing the touch of the object. The plurality of second patterns 102 are used as the stylus sensing electrode for sensing the stylus pen signal as well as the stylus driving electrode for driving the stylus pen. The plurality of third patterns 103 are used as the touch sensing electrode for sensing the touch of the object. Also, the plurality of fourth patterns 104 are used as the stylus sensing electrode for sensing the stylus pen signal as well as the stylus driving electrode for driving the stylus pen.

In case of No. 12, since the plurality of second and fourth patterns 102 and 104 are used as the stylus driving electrode, the uplink signal has a relatively large amplitude. Since the plurality of second patterns 102 and the plurality of fourth patterns 104 are used as the stylus sensing electrode, the downlink signal has a relatively large amplitude. Also, since the plurality of second patterns 102 are separately used as the stylus driving electrode and the stylus sensing electrode, and the plurality of fourth patterns 104 are separately used as the stylus driving electrode and the stylus sensing electrode, a separate additional channel for driving and sensing the stylus pen is required.

In case of No. 13, the plurality of first patterns 101 are used as the touch driving electrode for sensing the touch of an object, the stylus driving electrode for driving the stylus pen, and the stylus sensing electrode for sensing the stylus pen signal. The plurality of third patterns 103 are used as the stylus sensing electrode for sensing the stylus pen signal as well as the touch sensing electrode for sensing the touch of the object. Also, the plurality of second and fourth patterns 102 and 104 are electrically floating.

In case of No. 13, since the plurality of first patterns 101 are used as the stylus driving electrode, the uplink signal has a relatively small amplitude. Since the plurality of first patterns 101 and the plurality of third patterns 103 are used as the stylus sensing electrode, the downlink signal has a relatively small amplitude. Also, since the plurality of first patterns 101 are used as the stylus driving electrode and the stylus sensing electrode, and the plurality of third patterns 103 are used as the stylus sensing electrode, a separate additional channel for driving and sensing the stylus pen is not required.

In case of No. 17, the plurality of first patterns 101 are used as the touch driving electrode for sensing the touch of the object and a stylus sensing electrode for sensing the stylus pen signal. The plurality of third patterns 103 are used as the touch sensing electrode for sensing the touch of the object, the stylus driving electrode for driving the stylus pen, and the stylus sensing electrode for sensing the stylus pen signal. Also, the plurality of second and fourth patterns 102 and 104 are electrically floating.

In the case of No. 17, since the plurality of third patterns 103 are used as the stylus driving electrode, the uplink signal has a relatively small amplitude. Since the plurality of first patterns 101 and the plurality of third patterns 103 are used as the stylus sensing electrode, the downlink signal has a relatively small amplitude. Also, since the plurality of second patterns 102 are used as the stylus sensing electrode, and the plurality of third patterns 103 are used as the stylus driving electrode and the stylus sensing electrode, a separate additional channel for driving and sensing the stylus pen is not required.

In case of No. 21, the plurality of first patterns 101 are used as the touch driving electrode for sensing the touch of an object, the stylus driving electrode for driving the stylus pen, and the stylus sensing electrode for sensing the stylus pen signal. The plurality of third patterns 103 are used as the touch sensing electrode for sensing the touch of the object, the stylus driving electrode for driving the stylus pen, and the stylus sensing electrode for sensing the stylus pen signal. Also, the plurality of second and fourth patterns 102 and 104 are electrically floating.

In case of No. 21, since the plurality of first and third patterns 101 and 103 are used as the stylus driving electrode, the uplink signal has a relatively small amplitude. Since the plurality of first patterns 101 and the plurality of third patterns 103 are used as the stylus sensing electrode, the downlink signal has a relatively small amplitude. Also, since the plurality of first patterns 102 are used as the stylus driving electrode and the stylus sensing electrode, and the plurality of third patterns 103 are used as the stylus driving electrode and the stylus sensing electrode, a separate additional channel for driving and sensing the stylus pen is not required.

Among the various combinations No. 1 to No. 32 in the <Table 1> above, in Nos. 1, 5, 9, 25, and 29, driving is 'Yes' and sensing is 'No' in a column of 'Stylus additional channel'. In case of Nos. 1, 5, 9, 25, and 29, the plurality of first and third patterns 101 and 103 are used for sensing the stylus pen, and the plurality of second and/or fourth patterns 102 and 104 are used for driving the stylus pen. When the stylus pen is driven, since formation of a magnetic field for resonating the stylus pen may be somewhat difficult although the plurality of second and/or fourth patterns 102 and 104 are used, as illustrated in FIG. 17 two or more adjacent one ends (the first end) of the second patterns may be electrically connected to each other. Likewise, two or more adjacent one ends (the first end) of the fourth patterns may be electrically connected to each other. This configuration has an advantage of reducing the additional channel for driving the stylus pen.

The control unit (not shown) controls the sensor unit 100 Specifically, as shown in No. 1 to No. 32 of the <Table 1> above, the control unit (not shown) may apply a touch driving signal to the plurality of first patterns 101 and receive a touch sensing signal from the plurality of third patterns 103.

As shown in No. 1 to No. 32 of the <Table 1> above, the control unit (not shown) may apply a stylus pen driving signal to at least one of the plurality of first to fourth patterns 101 to 104 and receive a stylus pen sensing signal from at least one of the plurality of first to fourth patterns 101 to 104.

As shown in No. 1 to No. 32 of the <Table 1> above, the control unit (not shown) may apply a stylus pen driving signal to at least one of the plurality of first patterns 101 or the plurality of third patterns 103.

As shown in Nos. 1 to 3, 5 to 7, 9 to 11, 13 to 15, 17 to 19, 21 to 23, 25 to 27, and 29 to 31 of the <Table 1> above, the control unit (not shown) may apply a stylus pen sensing signal to at least one of the plurality of first patterns 101 or the plurality of third patterns 103.

As shown in Nos. 1 to 12 and 25 to 32 of the <Table 1> above, the control unit (not shown) may apply a stylus pen driving signal to at least one of the plurality of second patterns 102 or the plurality of fourth patterns 104.

As shown in Nos. 2 to 4, 6 to 8, 10 to 12, 14 to 16, 19 to 20, 22 to 24, 26 to 28, and 30 to 32 of the <Table 1> above, the control unit (not shown) may apply a stylus pen sensing signal to at least one of the plurality of second patterns 102 or the plurality of fourth patterns 104.

The control unit (not shown) may select at least one of the plurality of first to fourth patterns 101 to 104 as a pen driving electrode and apply a stylus pen driving signal to the selected pen driving electrode. Here, the feature of selecting at least one of the plurality of first to fourth patterns 101 to 104 as the pen driving electrode may be varied according to a position of the stylus pen 1 on the touch screen 20 of the touch input device 2 of FIG. 1. A pattern selected when the stylus pen is in the hover state may be different from a pattern selected when the stylus pen is in the contact state. For example, the control unit (not shown) may select one of the first and second patterns 101 and 102 as the pen driving electrode when the stylus pen is in the hover state and one of the third and fourth patterns 103 and 104 as the pen driving electrode when the stylus pen is in the contact state. Alternatively, the opposite may be also true.

The control unit (not shown) may select at least two of the plurality of first to fourth patterns 101 to 104 as the pen sensing electrode to sense the stylus pen signal emitted from the stylus pen through the selected pen sensing electrode. Here, the feature of selecting at least two of the plurality of first to fourth patterns 101 to 104 as the pen sensing electrode may be varied according to a position of the stylus pen 1 on the touch screen 20 of the touch input device 2 of FIG. 1. A pattern selected when the stylus pen is in the hover state may be different from a pattern selected when the stylus pen is in the contact state. For example, the control unit (not shown) may select one of the first and second patterns 101 and 102 as the pen driving electrode when the stylus pen is in the hover state and one of the third and fourth patterns 103 and 104 as the pen driving electrode when the stylus pen is in the contact state. Alternatively, the opposite may be also true.

Figure 19:
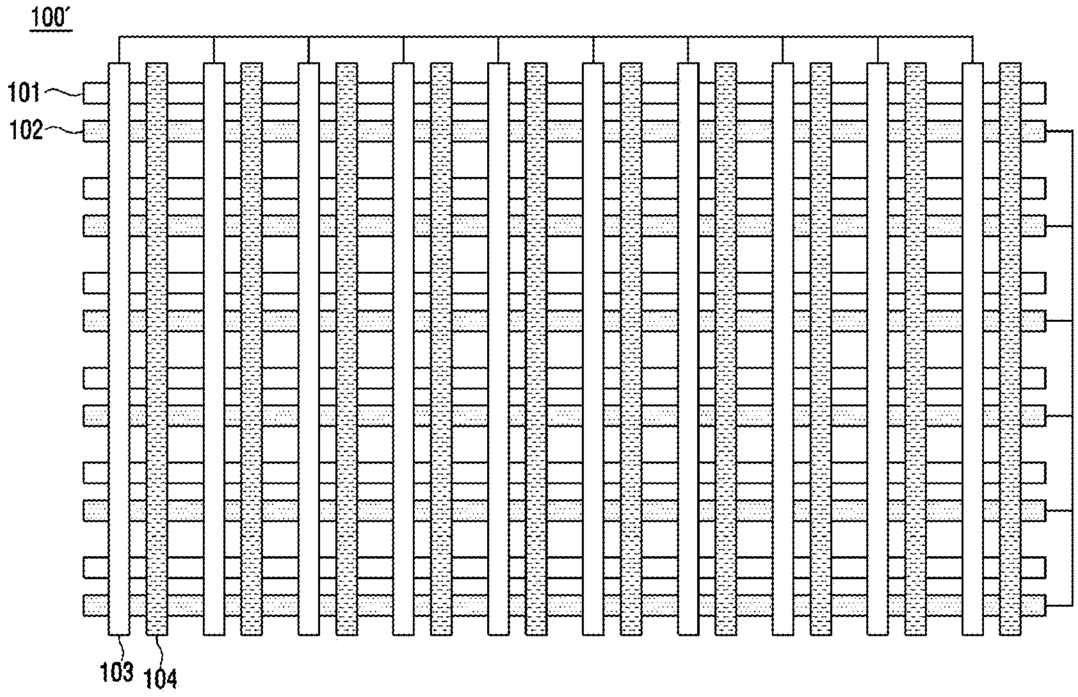
FIG. 19 is a schematic configuration view illustrating a sensor unit 100' according to a second embodiment of the present invention.

FIG. 19 is a schematic configuration view illustrating a sensor unit 100' according to a second embodiment of the present invention;

The touch input device according to the second embodiment of the present invention may be a landscape-type touch input device. In this landscape-type touch input device, a width is greater than a height, and a control unit (not shown) for controlling the sensor unit 100' may be disposed below the sensor unit 100'. For example, the touch input device may correspond to a shape of a tablet PC.

The sensor unit 100' of the touch input device according to the second embodiment of the present invention has the same configuration as that of the sensor unit 100 of the touch input device according to the first embodiment in FIG. 16, and the sensor unit 100' only rotates at 90° from the sensor unit 100.

The sensor unit 100' of the touch input device according to the second embodiment of the present invention includes a plurality of first to fourth patterns 101, 102, 103, and 104. The first pattern 101 and the second pattern 102 are adjacent to each other and each have a shape extending in one direction. Alternatively, each of the first pattern 101 the second pattern 101 may have a predetermined shape in which an electrical path is formed along the one direction. The third pattern 103 and the fourth pattern 104 are adjacent to each other and each have a shape extending in a different direction from the one direction. Alternatively, each of the third pattern 103 and the fourth pattern 104 may have a predetermined shape in which an electrical path is formed in the different direction. The other ends (second ends) of the plurality of second patterns 102 are electrically connected to each other, and the other ends (second ends) of the plurality of fourth patterns 104 are also electrically connected to each other.

When the sensor unit 100' of the touch input device according to the second embodiment in FIG. 19 has a size of about 10 to 14 inches, which is the size of a landscape-type tablet PC, and is implemented as with an example of No. 1 in the <Table 2> above, the number of total channels and the number of driving trace channels (TX Trace Channels) of the sensor unit 100' are summarized in <Table 2> below.

TABLE 2

| | Number of channels (about 10 inches or more) |
|---|---|
| Finger TX(101) | 42 |
| Finger RX(103) | 56 |
| Stylus TX(102) | 21 |
| Total channel(101 + 102 + 103) | 119 |
| TX Trace channel(101 + 102) | 63 |

Figure 20:
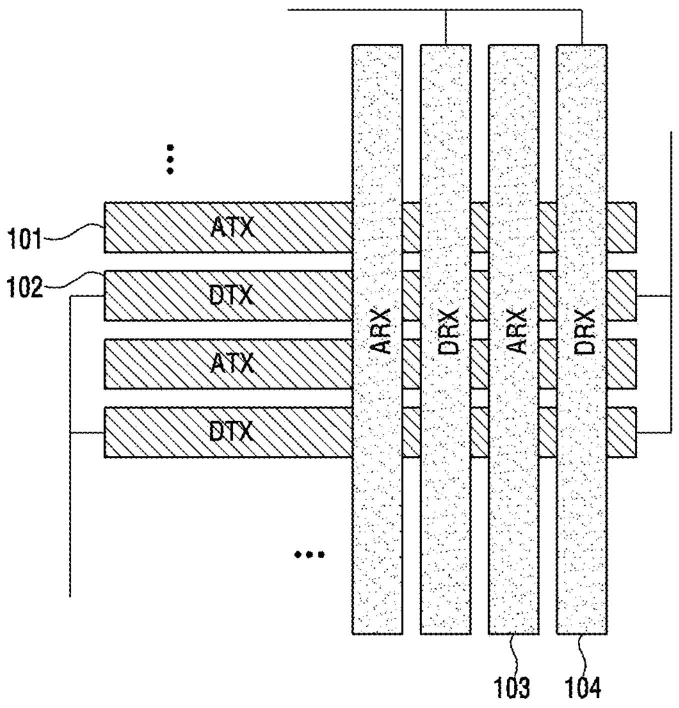
FIG. 20 is a schematic configuration view illustrating an example of the sensor unit 100' in FIG. 19.

In the <Table 2> above, the number of channels of Stylus TX is a value obtained by dividing the number of the plurality of first patterns 101 by 2. This is because the number of channels are reduced by half as two adjacent one ends of one ends (first ends) of the plurality of second patterns 102 are electrically connected while the number of the plurality of second patterns 102 is equal to that of the plurality of first patterns 101 as illustrated in FIG. 20.

In the <Table 2> above, the number of TX Trace channels is a sum of the number of channels of Finger TX and the number of channels of Stylus TX. The number of the TX Trace channels is a key factor in determining a thickness of a bezel in a width direction of the touch input device according to the second embodiment. This is because the control unit (not shown) is disposed below (or above) the sensor unit 100' in the touch input device according to the second embodiment. As the number of the TX Trace channels is reduced, the thickness of the bezel in the width direction of the touch input device may be reduced.

While there is no problem when the screen of the touch input device shown in FIG. 19 has a size of a screen of a smartphone, e.g., 6.9 inches, when the size of the screen of the touch input device shown in FIG. 19 increases to 11 inches or 12.9 inches that is a size of a screen of a tablet PC, lengths of the first to fourth patterns 101, 102, 103, and 104 of the sensor unit 100' also increase, so that a resistance value and a capacitance value of the sensor unit increase. Since the increase of the resistance and capacitance values allows an operating frequency bandwidth of each of the touch driving signal applied to one pattern used as the touch driving electrode among the first to third patterns and the stylus driving signal for driving the stylus pen to decrease, an operating frequency bandwidth required for a design may not be obtained. The resistance and capacitance values may be reduced to solve the above-described limitation. However, the feature of reducing the resistance and capacitance values is limited, and the above-described limitation is not still solved although the values are maximally reduced.

Also, the stylus pen signal received from the stylus pen and inputted to the control unit of the touch input device is attenuated as much as the sensor unit 100' increases. Particularly, as the stylus pen sensing signal is attenuated in a process of being transmitted to the control unit from a portion spaced farthest from the control unit in the first to fourth patterns 101, 102, 103, and 104 of the sensor unit 100', a voltage value required for a design is not outputted.

The above-described limitations may be solved by using the plurality of second patterns 102 as the stylus pen sensing electrode for sensing the stylus pen signal as with examples of Nos. 3, 4, 7, 8, 11, 12, 15, 16, 19, 20, 23, 24, 27, 28, 31, and 32 of the <Table 2> or by using the plurality of fourth patterns 104 as the stylus pen sensing electrode for sensing the stylus pen signal as with examples of Nos. 2, 4, 6, 8, 10, 12, 14, 16, 18, 20, 22, 24, 26, 28, 30, and 32 of the <Table 2>. In the above examples, since the plurality of second and fourth patterns 102 and 104 directly receive electromotive force through electromagnetic induction caused by the stylus pen, there is no signal attenuation through capacitive coupling from the second pattern 102 to the first pattern 101 and from the fourth pattern 104 to the third pattern 103.

As a specific example, the sensor unit 100' of the touch input device according to the second embodiment has a size of about 10 to 14 inches, which is the size of the landscape-type tablet PC, and when the sensor unit 100' is implemented as with an example of No. 3 in the <Table 2> above, the number of total channels and the number of driving trace channels (TX Trace Channels) of the sensor unit 100' are summarized in <Table 3> below.

TABLE 3

| | Number of channels (about 10 inches or more) |
|---|---|
| Finger TX | 42 |
| Finger RX | 56 |
| Stylus TX | 42 |
| Total channel | 140 |
| TX Trace channel | 84 |

Figure 21:
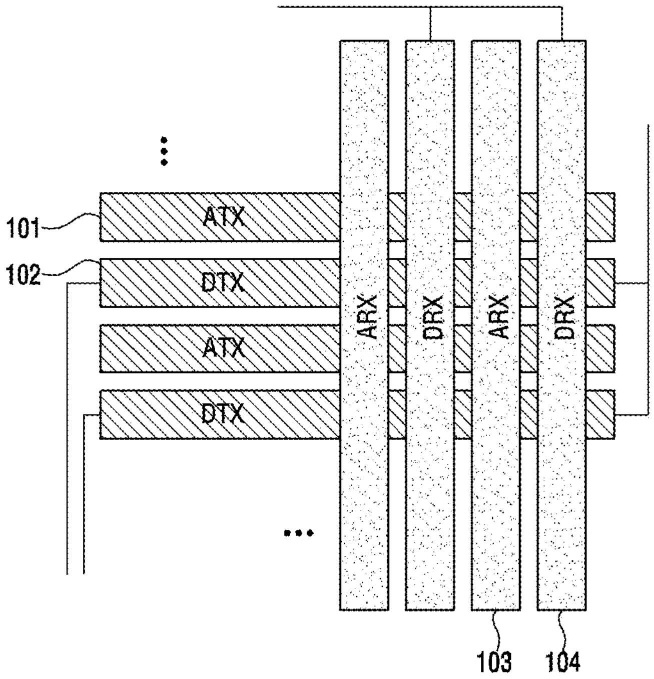
FIG. 21 is a schematic configuration view illustrating another example of the sensor unit 100' in FIG. 19.

In the <Table 3> above, the number of channels of Stylus TX is equal to that of the plurality of second patterns 102. This is because the number of the plurality of second patterns 102 is equal to that of the plurality of first patterns 101, and each of one ends of the plurality of second patterns 102 is individually connected to one conductive pattern as illustrated in FIG. 21.

In the <Table 3> above, the number of TX Trace channels is a sum of the number of channels of Finger TX and the number of channels of Stylus TX. The number of the TX Trace channels is a key factor in determining a thickness of the bezel in the minor axis of the touch input device. As the number of the TX Trace channels is reduced, the thickness of the bezel in the minor axis of the touch input device may be reduced.

The example of the above <Table 3> has a disadvantage in that the number of channels slightly increases compared to the above <Table 2>, but has an advantage in that a voltage value of the stylus sensing signal received by the control unit increases because the pen sensing signal emitted from the stylus pen is received through the plurality of second patterns 102. The present applicant confirms through experiments that the voltage value of the stylus sensing signal received by the control unit is approximately two times greater than that in the <Table 2>.

Also, since each of the plurality of second patterns 102 is one channel, when the plurality of second patterns 102 are used as the stylus driving electrode (Stylus TX), a distance between the channels is reduced by half, and a stylus driving resolution is improved.

As another specific example, when the sensor unit 100' of the touch input device according to the second embodiment has a size of about 10 to 14 inches, which is the size of the landscape-type tablet PC, and is implemented as with an example of No. 8 in the <Table 2> above, the number of total channels and the number of driving trace channels (TX Trace Channels) of the sensor unit 100' are summarized in <Table 4> below.

TABLE 4

| | Number of channels (about 10 inches or more) |
|---|---|
| Finger TX | 42 |
| Finger RX | 56 |
| Stylus TX | 56 |
| Total channel | 154 |
| TX Trace channel | 42 |

Figure 22:
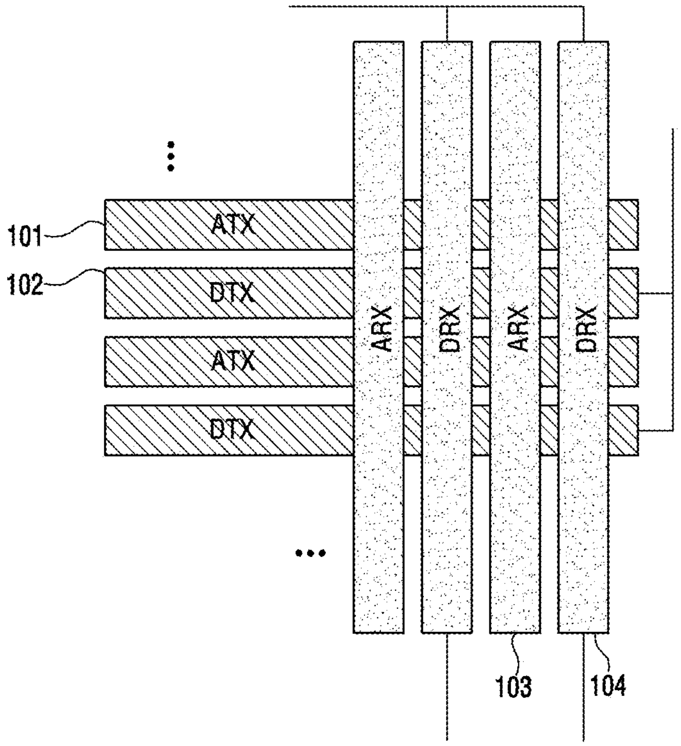
FIG. 22 is a schematic configuration view illustrating another example of the sensor unit 100' in FIG. 19.

In the <Table 4> above, the number of channels of the Stylus TX is equal to that of the plurality of fourth patterns 104. This is because the number of the plurality of fourth patterns 104 is equal to that of the plurality of third patterns 103, and each of one ends of the plurality of fourth patterns 104 is individually connected to one conductive pattern as illustrated in FIG. 22.

In the <Table 4> above, the number of the TX Trace channels is equal to that of the number of channels of the Finger TX. The number of the TX Trace channels is a key factor in determining a thickness of the bezel in the minor axis of the touch input device. As the number of the TX Trace channels is reduced, the thickness of the bezel in the minor axis of the touch input device may be reduced.

The example of the above <Table 4> has a disadvantage in that the number of total channels slightly increases compared to the above <Table 2>, but has an advantage in that a voltage value of the stylus pen sensing signal received by the control unit increases because the pen sensing signal emitted from the stylus pen is received through the plurality of fourth patterns 104.

Also, since each of the plurality of fourth patterns 104 is one channel, when the plurality of fourth patterns 104 are used as the stylus driving electrode (Stylus TX), a distance between the channels is reduced by half compared to the above <Table 2>, and the stylus driving resolution is improved.

Also, since the number of the TX trace channels may be reduced to ¼ to ⅓ compared to the example in the <Table 3>, a thickness of a bezel B in the width direction of the touch input device may be reduced.

Figure 23:
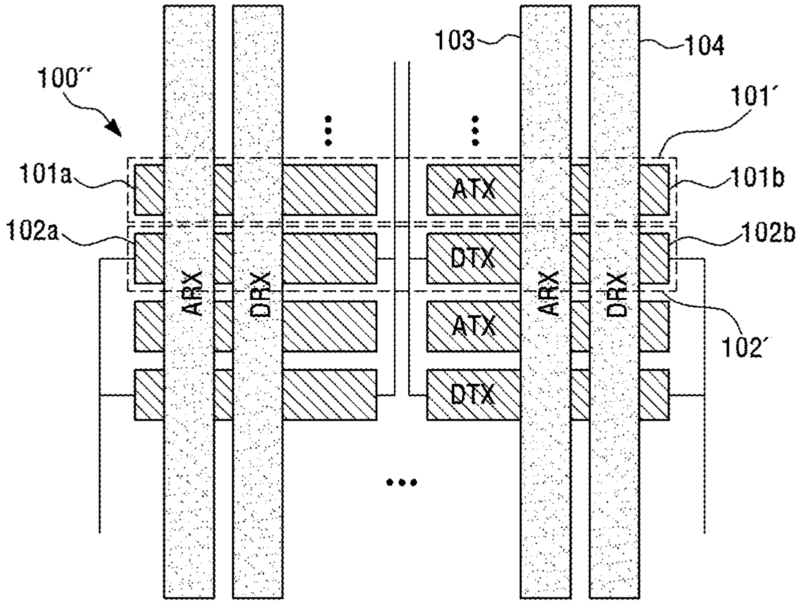
FIG. 23 is a schematic configuration view illustrating another example of the sensor unit 100' in FIG. 19.

FIG. 23 is a schematic configuration view illustrating another example of the sensor unit 100' in FIG. 19.

In a sensor unit 100" of FIG. 23, each first pattern 101' includes at least two or more first-a patterns **101*a* and first-b patterns 101*b*, and each second pattern 102' includes at least two or more second-a patterns 102*a* and second-b patterns 102*b*. A plurality of third and fourth patterns 103 and 104 are the same as those of the sensor unit 100 of FIG. 19**.

The first-a pattern **101*a* and the first-b pattern 101*b* are arranged in an extension direction of the first pattern 101'. The second-a pattern 102*a* and the second-b pattern 201*b* are arranged in an extension direction of the second pattern 102'**.

The other ends of the plurality of second-a patterns **102*a* are electrically connected, and the other ends of the plurality of second-b patterns 102*b* are electrically connected. Here, the other ends of the plurality of second-a patterns 102*a* face the other ends of the plurality of second-b patterns 102*b***.

One ends of two or more adjacent second-a patterns of the plurality of second-a patterns **102*a* may be electrically connected to each other. One ends of two or more adjacent second-b patterns of the plurality of second-b patterns 102*b* may be electrically connected to each other. Here, each of the one ends of the plurality of second-a patterns and the one ends of the plurality of second-b patterns is individually connected to a conductive pattern as illustrated in FIGS. 9A and 9**B.

As a specific example, when the sensor unit 100" in FIG. 23 has a size of about 10 to 14 inches, which is the size of the landscape-type tablet PC, and is implemented as with the example of No. 1 in the <Table 1> above, the number of total channels and the number of driving trace channels (TX Trace Channels) of the sensor unit 100" are summarized in <Table 5> below.

TABLE 5

| | Number of channels (about 10 inches or more) |
|---|---|
| Finger TX | 84 |
| Finger RX | 56 |
| Stylus TX | 42 |
| Total channel | 182 |
| TX Trace channel | 126 |

In the <Table 5> above, the number of channels of Stylus TX is a value obtained by dividing the number of the plurality of second patterns 102' by 2. This is because the number of the plurality of second patterns 102' is equal to that of the plurality of first patterns 101', and two adjacent second patterns of the plurality of second patterns 102' are electrically connected to each other.

In the <Table 5> above, the number of TX Trace channels is a sum of the number of channels of Finger TX and the number of channels of Stylus TX. The number of TX Trace channels is a key factor in determining a thickness of the bezel in the minor axis of the touch input device. As the number of the TX Trace channels is reduced, the thickness of the bezel in the minor axis of the touch input device may be reduced.

The above <Table 5> has a disadvantage in that the number of channels slightly increases compared to the example of the <Table 2> above, but has an advantage in that an operating frequency bandwidth of each of the touch driving signal applied to the touch driving electrode and the pen driving signal for driving the stylus pen is widened by reducing a resistance value and a capacitance value of the sensor unit 100" because a length of each of the first pattern 101' and the second pattern 102' is reduced by half.

Figure 24:
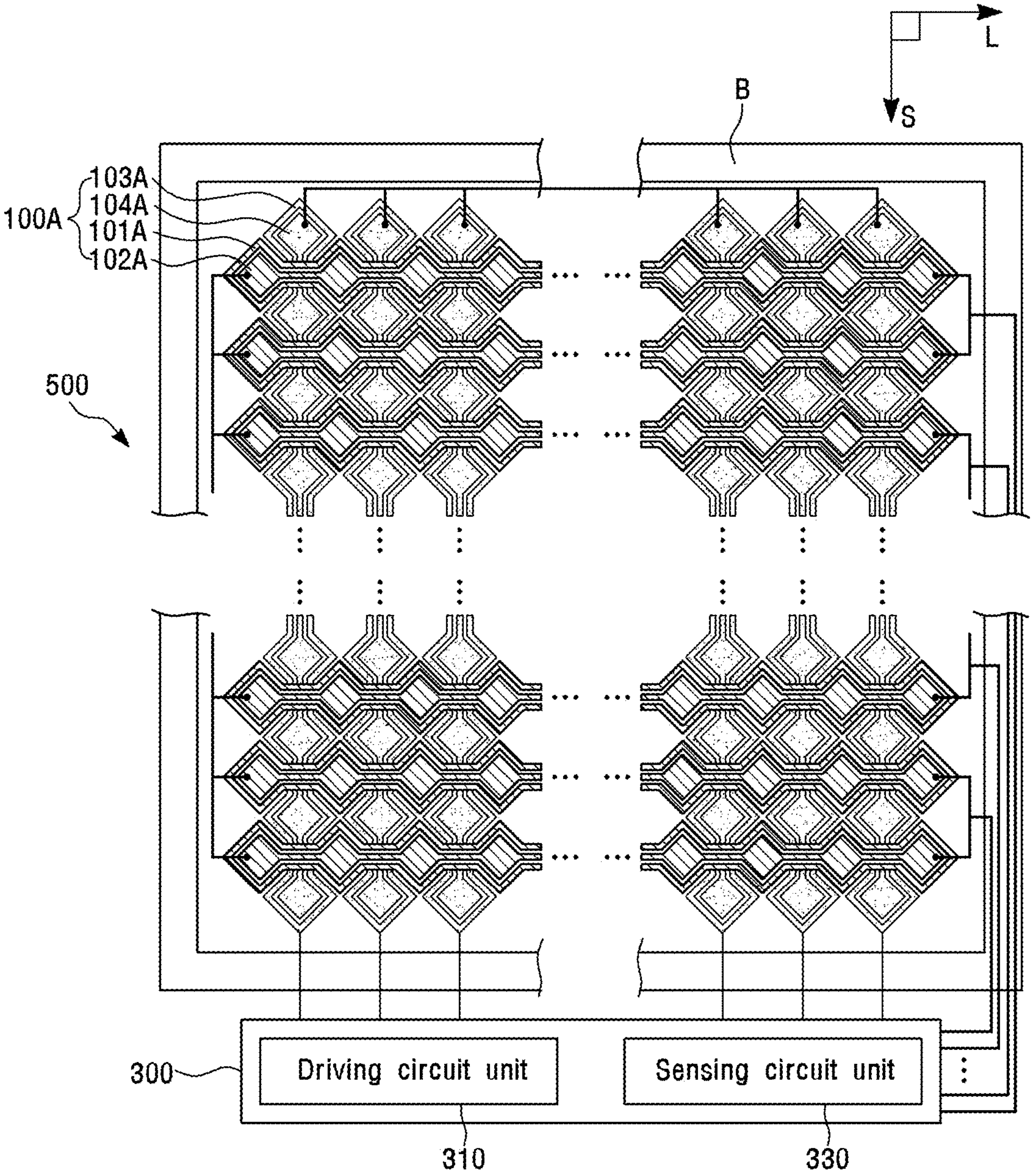
FIG. 24 is a view illustrating the touch input device in FIG. 20 in detail.

FIG. 24 is a view illustrating the touch input device in FIG. 20 in detail.

Referring to FIG. 24, a touch input device 500 may include a sensor unit 100A and a control unit 300 for controlling the sensor unit 100A.

The sensor unit 100A is an example of the sensor unit 100' in FIG. 20. Thus, the sensor unit 100A includes a plurality of first to fourth patterns 101A, 102A, 103A, and 104A.

The first pattern 101A has a shape extending in a first direction (width direction). The first direction may be a major axis direction L of a screen of the touch input device. The first pattern 101A may also be referred to as Active TX (ATX).

The first pattern 101A may include a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The first pattern 101A may have an opening in which the second pattern 102A is disposed. The opening may have a shape corresponding to an outer shape of the first pattern 101A. The first pattern 101A may have a structure surrounding the second pattern 102A. The first pattern 101A is spaced a predetermined distance from the second pattern 102A.

The second pattern 102A has a shape extending in the first direction, is disposed adjacent to the first pattern 101A, and is spaced a predetermined distance from the first pattern 101A. The second pattern 102A may also be referred to as Dummy TX (DTX).

The second pattern 102A is disposed in the first pattern 101A.

The second pattern 102A may include a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the second pattern 102A may have a shape corresponding to that of the main pattern part of the first pattern 101A, and the connection pattern part of the second pattern 102A may have a shape corresponding to that of the connection pattern part of the first pattern 101A.

The third pattern 103A has a shape extending in a second direction different from the first direction. The second direction may be a direction perpendicular to the first direction, and may be a minor axis direction of the screen of the touch input device. The third pattern 103A may also be referred to as Active RX (ARX).

The third pattern 103A may include a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The third pattern 103A may have an opening in which the fourth pattern 104A is disposed. The opening may have a shape corresponding to an outer shape of the third pattern 103A. The third pattern 103A may have a structure surrounding the fourth pattern 104A. The third pattern 103A is spaced a predetermined distance from the fourth pattern 104A.

The fourth pattern 104A has a shape extending in the second direction, is disposed adjacent to the third pattern 103A, and is spaced a predetermined distance from the third pattern 103A. The fourth pattern 104A may also be referred to as Dummy RX (DRX). The fourth pattern 104A is disposed in the third pattern 103A.

The fourth pattern 104A may include the plurality of main pattern parts and the connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the fourth pattern 104A may have a shape corresponding to that of the main pattern part of the third pattern 103A, and the connection pattern part of the fourth pattern 104A may have a shape corresponding to that of the connection pattern part of the third pattern 103A.

The third and fourth patterns 103A and 104A are disposed on the first and second patterns 101A and 102A and are spaced a predetermined distance from the first and second patterns 101A and 102A. The sensor unit in which the first to fourth patterns are disposed on the same layer will be described in detail with reference to FIG. 30.

Although not shown in the drawing, one ends (first ends) of the plurality of first patterns 101A are electrically connected to the control unit 300, and the other ends (second ends) are electrically opened. Here, each of the one ends (first end) is relatively close to the control unit 300, and each of the other ends (second end) is relatively far from the control unit 300.

Although not shown in the drawing, each of the one ends of the plurality of first patterns 101A may be electrically connected to each other through the control unit 300 and the conductive pattern. The conductive patterns connecting the plurality of first patterns 101A and the control unit 300 may be arranged in the bezel B of a width direction of the touch input device 500.

Two adjacent one ends of the one ends (first ends) of the plurality of second patterns 102A may be electrically connected to each other by a first conductive pattern and then electrically connected to the control unit 300 through a second conductive pattern. The other ends (second ends) of the plurality of second patterns 102A are electrically connected to each other through the conductive pattern. Here, each of the one ends (first end) is relatively close to the control unit 300, and each of the other ends (second end) is relatively far from the control unit 300.

The second conductive patterns connecting the plurality of second patterns 102A and the control unit 300 may be arranged in the bezel B of the width direction of the touch input device 500 as illustrated in FIG. 24 Here, the second conductive patterns connecting the plurality of second patterns 102A and the control unit 300 may be arranged in the bezel B of the width direction of the touch input device 500 together with conductive patterns (not shown) connecting the plurality of first patterns 101A and the control unit 300.

When the other ends of the plurality of second patterns 102A are electrically connected to each other, a total impedance is reduced because capacitances for respective second patterns 102A are added. Thus, an effect in which each of the other ends of the plurality of second patterns 102A is AC GND is obtained.

Although not shown in the drawings, the other ends of the plurality of second patterns 102A, which are electrically connected to each other, may be grounded. Also, although not shown in the drawings, the other ends of the plurality of second patterns 102A may not be electrically connected to each other, and a predetermined capacitor may be connected to each of the other ends of the second patterns 102A.

The plurality of first patterns 101A and the plurality of second patterns 102A may be disposed on the same layer. The first pattern 101A and the second pattern 102A may be formed on the same layer by using a metal mesh.

Although not shown in the drawing, one ends (first ends) of the plurality of third patterns 103A are electrically connected to the control unit 300, and the other ends (second ends) are electrically opened. Here, each of the one ends (first end) is relatively close to the control unit 300, and each of the other ends (second end) is relatively far from the control unit 300. The one ends of the plurality of third patterns 103A may be electrically connected to the control unit 300 through a conductive pattern.

One ends (or first ends) of the plurality of fourth patterns 104A may be electrically opened. Here, the other ends (second ends) of the plurality of fourth patterns 104A may be electrically connected to each other in the same manner as the plurality of second patterns 102A. Here, each of the one ends (first end) is relatively close to the control unit 300, and each of the other ends (second end) is relatively far from the control unit 300.

Although not shown in the drawings, the other ends of the plurality of second patterns 104A, which are electrically connected to each other, may be grounded. Also, the other ends of the plurality of fourth patterns 104A may not be electrically connected to each other, and a predetermined capacitor may be connected to each of the other ends of the fourth patterns 104A.

The plurality of third patterns 103A and the plurality of fourth patterns 104A may be disposed on the same layer. The third pattern 103A and the fourth pattern 104A may be formed on the same layer by using a metal mesh. Here, the third pattern 103A and the fourth pattern 104A may be disposed on a layer different from that of the first pattern 101A and the second pattern 102A. For example, the third pattern 103A and the fourth pattern 104A may be disposed on a first layer, and the first pattern 101A and the second pattern 102A may be disposed on a second layer that is different from the first layer. The sensor unit in which the first to fourth patterns are disposed on the same layer will be described in detail with reference to FIG. 30.

The control unit 300 may be electrically connected to the sensor unit 100A and control an operation of the sensor unit 100A. The control unit 300 and the sensor unit 100A may be electrically connected to each other through a conductive pattern.

The control unit 300 may include a plurality of driving circuit units 310 and a plurality of sensing circuit units 330. Here, although not shown in the drawing, at least one of the plurality of driving circuit units 310 and the plurality of sensing circuit units 330 may not be contained in the control unit 300 and may be disposed outside the control unit 300.

The plurality of driving circuit units 310 may include a driving circuit unit providing a touch sensing signal for sensing a position of a touch of an object such as a finger to the plurality of first patterns 101A and a driving circuit unit providing a pen driving signal for driving the stylus pen.

The plurality of sensing circuit units 330 may include a sensing circuit unit for detecting a position of a touch of an object such as a finger by receiving a sensing signal through the plurality of third patterns 103A and a sensing circuit unit for sensing the stylus pen. Here, some sensing circuit units among the plurality of sensing circuit units may perform touch position sensing in addition to stylus pen sensing.

The control unit 300 may control the sensor unit 100A to operate in one of the touch sensing mode, the antenna driving mode, and the stylus pen sensing mode. The control unit 300 may selectively electrically connect the plurality of driving/sensing circuit units 310 and 330 to the sensor unit 100A according to each mode. To this end, the control unit 300 may include a plurality of switches electrically connecting the plurality of driving/sensing circuit units 310 and 330 to the sensor unit 100A according to a command of the control unit 300.

An operation mode of the touch input device 500 in FIG. 24 will be described in detail. Here, since the example of No. 1 in the above <Table 1> is illustrated in FIG. 24, a description will be provided based on the example.

In the touch driving/sensing mode, the control unit 300 may electrically connect the plurality of driving circuit units 310 to the plurality of first patterns 101A of the sensor unit 100A to sense a position of a touch of an object such as a finger. The control unit 300 may control a plurality of switches to electrically connect the conductive patterns connected to the plurality of first patterns 101A with the plurality of driving circuit units 310.

Also, the control unit 300 may electrically connect the plurality of sensing circuit units 330 for touch position sensing to the plurality of third patterns 103A of the sensor unit 100A. The control unit 300 may control a plurality of switches to electrically connect the conductive patterns connected to the plurality of third patterns 103A with the plurality of sensing circuit units 330.

In the driving/touch sensing mode, the control unit 300 simultaneously or sequentially applies a driving signal (or touch driving signal) for touch sensing to the plurality of first patterns 101A and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the output voltage value to detect a touch position.

In the touch driving/sensing mode, the control unit 300 may electrically connect the plurality of driving circuit units 310 to the plurality of second patterns 102A to prevent capacitive coupling from being generated between the plurality of first patterns 101A and the plurality of second patterns 102A. Here, the control unit 300 may control the same driving signal as the driving signal applied to the plurality of first patterns 101A to be applied to the plurality of second patterns 102A. Also, the control unit 300 may control a predetermined reference potential to be applied to the plurality of second patterns 102A when the driving signal is applied to the plurality of first patterns 101A.

In the antenna driving mode (or stylus driving mode, or stylus uplink mode), the control unit 300 electrically connect the plurality of driving circuit units 310 for driving the antenna to the plurality of second patterns 102A of the sensor unit 100A. The control unit 300 may control the plurality of switches to electrically connect the conductive patterns connected to the plurality of second patterns 102A with the plurality of driving circuit units 310.

The control unit 300 may control a driving signal (or pen driving signal) outputted from each driving circuit unit 310 connected to the plurality of second patterns 102A. For example, the control unit 300 may control: a pulse signal having a predetermined frequency to be outputted from a first driving circuit unit: any pulse signal not to be outputted from a second driving circuit unit; and a reverse pulse signal having a phase opposite to that of the pulse signal outputted from the first driving circuit unit to be outputted from the third driving circuit unit, among the plurality of driving circuit units connected to the plurality of second patterns 102A. In this case, a current loop is formed by the second pattern electrically connected to the first driving circuit unit and the second pattern electrically connected to the third driving circuit unit. A magnetic field is generated by the formed current loop, and the stylus pen adjacent to the sensor unit 100A may be driven by the magnetic field.

The control unit 300 may control opposite driving signals to be outputted from two random driving circuit units among the plurality of driving circuit units 310 electrically connected to the plurality of second patterns 102A. Thus, the control unit 300 may variously change and set a size and a position of the current loop. For example, when the control unit 300 detects a position of the stylus pen adjacent to the sensor unit 100A, the control unit 300 may control opposite driving signals to be outputted from the driving circuit unit electrically connected to two second patterns disposed around the position of the stylus pen, and when the control unit 300 does not detect the position of the stylus pen, the control unit 300 may control opposite driving signals to be outputted from the driving circuit unit electrically connected to two second patterns disposed both outermost portions among the plurality of second patterns 102A.

Figure 25:
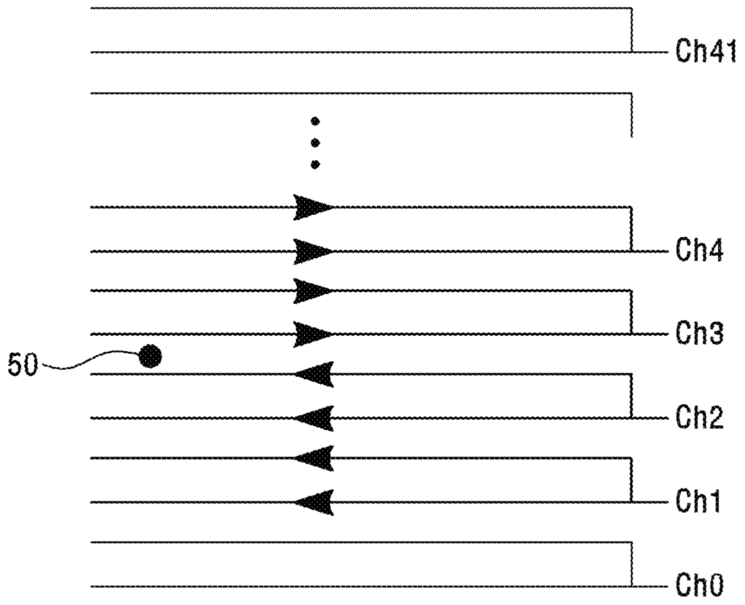
FIG. 25 is a view for explaining a method by which a control unit 300 of FIG. 24 applies a pen driving signal for driving the stylus pen to a plurality of second patterns 102A.

FIG. 25 is a view for explaining a method by which the control unit 300 applies a pen driving signal for driving the stylus pen to the plurality of second patterns 102A: For reference, in FIG. 25, one second pattern 102A in FIG. 24 is simply illustrated as one line Ch, and each line Ch is one channel As illustrated in FIG. 25, two adjacent second patterns are electrically connected to form one channel. In this configuration, the same signal is applied to the two electrically connected second patterns. FIG. 25 is a view illustrating a state in which 84 second patterns are connected by two to form 42 channels Ch0, Ch1, . . . . Ch41.

For example, when the stylus pen 50 is disposed between a second channel Ch2 and a third channel Ch3 among the 42 channels Ch0, Ch1, . . . . Ch41, the control unit 300 may control a pen driving signal to be outputted to one or more channels disposed at a side of the second channel Ch2 based on the stylus pen 50 and a pen driving signal having an inverted phase of the above-described pen driving signal to one or more channels disposed at a side of the third channel Ch3 based on the stylus pen 50.

In the stylus sensing mode (or stylus downlink mode), the control unit 300 may electrically connect the plurality of sensing circuit units 330 for stylus sensing to the plurality of first patterns 101A and the plurality of third patterns 103A of the sensor unit 100A. The control unit 300 may control the plurality of switches to electrically connect the conductive patterns connected to the plurality of first and third patterns 101A and 103A with the plurality of sensing circuit units 330.

The touch input device 500 according to an embodiment of the present invention has an advantage in that an output voltage value of the plurality of sensing circuit units 330 is hardly changed according to the position of the stylus pen on the sensor unit 100A in the stylus sensing mode due to the configuration of the sensor unit 100A. A specific principle for this will be described with reference to FIGS. 26A to 26F.

FIGS. 26A to 26F are schematic views for explaining an operation principle of the stylus sensing mode in the touch input device of FIG. 24.

Figure 26A:
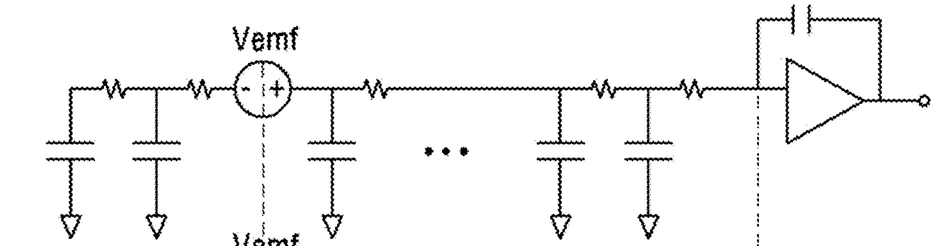
FIGS. 26A to 26F are schematic views for explaining an operation principle of a stylus sensing mode in the touch input device of FIG. 24.
Figure 26B:
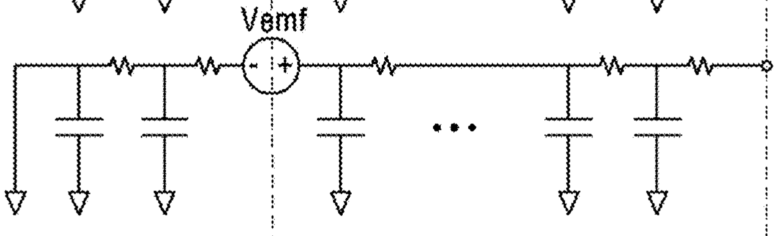
Figure 26C:
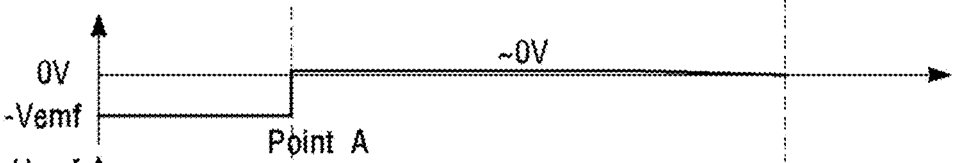

FIG. 26A is a schematic circuit diagram of modeling one first pattern 101A in FIG. 24 and the sensing circuit unit of the control unit 300 electrically connected thereto, and FIG. 26B is a schematic circuit diagram of modeling the second pattern 102A disposed in one first pattern 101A. FIG. 26C is a voltage distribution graph in the circuit diagram of FIG. 26A, and FIG. 26D is a voltage distribution graph in the circuit diagram of FIG. 26B.

Referring to FIGS. 26A and 26C, when the stylus pen approaches an arbitrary point A spaced away from the sensing circuit unit 330 on the first pattern 101A, a voltage $V_{emf}$ (hereinafter, referred to as an 'induced voltage') induced by a signal emitted from the stylus pen is generated at the corresponding point A. When the induced voltage $V_{emf}$ is generated at the point A, since an equivalent capacitance of the first pattern 101A viewed from the point A to the left side decreases, an equivalent impedance increases. Thus, as most of the induced voltage $V_{emf}$ is applied to the left side of the point A, and a voltage of about 0 V is applied to the right side of the point A, almost no current flows. Furthermore, as the voltage of about 0 V applied to the right side of the point A gradually decreases by equivalent resistances of the first pattern 101A, almost no voltage is applied to an input terminal of the sensing circuit unit.

Figure 26D:
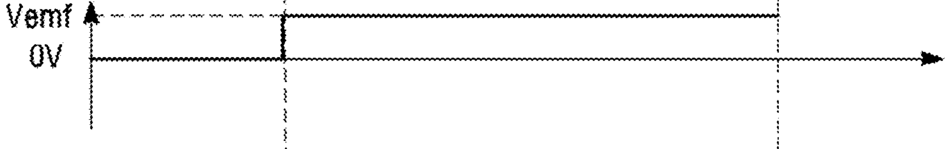

Referring to FIGS. 26B and 26D, when the induced voltage $V_{emf}$ is generated at the point A, since the other ends of each second pattern 102A are electrically connected to each other on the left side of the point A, an equivalent capacitance viewed from the point A to the left side increases, and an equivalent impedance approaches almost 0. Thus, a voltage of 0 V is applied to the left side of the point A, and the voltage $V_{emf}$ is applied to the right side of the point A without causing a voltage drop at equivalent resistors because one end of the second pattern 102A is opened.

Figure 26E:
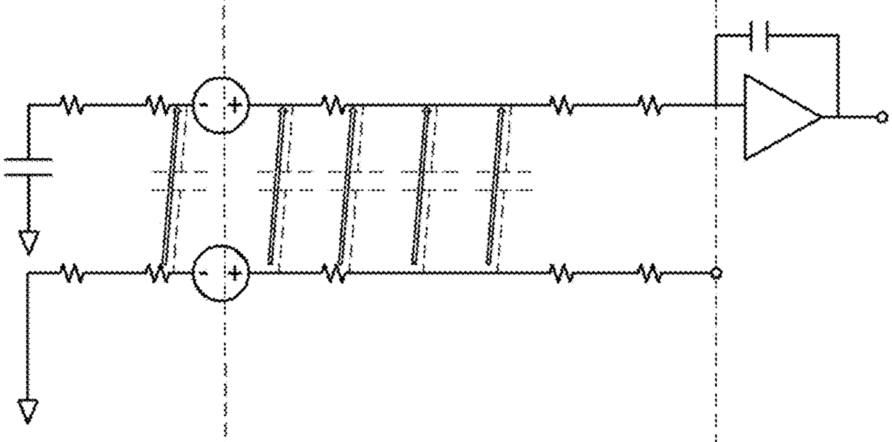

When FIGS. 26C and 26D are compared, it may be known that a potential difference as much as the voltage $V_{emf}$ exists at any position between the first pattern 101A and the second pattern 102A. The potential difference as much as the voltage $V_{emf}$ between the first pattern 101A and the second pattern 102A causes capacitive coupling between the first pattern 101A and the second pattern 102A. As illustrated in FIG. 26E, current flows from the second pattern 102A to the first pattern 101A by the capacitive coupling. Although current generated from the first pattern 101A itself gradually decreases as a distance from the position of the stylus pen to the sensing circuit unit of the control unit 300 increases, since current is introduced to the first pattern 101A from the second pattern 102A, current outputted from the first pattern 101A to the sensing circuit unit 330 of the control unit 300 has almost no difference from the position of the pen. Thus, the control unit 300 may sense the position of the stylus pen through the sensing circuit unit 330 electrically connected to the first pattern 101A.

As illustrated in FIGS. 26A to 26E, it may be known that a potential difference between the first pattern 101A and the second pattern 102A is constant as the voltage $V_{emf}$ although the point A moves to the left or right side. Thus, the control unit 300 may sense the stylus pen from a constant signal outputted from the sensing circuit unit 330 regardless of whether the position of the stylus pen on the sensor unit 100A is close to or far from the sensing circuit unit.

Although the current is introduced to the first pattern 101A from the second pattern 102A by the capacitive coupling in a description of FIG. 26E, the embodiment of the present invention is not limited thereto. For example, current may be also introduced to the first pattern 101A from the second pattern 102A by magnetic coupling (magnetic field coupling).

The principle of FIGS. 26A to 26E described above is directly applied to any one of the third pattern 103 and the fourth pattern 104 in the second direction. Also, the principle is directly applied to the touch input device according to the first embodiment in FIG. 16.

Figure 26F:
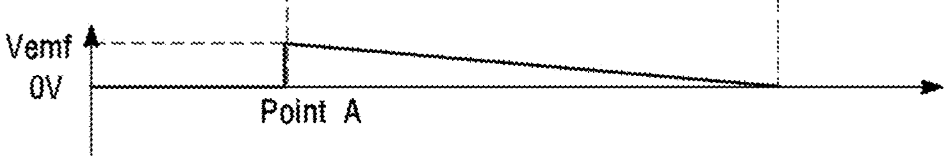

FIG. 26F is a voltage distribution graph when the sensing circuit unit 330 is connected to a right open terminal of the modeled circuit diagram of the second pattern 102A in FIG. 26B. That is, the voltage distribution graph of FIG. 26F illustrates a case in which one end of the second pattern 102A is connected to the sensing circuit unit 330 of the control unit 300. When FIGS. 26D and 26F are compared, in case of FIG. 26F, a voltage drop is gradually generated by equivalent resistors in a direction toward the right side of the point A. Thus, in the case of FIG. 26F, since a potential difference as much as the voltage $V_{emf}$ between the first pattern and the second pattern is not maintained, current may not flow from the second pattern to the first pattern as with FIG. 26E. Thus, the current outputted from the first pattern gradually decreases as the position of the pen moves away from the control unit 300. In the stylus sensing mode, one end of the second pattern 102A may be opened and floated.

While there is no problem when the screen of the touch input device in FIGS. 26A to 26F has a size of the screen of the smartphone, e.g., 6.9 inches, when the size of the screen of the touch input device in FIGS. 26A to 26F increases to 10 inches or 14 inches that is the size of the screen of a tablet PC, the sensor unit 100A also increases, so that a resistance value and a capacitance value of the sensor unit 100A increase. The increase in the resistance and capacitance values causes the operating frequency bandwidth of each of the touch drive signal applied to the touch drive electrode and the pen drive signal for driving the stylus pen to be much narrower than that of the smartphone (6.9 inches). Thus, an operating frequency bandwidth required for design is not obtained.

In addition, the pen sensing signal received from the stylus pen is also attenuated as much as the sensor unit 100A increases. In particular, a voltage value necessary for design is not outputted from the sensor unit 100A because the pen sensing signal at a portion farthest from the control unit 300 is attenuated in a process of being transmitted to the control unit 300.

Hereinafter, touch input devices capable of solving the above-described limitations will be described.

Figure 27:
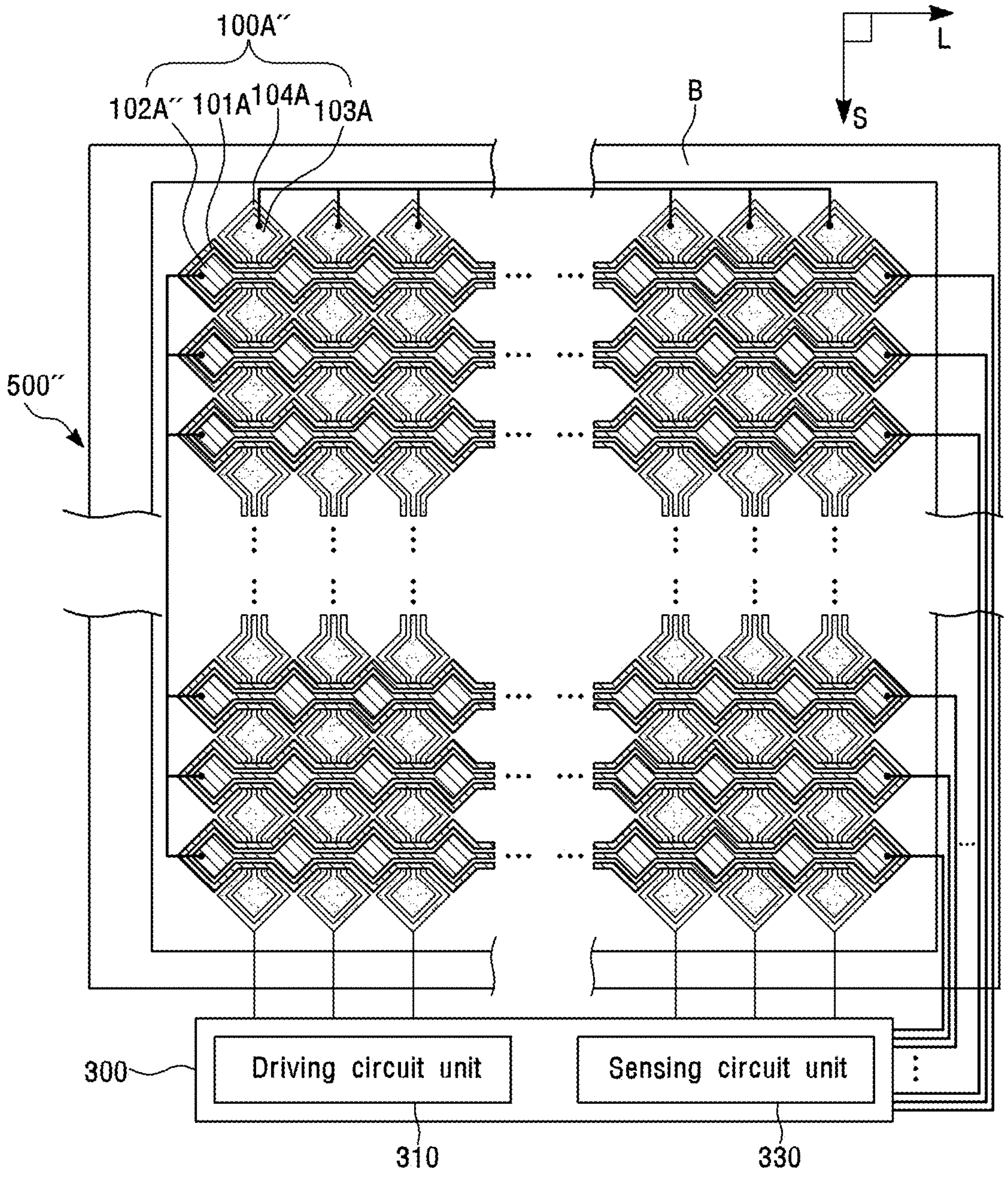
FIG. 27 is a view illustrating the touch input device in FIG. 21 in detail.

FIG. 27 is a view illustrating the touch input device in FIG. 21 in detail.

Referring to FIG. 27, a touch input device 500" may include a sensor unit 100A" and the control unit 300 for controlling the sensor unit 100A".

The sensor unit 100A" includes the plurality of first to fourth patterns 101A, 102A", 103A, and 104A. Here, since the plurality of first, third, and fourth patterns 101A, 103A, and 104A are the same as the plurality of first, third, and fourth patterns 101A, 103A, and 104A illustrated in FIG. 24, a description thereof will be omitted.

Hereinafter, the plurality of second patterns 102A" will be described, an a description on the same portion as the plurality of second patterns 102A of FIGS. 12A and 12B will be omitted for convenience.

Each of one ends (first ends) of the plurality of second patterns 102A" may be electrically connected to the control unit 300 by a conductive pattern. This aspect is different from the plurality of second patterns 102A.

The other ends (second ends) of the plurality of second patterns 102" are electrically connected to each other through a conductive pattern. Here, each of the one ends is relatively close to the control unit 300, and each of the other ends is relatively far from the control unit 300.

An operation mode of the touch input device 500" in FIG. 27 will be described in detail.

In the touch driving/sensing mode, the control unit 300 may electrically connect the plurality of driving circuit units 310 to the plurality of first patterns 101A of the sensor unit 100A" for sensing a position of a touch of an object such as a finger. The control unit 300 may control a plurality of switches to electrically connect the conductive patterns connected to the plurality of first patterns 101A with the plurality of driving circuit units 310.

Also, the control unit 300 may electrically connect the plurality of sensing circuit units 330 for sensing a position of a touch to the plurality of third patterns 103A of the sensor unit 100A". The control unit 300 may control a plurality of switches to electrically connect the conductive patterns connected to the plurality of third patterns 103A with the plurality of sensing circuit units 330.

In the driving/touch sensing mode, the control unit 300 simultaneously or sequentially applies a driving signal (or touch driving signal) for touch sensing to the plurality of first patterns 101A and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the output voltage value to detect a touch position.

In the antenna driving mode (or stylus driving mode, or stylus uplink mode), the control unit 300 may electrically connect the plurality of driving circuit units 310 for antenna driving to the plurality of second patterns 102A" of the sensor unit 100A". The control unit 300 may control a plurality of switches to electrically connect the conductive patterns connected to the plurality of second patterns 102A" with the plurality of driving circuit units 310.

The control unit 300 may control a driving signal (or pen driving signal) outputted from each driving circuit unit 310 connected to the plurality of second patterns 102A". The control unit 300 may control opposite pulse signals to be outputted from two random driving circuit units among the plurality of driving circuit units 310 electrically connected to the plurality of second patterns 102A". Thus, the control unit 300 may variously change and set a size and a position of the current loop.

In the stylus sensing mode (or stylus downlink mode), the control unit 300 may electrically connect the plurality of sensing circuit units 330 for stylus sensing to the plurality of second patterns 101A" and the plurality of third patterns 103A of the sensor unit 100A". This aspect is different from the stylus sensing mode of the touch input device in FIGS. 12A and 12B.

The control unit 300 may control a plurality of switches to electrically connect the conductive patterns connected to the plurality of second patterns 101A" and the plurality of third patterns 103A with the plurality of sensing circuit units 330.

When compared with the touch input device in FIG. 24, the touch input device 500" in FIG. 27 is different in that the plurality of second patterns 102A" of the sensor unit 100A" is connected to the control unit 300. That is, the plurality of second patterns 102A of FIG. 24 are connected to the control unit 300 through the second conductive pattern after two adjacent second patterns are electrically connected by the first conductive pattern, each of the plurality of second patterns 102A" of FIG. 27 is connected to the control unit 300 by a conductive pattern. This configuration feature has a disadvantage in that the number of channels of the touch input device 500" in FIG. 27 increases compared to the touch input device 500 in FIG. 24, but has an advantage of reducing power consumption because the pen driving signal is applied only to a specific portion at which the stylus pen is disposed in the antenna mode for driving the stylus pen.

Also, while in the touch input device 500 in FIG. 24, in the stylus sensing mode, a pattern for sensing a signal emitted from the stylus pen is the plurality of first patterns 101A in the major axis direction L and the plurality of third patterns 103A in the minor axis direction S, in the touch input device 500" in FIG. 27, in the stylus sensing mode, a pattern for sensing a signal emitted from the stylus pen is the plurality of second patterns 102A" in the major axis direction L and the plurality of third patterns 103A in the minor axis direction S.

When the in the touch input device 500" in FIG. 27, in the stylus sensing mode, a pattern for sensing a signal emitted from the stylus pen is the plurality of second patterns 102A" in the major axis direction L instead of the plurality of first patterns 101A, coupling capacitance between the first patterns 101A and the second patterns 102A" may be reduced compared to the touch input device 500 in FIG. 24. Thus, an operating frequency bandwidth of the touch driving signal and the touch sensing signal for sensing a touch position may be improved, and an operating frequency bandwidth of the pen driving signal for driving the stylus pen may be improved.

Also, since the control unit 300 receives the pen sensing signal from the stylus pen through the plurality of second patterns 102A" in the stylus pen sensing mode, a voltage value of the received pen sensing signal is relatively high. Particularly, since, in the major axis direction L, a voltage value of the pen sensing signal received from a point spaced farthest from the control unit 300 is relatively greater than that in case of FIG. 24, sensing sensitivity may be improved. This is because the capacitive coupling between the first pattern 101A and the second pattern 102A is unnecessary to be considered. Specifically, in case of FIG. 24, as described above in FIG. 26E, since current flows from the second pattern 102A to the first pattern 101A by the capacitive coupling between the first pattern 101A and the second pattern 102A, the pen sensing signal inputted to the control unit 300 through the first pattern 101A is attenuated. However, since in the touch input device 500" in FIG. 27, the pen sensing signal is directly inputted to the control unit 300 through the second pattern 102A" instead of the first pattern 101A without the capacitive coupling, the attenuation of the pen sensing signal caused by the capacitive coupling does not occur.

Also, since each of the plurality of second patterns 102A" is one channel, when the plurality of second patterns 102A" are used as the stylus driving electrode (Stylus TX), a distance between the channels is reduced by half, and the stylus driving resolution is improved.

Figure 28:
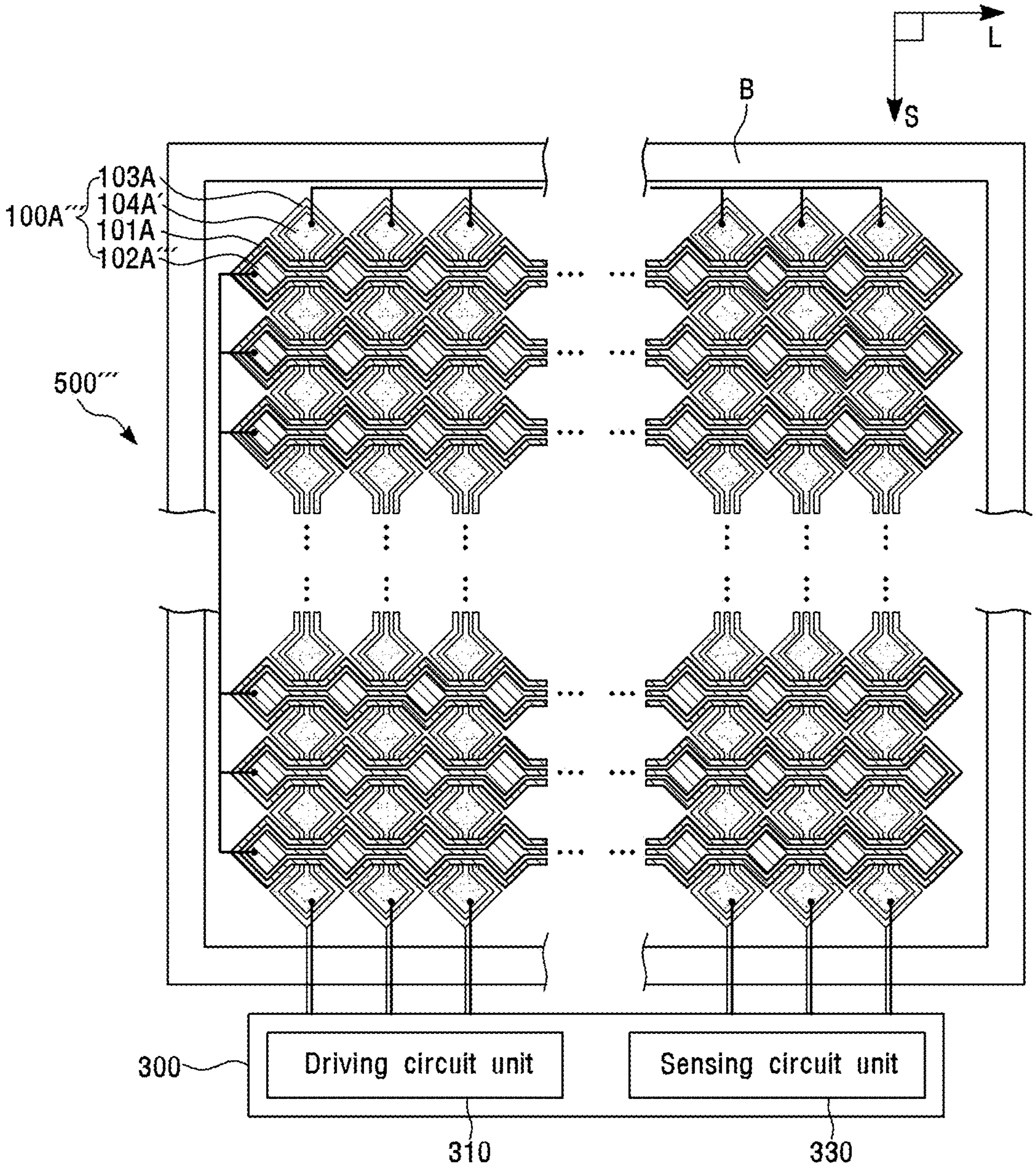
FIG. 28 is a view illustrating the touch input device in FIG. 22 in detail.

FIG. 28 is a view illustrating the touch input device in FIG. 22 in detail;

Referring to FIG. 28, a touch input device 500' may include a sensor unit 100A" and a control unit 300 for controlling the sensor unit 100A".

The sensor unit 100A" includes a plurality of first to fourth patterns 101A, 102A", 103A, and 104A'. Here, since the plurality of first and third patterns 101A and 103A are the same as the plurality of first and third patterns 101A and 103A in FIG. 24, a description thereof will be omitted.

Hereinafter, while the plurality of second and fourth patterns 102A" and 104A' are described, a description on the same portions as the plurality of second and fourth patterns 102A and 104A of FIG. 24 will be omitted for convenience.

One ends of the plurality of second patterns 102A'" are floated, the other ends of the plurality of second pattern 102A" may be electrically connected to each other through a conductive pattern. Here, each of the one ends is relatively close to the control unit 300, and each of the other ends is relatively far from the control unit 300.

Each of one ends of the plurality of fourth patterns 104A' is electrically connected to the control unit 300 through a conductive pattern, the other ends of the plurality of fourth patterns 104A' are electrically connected to each other through a conductive pattern. Here, each of the one ends is relatively close to the control unit 300, and each of the other ends is relatively far from the control unit 300.

An operation mode of the touch input device 500" in FIG. 28 will be described in detail.

In the touch driving/sensing mode, the control unit 300 may electrically connect the plurality of driving circuit units 310 to the plurality of first patterns 101A of the sensor unit 100A'" for sensing a position of a touch of an object such as a finger. The control unit 300 may control a plurality of switches to electrically connect the conductive patterns connected to the plurality of first patterns 101A with the plurality of driving circuit units 310.

Also, the control unit 300 may electrically connect the plurality of sensing circuit units 330 for sensing a position of a touch to the plurality of third pattern 103A of the sensor unit 100A'". The control unit 300 may control a plurality of switches to electrically connect the conductive patterns connected to the plurality of third patterns 103A with the plurality of sensing circuit units 330.

In the driving/touch sensing mode, the control unit 300 simultaneously or sequentially applies a driving signal (or touch driving signal) for touch sensing to the plurality of first patterns 101A and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the output voltage value to detect a touch position.

In the antenna driving mode (or stylus driving mode, or stylus uplink mode), the control unit 300 may electrically connect the plurality of driving circuit units 310 for antenna driving to the plurality of fourth patterns 104A' of the sensor unit 100A'''. The control unit 300 may control a plurality of switches to electrically connect the conductive patterns connected to the plurality of fourth patterns 104A' with the plurality of driving circuit units 310.

The control unit 300 may control a driving signal (or pen driving signal) outputted from each driving circuit unit 310 connected to the plurality of fourth patterns 104A'. The control unit 300 may control opposite driving signals to be outputted from two random driving circuit units among the plurality of driving circuit units 310 electrically connected to the plurality of fourth 104A'. Thus, the control unit 300 may variously change and set a size and a position of the current loop.

In the stylus sensing mode (or stylus downlink mode), the control unit 300 may electrically connect the plurality of sensing circuit units 330 for stylus sensing to the plurality of first patterns 101A of the sensor unit 100A" and the plurality of fourth patterns 104A'. This aspect is different from the stylus sensing mode of the touch input device in FIG. 24.

The control unit 300 may control a plurality of switches to electrically connect the conductive patterns connected to the plurality of first patterns 101A and the plurality of fourth patterns 104A' with the plurality of sensing circuit units 330.

When compared with the touch input device in FIG. 24, the touch input device 500" in FIG. 28 is different in that the plurality of second patterns 102A" of the sensor unit 100A" are not used to electrically float and drive the stylus pen through the plurality of fourth patterns 104A'. This configuration has a disadvantage in that the number of channels of the touch input device 500" in FIG. 28 increases compared to that of the touch input device 500 in FIG. 24, but has an advantage in that conductive patterns connected to the one ends of the plurality of second patterns 102A are not provided because the plurality of second patterns 102A are not used. Thus, a thickness of the left/right bezel B may be remarkably reduced compared to that of FIG. 24.

The touch input device in FIG. 28 has a disadvantage in that the number of total channels slightly increases compared to the touch input device in FIG. 24, but has an advantage in that a voltage value of the stylus pen sensing signal received by the control unit 300 increases because the pen sensing signal emitted from the stylus pen is directly received through the plurality of fourth patterns 104A'. The voltage value of the pen sensing signal received by the control unit 300 of the touch input device in FIG. 24 increases by approximately two times.

Also, since each of the plurality of fourth patterns 104A' is one channel, when the plurality of fourth patterns 104A' are used as the stylus driving electrode (Stylus TX), a distance between the channels is reduced by half than the touch input device of FIG. 24, and the stylus driving resolution is improved.

Figure 29:
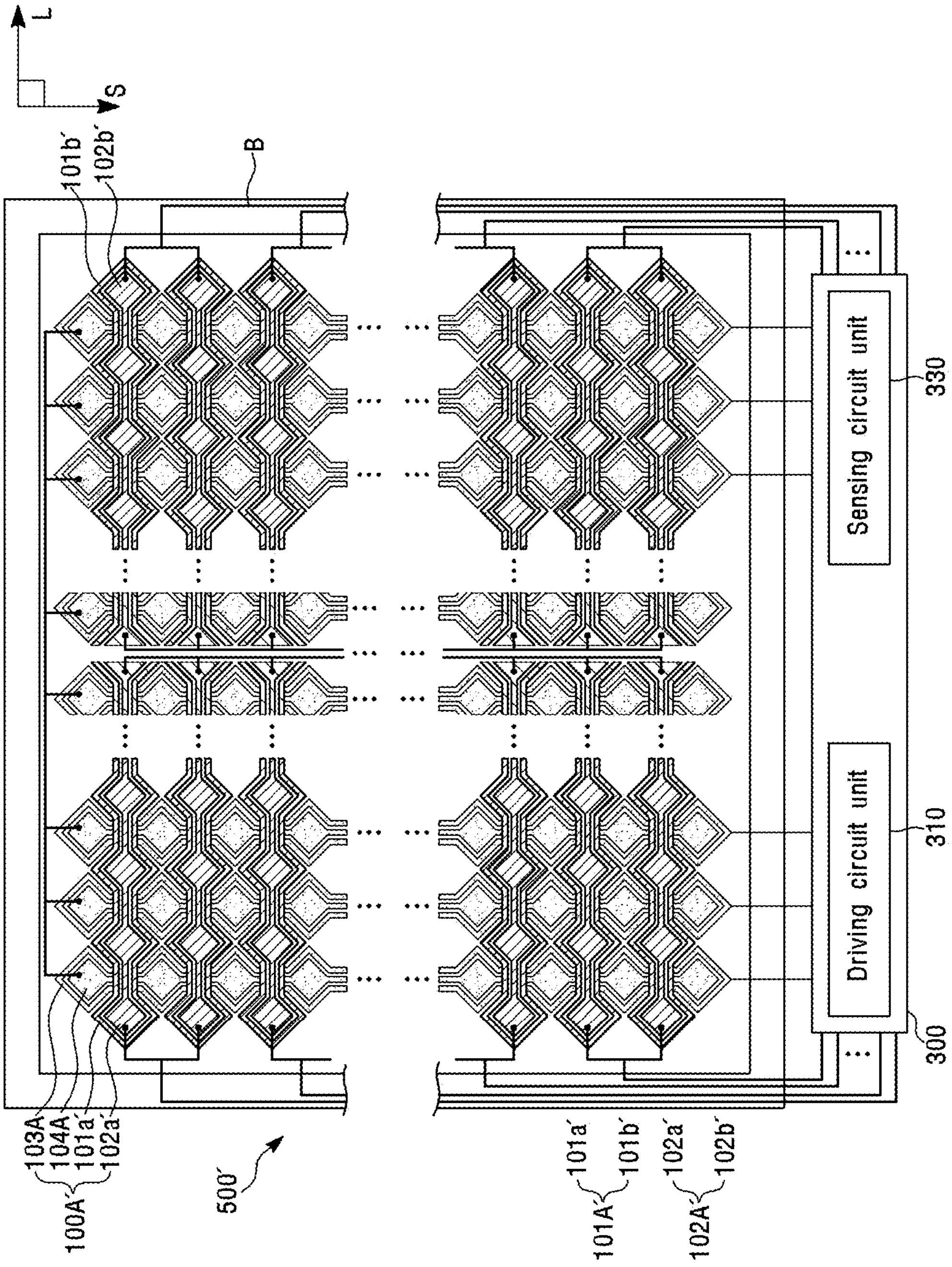
FIG. 29 is a view illustrating the touch input device in FIG. 23 in detail.

Also, since the number of the TX trace channels may be reduced to ¼ to ⅓ compared to the touch input device in FIG. 24, a thickness of a bezel B may be reduced. FIG. 29 is a view illustrating the touch input device in FIG. 23 in detail:

Referring to FIG. 29, a touch input device 500' may include a sensor unit 100A" and the control unit 300 for controlling the sensor unit 100A'

The sensor unit 100A" includes the plurality of first to fourth patterns 101A', 102A', 103A, and 104A. Here, since the plurality of third and fourth patterns 103A and 104A are the same as the plurality of third and fourth patterns 103A and 104A in FIG. 24, a description thereof will be omitted.

Hereinafter, the plurality of first and second patterns 101A' and 102A' will be described, and a description on the same portion as the plurality of first and second patterns 101A and 102A of FIG. 24 will be omitted for convenience.

The first pattern 101A' has a shape extending in the first direction. The first direction may be a major axis direction L of the screen of the touch input device. The first pattern 101A' includes a first-a pattern 101*a*' and a first-b pattern 101*b*'. The first-a pattern 101*a*' and the first-b 101*b*' are arranged along the first direction and spaced a predetermined distance from each other. The first pattern 101A' including the first-a pattern 101*a*' and the first-b 101*b*' may be referred to as Active TX (ATX).

The second pattern 102A' has a shape extending in the first direction, is disposed adjacent to the first pattern 101A' and is spaced a predetermined distance from the first pattern 101A'. The second pattern 102A' includes a second-a pattern 102*a*' and a second-b pattern 102*b*'. The second-a pattern 102*a*' and the second-b 102*b*' are arranged along the first direction and spaced a predetermined distance from each other. The second pattern 102A' including the second-a pattern 102*a*' and the second-b 102*b*' may be referred to as Dummy TX (DTX).

In the plurality of first patterns 101A', a plurality of first-a patterns 101*a*' have one ends electrically connected to the control unit 300 and the other ends that are electrically opened. Also, a plurality of first-b patterns 101*b*' have one ends electrically connected to the control unit 300 and the other ends that are electrically opened. Here, each of the one ends is relatively close to the control unit 300, and each of the other ends is relatively far from the control unit 300.

The respective one ends of the plurality of first-a patterns 101*a*' may be electrically connected to each other through the control unit 300 and a conductive pattern. The conductive patterns connecting the plurality of first-a patterns 101*a*' and the control unit 300 may be arranged along a minor axis direction S in the bezel B of the touch input device 500'.

The one ends of the plurality of first-b patterns 101*b*' may be electrically connected to each other through the control unit 300 and a conductive pattern. The conductive patterns connecting the plurality of first-b patterns 101*b*' and the control unit 300 may be arranged along the minor axis S in the bezel B of the touch input device 500.

In the plurality of second patterns 102A', two adjacent one ends of the one ends of the plurality of second-a patterns 102*a*' are electrically connected to each other by a first conductive pattern and then electrically connected to the control unit 300 through a second conductive pattern, and the other ends of the plurality of second-a patterns 102*a*' are electrically connected to each other through the conductive pattern. Likewise, two adjacent one ends of the one ends of the plurality of second-b patterns 102*b*' are electrically connected to each other and then electrically connected to the control unit 300 through the second conductive pattern, and the other ends of the plurality of second-b patterns 102*b*' are electrically connected to each other through the conductive pattern. Here, each of the one ends is relatively close to the control unit 300, and each of the other ends is relatively far from the control unit 300.

The second conductive patterns connecting the plurality of second-a and second-b patterns 102*a*' and 102*b*' and the control unit 300 are arranged along the minor axis direction S in the bezel B of the touch input device 500'. Here, the second conductive patterns connecting the plurality of second-a and second-b patterns 102*a*' and 102*b*' and the control unit 300 may be arranged in the bezel B of the of the touch input device 500' together with conductive patterns (not shown) connecting the plurality of first patterns 101A' and the control unit 300.

When the other ends of the plurality of second-a patterns 102*a*' are electrically connected to each other, a total impedance is reduced because capacitances for respective second-a patterns 102*a*' are added. Thus, an effect in which each of the other ends of the plurality of second-a patterns 102*a*' is AC GND is obtained. Likewise, when the other ends of the plurality of second-b patterns 102*b*' are electrically connected to each other, a total impedance is reduced because capacitances for respective second-b patterns 102*b*' are added. Thus, an effect in which each of the other ends of the plurality of second-b patterns 102*b*' is AC GND is obtained.

An operation mode of the touch input device 500' in FIG. 29 will be described in detail.

In the touch driving/sensing mode, the control unit 300 may electrically connect the plurality of driving circuit units 310 to the plurality of first patterns 101A' of the sensor unit 100A' for sensing a position of a touch of an object such as a finger. The control unit 300 may control a plurality of switches to electrically connect the conductive patterns connected to the plurality of first patterns 101A' with the plurality of driving circuit units 310.

Also, the control unit 300 may electrically connect the plurality of sensing circuit units 330 for sensing a position of a touch to the plurality of third patterns 103A of the sensor unit 100A'. The control unit 300 may control a plurality of switches to electrically connect the conductive patterns connected to the plurality of third patterns 103A with the plurality of sensing circuit units 330.

In the touch driving/sensing mode, the control unit 300 simultaneously or sequentially applies a driving signal (or touch driving signal) for touch sensing to the plurality of first patterns 101A' and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the output voltage value to detect a touch position.

In the antenna driving mode (or stylus driving mode, or stylus uplink mode), the control unit 300 may electrically connect the plurality of driving circuit units for antenna driving to the plurality of second a patterns 102*a*' and the plurality of second b patterns 102*b*' of the sensor unit 100A'. The control unit 300 may control a plurality of switches to electrically connect the conductive patterns connected to the plurality of second-a patterns 102*a*' and the plurality of second-b patterns 102*b*' with the plurality of driving circuit units 310.

The control unit 300 may control a driving signal (or pen driving signal) outputted from each driving circuit unit 310 connected to the plurality of second-a patterns 102*a*' and the plurality of second-b patterns 102*b*'. The control unit 300 may control opposite pulse signals to be outputted from two random driving circuit units among the plurality of driving circuit units 310 electrically connected to the plurality of second-a patterns 102*a*' and the plurality of second-b patterns 102*b*'. Thus, the control unit 300 may variously change and set a size and a position of the current loop.

In the stylus sensing mode (or stylus downlink mode), the control unit 300 may electrically connect the plurality of sensing circuit units 330 for stylus sensing to the plurality of first patterns 101A' and the plurality of third patterns 103A' of the sensor unit 100A'. The control unit 300 may control a plurality of switches to electrically connect the conductive patterns connected to the plurality of first patterns 101A' and the plurality of third patterns 103A with the plurality of sensing circuit units 330.

The touch input device 500' in FIG. 29 is different from the touch input device in FIG. 24 in configuration of the plurality of first and second patterns 101A' and 102A' of the sensor unit 100A'. That is, since the plurality of first and second patterns 101A' and 102A' are obtained by dividing the first and second patterns 101A and 102A of FIG. 24 into half, the number of the plurality of first and second patterns 101A' and 102A' is two times greater than that of the first and second patterns 101A and 102A of FIG. 24.

This configuration feature has a disadvantage in that the number of channels of the touch input device 500' in FIG. 29 increases compared to the touch input device 500 in FIG. 24, but has an advantage of reducing power consumption because the pen driving signal is applied only to a specific portion at which the stylus pen is disposed in the antenna mode for driving the stylus pen.

The touch input device in FIG. 29 has a disadvantage in that the number of channels slightly increases compared to the touch input device in FIG. 24, but has an advantage in that an operating frequency bandwidth of each of the touch driving signal applied to the touch driving electrode and the pen driving signal for driving the stylus pen is widened by reducing a resistance value and a capacitance value of the sensor unit 100A' because a length of each of the first pattern 101A' and the second pattern 102A' is reduced by half.

Figure 30:
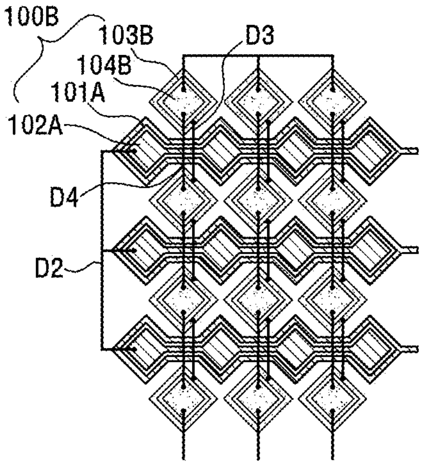
FIG. 30 is a schematic view illustrating a sensor unit according to a modified example, which may replace the sensor unit according to the above-described various embodiments.

FIG. 30 is a schematic view illustrating a modified example of the sensor units 100 and 100' in FIG. 16 or 19.

A sensor unit 100B in FIG. 30 may be used as the above-described sensor units of the touch input devices according to various embodiments of the present invention. Hereinafter, a specific structure and shape of the sensor unit 100B will be described, and a description on a method for driving a touch input device including the sensor unit 100B will be replaced by the above-described features.

Referring to FIG. 30, the sensor unit 100B includes a plurality of first to fourth patterns 101A, 102A, 103B, and 104B. The plurality of first to fourth patterns 101A, 102A, 103B, and 104B are arranged together on the same layer.

The first pattern 101A has a shape extending in a first direction (width direction). The first direction may be a direction of a major axis of the screen of the touch input device. The first pattern 101A may also be referred to as Active TX (ATX). The first pattern 101A has a predetermined shape in which an electrical path is formed along the first direction (width direction).

The first pattern 101A may include a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The first pattern 101A may have an opening in which the second pattern 102A is disposed. The opening may have a shape corresponding to an outer shape of the first pattern 101A. The first pattern 101A may have a structure surrounding the second pattern 102A. The first pattern 101A is spaced a predetermined distance from the second pattern 102A.

The second pattern 102A has a shape extending in the first direction, is disposed adjacent to the first pattern 101A, and is spaced a predetermined distance from the first pattern 101A. The second pattern 102A may also be referred to as Dummy TX (DTX). The second pattern 102A may be disposed adjacent to the first pattern 101A and have a predetermined shape in which an electrical path is formed along the first direction (width direction).

The second pattern 102A is disposed in the first pattern 101A.

The second pattern 102A may include a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the second pattern 102A may have a shape corresponding to that of the main pattern part of the first pattern 101A, and the connection pattern part of the second pattern 102A may have a shape corresponding to that of the connection pattern part of the first pattern 101A.

The other ends (second ends) of the plurality of second patterns 102A are electrically connected to each other by a second conductive pattern.

The third pattern 103B is disposed on each of upper and lower portions based on one connection pattern part of the first pattern 101A. Here, although the third pattern 103B may have a diamond shape, the embodiment of the present invention is not limited thereto. For example, the third pattern 103B may have various shapes that are different from that of the connection pattern part. The third pattern 103B may have an opening in which the fourth pattern 104B is disposed. The opening may have a shape corresponding to an outer shape of the third pattern 103B. The third pattern 103B may have a structure surrounding the fourth pattern 104B. The third pattern 103B is spaced a predetermined distance from the fourth pattern 104B. The third pattern 103B may also be referred to as Active RX (ARX), and the fourth pattern 104B may also be referred to as Dummy RX (DRX).

The third patterns arranged along the second direction perpendicular to the first direction among the plurality of third patterns 103B are electrically connected by a third conductive pattern D3. Thus, the third patterns arranged along the second direction may be electrically connected by a plurality of third conductive patterns D3 and equal to an electrical connection direction (electrical path) of the third pattern 103 in FIG. 16 or 19.

The third conductive pattern D3 is arranged so as to cross the connection pattern part of the first pattern 101A disposed between two adjacent third patterns. The third conductive pattern D3 may also be referred to a conducive bridge. Both ends of the third conductive pattern D3 are connected to a via connected to the third pattern 103B.

The fourth patterns arranged along the second direction perpendicular to the first direction among the plurality of fourth patterns 104B are electrically connected by a fourth conductive pattern D4. Accordingly, the fourth patterns arranged along the second direction may be electrically connected by a plurality of fourth conductive patterns D4 and equal to an electrical connection direction (electrical path) of the fourth pattern 104 in FIG. 16 or 19.

The fourth conductive pattern D4 is arranged so as to cross the connection pattern part of the first pattern 101A disposed between two adjacent fourth patterns. Also, the fourth conductive pattern D4 is disposed farthest from the control unit among the plurality of fourth patterns 104B and electrically connect the fourth patterns 104B arranged in the first direction. The fourth conductive pattern D4 may also be referred to a conducive bridge. Both ends of the fourth conductive pattern D4 are connected to a via connected to the fourth pattern 104B.

The plurality of first to fourth patterns 101A, 102A, 103B, and 104B may be disposed on the same first layer, and the second to fourth conductive patterns D2, D3, and D4 may be disposed on the same second layer. Here, the first layer and the second layer are physically and electrically spaced apart from each other.

Figure 31:
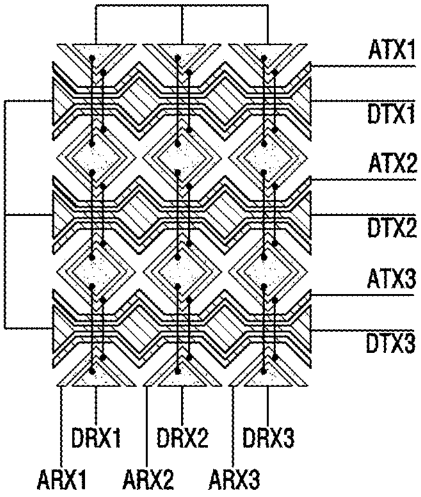
FIG. 31 is a view illustrating a modified example of the sensor unit in FIG. 30.

FIG. 31 is a view illustrating a modified example of the sensor unit in FIG. 30.

Referring to FIG. 31, in a sensor unit, first-1 pattern parts disposed on a first end and/or a second end of the plurality of first-1 pattern parts have a shape opened in the first direction (or horizontal direction). Thus, first-2 pattern parts disposed on the first end and/or the second end of the plurality of first-2 pattern parts may be exposed to the outside.

The first-2 pattern parts disposed on the second end of the plurality of first-2 pattern parts are electrically connected to each other through the connection pattern without the via. Here, the connection pattern may be a conductive trace. When compared with FIG. 30, the first-2 pattern parts disposed on the second end of the plurality of first-2 pattern parts may be disposed on the same layer as the connection pattern instead of being connected through the via.

Also, in the sensor unit, second-1 pattern parts disposed on a first end and/or a second end of the plurality of second-1 pattern parts have a shape opened in the second direction (or vertical direction). Thus, second-2 pattern parts disposed on a first end and/or a second end of the plurality of second-2 pattern parts may be exposed to the outside.

The second-2 pattern parts disposed on the second end of the plurality of second-2 pattern parts are electrically connected to each other through the connection pattern without a via. Here, the connection pattern may be a conductive trace. When compared with FIG. 30, the second-2 pattern parts disposed on the second end of the plurality of second-2 pattern parts may be disposed on the same layer as the connection pattern instead of being connected through the via.

The sensor unit in FIG. 31 may be controlled by the control unit 300 and driven in one of the touch sensing mode, the antenna driving mode, and the stylus sensing mode. Specifically, in case of the touch sensing mode, the control unit 300 may control the touch driving signal to be applied to ATX1, ATX2, and ATX3 and sense a touch position by receiving a touch receiving signal from ARX1, ARX2, and ARX3. In case of the antenna driving mode, the control unit 300 may apply the pen driving signal to DTX1, DTX2, and DTX3 or DRX1, DRX2, and DRX3. In case of the stylus sensing mode, the control unit 300 may sense the position of the stylus pen by receiving the pen receiving signal from ATX1, ATX2, and ATX3 and ARX1, ARX2, and ARX3. Also, the various combinations of the <table 1> may be applied to the sensor unit 200' of FIG. 31. Thus, the sensor unit of FIG. 31 may be driven in one of the touch sensing mode, the antenna driving mode, and the stylus sensing mode through various methods by the control unit 300.

Figure 32:
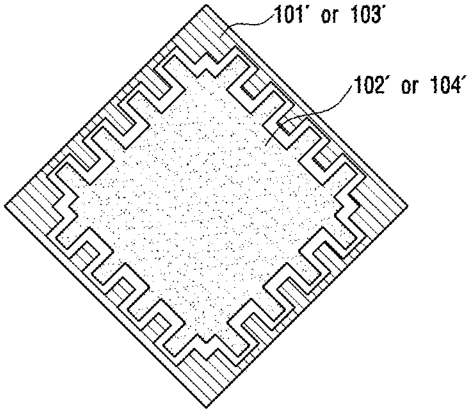
FIG. 32 is a modified example of the sensor unit according to the above-described various embodiments.

FIG. 32 is a view illustrating another modified example of the sensor unit.

Referring to FIG. 32, a structure of a main pattern part of each of first to fourth pattern parts 101', 102', 103', and 104' is different from those of FIG. 24.

In FIG. 32, the second pattern 102' or the fourth pattern 104' has an external shape of an uneven structure, and an opening of the first pattern 101' or the fourth pattern 104' has a shape corresponding to the external structure of the second pattern 102' or the fourth pattern 104'.

This structure may improve a mutual capacitance value Cm between the first pattern 101' and the second pattern 102' on the same layer and a mutual capacitance value Cm between the third pattern 103' and the fourth pattern 104' on the same layer. As the mutual capacitance Cm is improved, a voltage value outputted from the sensing circuit unit of the control unit 300 in the stylus sensing mode may increase. Thus, stylus sensing sensitivity may be improved.

Here, the modified example in FIG. 32 may be directly applied to the sensor units according to the above-described various embodiments.

Figure 33:
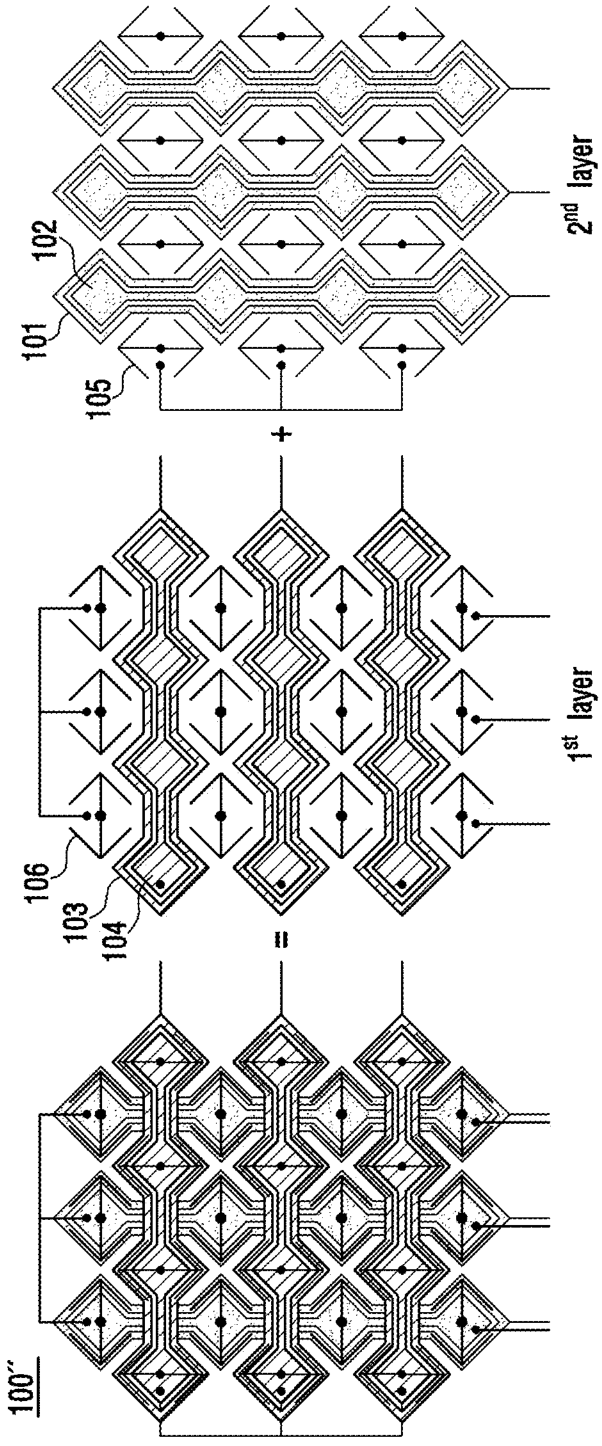
FIG. 33 is a modified example of the sensor unit according to the above-described various embodiments.

FIG. 33 is another modified example of the sensor unit.

When compared with the sensor unit 100A in FIG. 24, a sensor unit 100'' in FIG. 33 further includes a plurality of fifth patterns 105 and a plurality of sixth patterns 106.

The plurality of fifth patterns 105 are disposed on the same layer (2nd layer) as the plurality of first patterns 101 and arranged in the first direction and the second direction.

Each of the fifth patterns 105 has a shape corresponding and overlapping a portion of a main pattern part of the third pattern 103 disposed on another layer (1st layer). Also, the fifth pattern 105 is electrically connected through the via and the fourth pattern 104 disposed on another layer (1st layer).

The plurality of fifth patterns 105 and the plurality of third patterns 103 may form the mutual capacitance Cm in the vertical direction. Also, since the fifth pattern 105 is electrically connected to the fourth pattern 104 in the third pattern 103, the third pattern 103 may form the mutual capacitance Cm with the fifth pattern 105 in addition to the fourth pattern 104.

The plurality of sixth patterns 106 are disposed on the same layer (first layer) as the plurality of third patterns 103 and arranged in the first direction and the second direction.

Each of the sixth patterns 106 has a shape corresponding and overlapping a portion of the main pattern part of the first pattern 101 disposed on another layer (second layer). Also, the sixth pattern 106 is electrically connected through the via and the second pattern 102 disposed on another layer (second layer).

The plurality of sixth patterns 106 and the plurality of first patterns 101 may form the mutual capacitance Cm in the vertical direction. Also, since the sixth pattern 106 is electrically connected to the second pattern 102 in the first pattern 101, the first pattern 101 may form the mutual capacitance Cm with the sixth pattern 106 in addition to the second pattern 102.

As described above, the sensor unit 100'' in FIG. 33 may form the mutual capacitance in the vertical direction as well as the horizontal direction of the first pattern 101 and the mutual capacitance in the vertical direction as well as the horizontal direction of the third pattern 103. Thus, in the stylus sensing mode, the voltage value outputted from the sensing circuit unit of the control unit 300 may increase to improve the stylus sensing sensitivity.

Here, the modified example in FIG. 33 may be directly applied to the sensor units according to the above-described various embodiments.

Figure 34:
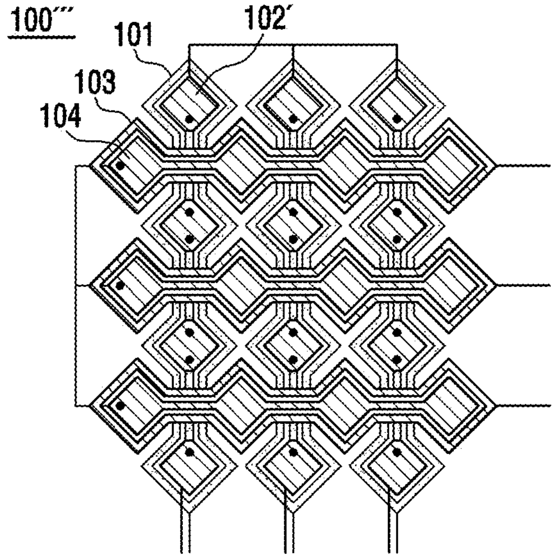
FIG. 34 is a modified example of the sensor unit according to the above-described various embodiments.

FIG. 34 is a view illustrating another modified example of the sensor unit.

When compared with the sensor unit 100A in FIG. 24, in a sensor unit 100''' of FIG. 34, a portion of a second pattern 102' is disposed on a different layer from the rest portion. Specifically, the second pattern 102' includes a plurality of main pattern parts and a connection pattern part connecting two adjacent main pattern parts of the plurality of main pattern parts, and the plurality of main pattern parts of the second pattern 102' are disposed on a different layer from the plurality of connection pattern parts of the second pattern 102'.

The plurality of main pattern parts of the second pattern 102' are disposed on the same layer as the third pattern 103 and the fourth pattern 104, and the plurality of connection pattern parts of the second pattern 102' are disposed on the same layer as the first pattern 100 as with FIG. 24.

The sensor unit 100''' in FIG. 34 may be also driven in the touch sensing mode, the antenna driving mode, and the stylus sensing mode by the control unit 300 as with the sensor unit 100A in FIG. 24. Also, the various combinations of the <table 1> may be applied to the sensor unit 100''' of FIG. 34. Thus, the sensor unit 100''' of FIG. 34 may be driven in one of the touch sensing mode, the antenna driving mode, and the stylus sensing mode through various methods by the control unit 300.

Figure 35:
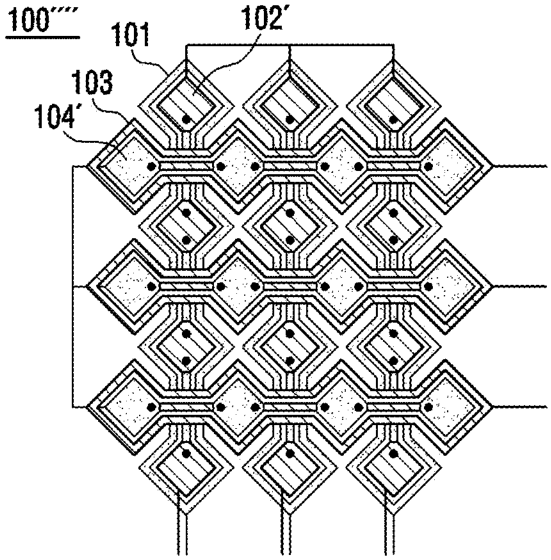
FIG. 35 is a modified example of the sensor unit according to the above-described various embodiments.

FIG. 35 is a view illustrating another modified example of the sensor unit.

When compared with the sensor unit 100''' in FIG. 34, in a sensor unit 100'''' in FIG. 35, a portion of a fourth pattern 104' is disposed on a different layer from the rest portion. Specifically, the fourth pattern 104' includes a plurality of main pattern parts and a connection pattern part connecting two adjacent main pattern parts of the plurality of main pattern parts, and the plurality of main pattern parts of the fourth pattern 104' are disposed on a different layer from the plurality of connection pattern parts of the fourth pattern 104'. The plurality of main pattern parts of the fourth pattern 104' are disposed on the same layer as the first pattern 101, and the plurality of connection pattern parts of the fourth pattern 104' are disposed on the same layer as the plurality of main pattern parts of the second pattern 102' and the third pattern 103.

In summary, in the sensor unit 100'''' in FIG. 35, the first pattern 101, the plurality of connection pattern part of the second pattern 102, and the plurality of main pattern parts of the fourth pattern 104' are disposed on the first layer, and the third pattern 103, the plurality of connection pattern part of the fourth pattern 104', and the plurality of main pattern part of the second pattern 102' are disposed on the second layer. Here, the first layer and the second layer are different from each other, and a position relationship is that one is disposed on the other.

The sensor unit 100'''' in FIG. 35 may be also driven in the touch sensing mode, the antenna driving mode, and the stylus sensing mode by the control unit 300 as with the sensor unit 100A in FIG. 24. Also, the various combinations of the <table 1> may be applied to the sensor unit 100'''' of FIG. 35. Thus, the sensor unit 100'''' of FIG. 35 may be driven in one of the touch sensing mode, the antenna driving mode, and the stylus sensing mode through various methods by the control unit 300.

FIG. 35 is a view illustrating another modified example of the sensor unit.

Figure 36:
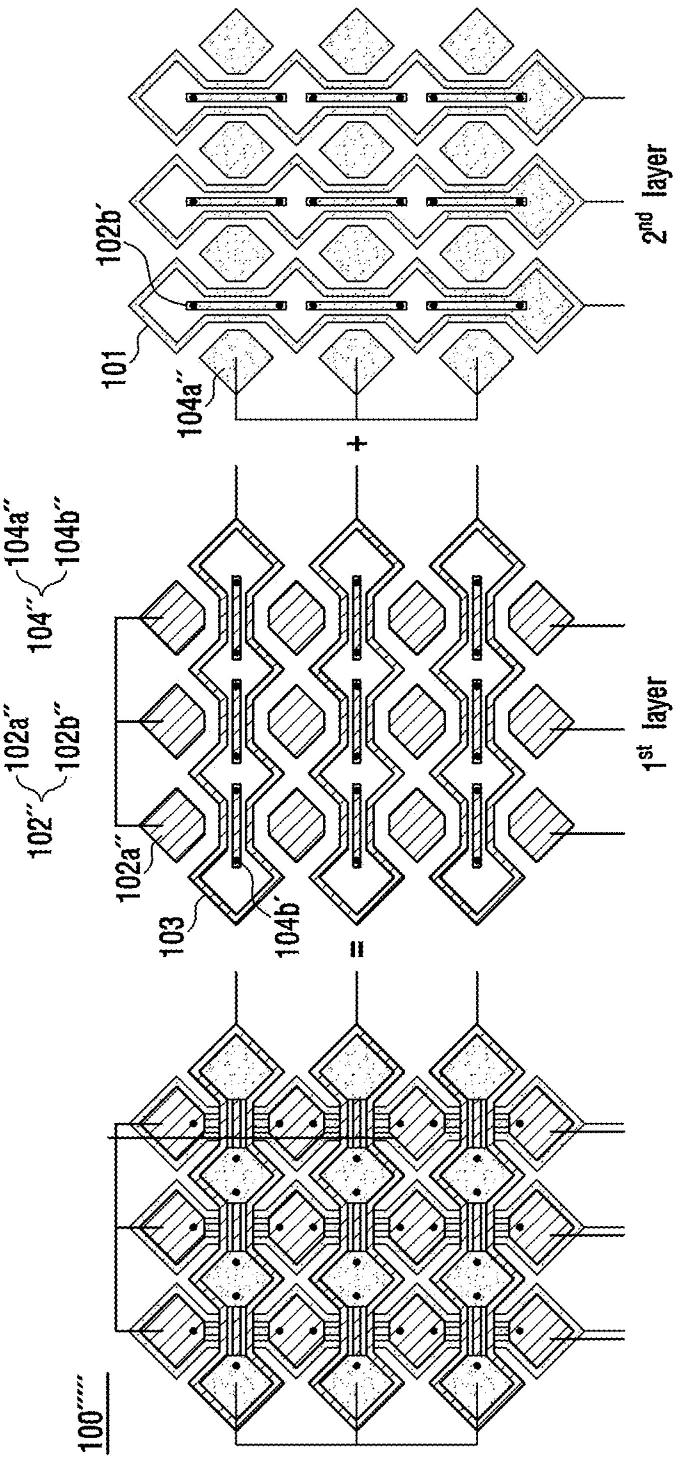
FIG. 36 is a modified example of the sensor unit according to the above-described various embodiments.

A sensor unit 100''''' in FIG. 36 is a modified from the sensor unit 100'''' in FIG. 35. When compared with the sensor unit 100''''' in FIG. 35, the sensor unit 100''''' in FIG. 36 is different in a second pattern 102" and a fourth pattern 104".

Specifically, the second pattern 102" includes a plurality of main pattern parts 102*a*" and a plurality of connection pattern parts 102*b*', and the main pattern part 102*a*" has a size greater than that the main pattern part of the second pattern 102' of the sensor unit 100"" in FIG. 35. The main pattern part 102*a*" may have a size and a shape corresponding to those of the main pattern part of the first pattern 101.

Also, the fourth pattern 104" includes a plurality of main pattern parts 104*a*" and a plurality of connection pattern parts 104*b*', and the main pattern part 104*a*" has a size greater than that of the main pattern part of the fourth pattern 104' of the sensor unit 100"" in FIG. 35. The main pattern part 104*a*" may have a size and a shape corresponding to those of the main pattern part of the third pattern 103.

Since the main pattern part 102*a*" of the second pattern 102" has a size greater than that of the main pattern part of the second pattern 102' in FIG. 35, an area corresponding to the first pattern 101 may increase to further improve the mutual capacitance Cm between the second pattern 102" and the first pattern 101. Thus, the stylus sensing sensitivity may be further improved in the stylus sensing mode.

Since the main pattern part 104*a*" of the fourth pattern 104" has a size greater than that of the main pattern part of the fourth pattern 104' in FIG. 35, an area corresponding to the third pattern 103 may increase to further improve the mutual capacitance Cm between the fourth pattern 104" and the third pattern 103. Thus, the stylus sensing sensitivity may be further improved in the stylus sensing mode.

Figure 37:
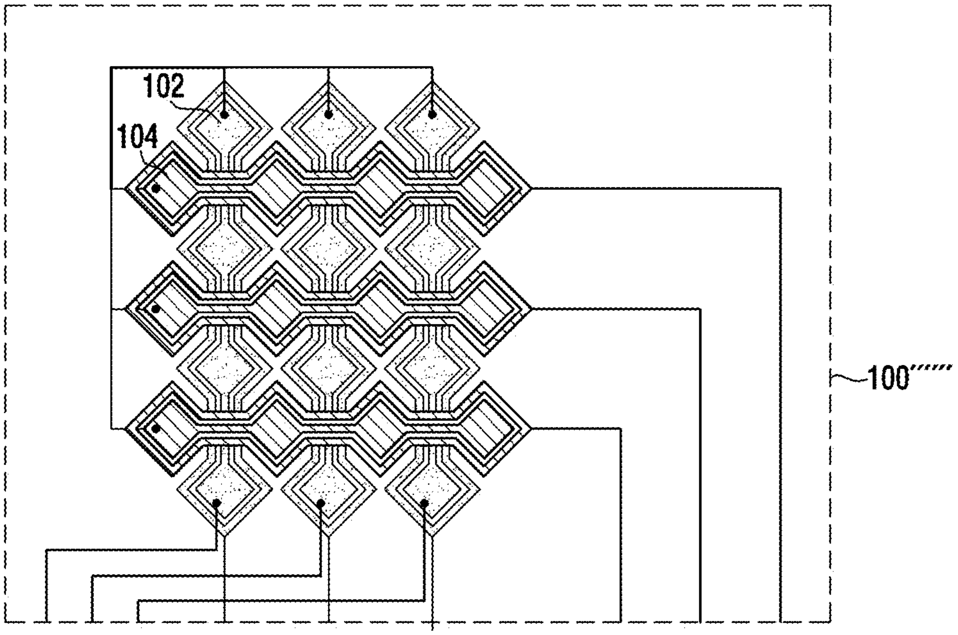
FIG. 37 is a modified example of the sensor unit according to the above-described various embodiments.

FIG. 37 is a view illustrating another modified example of the sensor unit.

When compared with the sensor unit 100A in FIG. 24, a sensor unit 100'''''' in FIG. 37 is different in that the other ends (second ends) of the plurality of second patterns 102 are electrically connected to the other ends (second ends) of the plurality of fourth patterns 104.

This configuration has an advantage of reducing an impedance because the plurality of second patterns 102 as well as other fourth patterns are electrically connected to one fourth pattern 104 when the sensor unit 100' is driven in the stylus sensing mode.

The sensor unit 100'''''' in FIG. 37 may be also driven in the touch sensing mode, the antenna driving mode, and the stylus sensing mode by the control unit 300 as with the sensor unit 100A in FIG. 24. Also, the various combinations of the <table 1> may be applied to the sensor unit 100'''''' of FIG. 37. Thus, the sensor unit 100'''''' of FIG. 37 may be driven in one of the touch sensing mode, the antenna driving mode, and the stylus sensing mode through various methods by the control unit 300.

Figure 38:
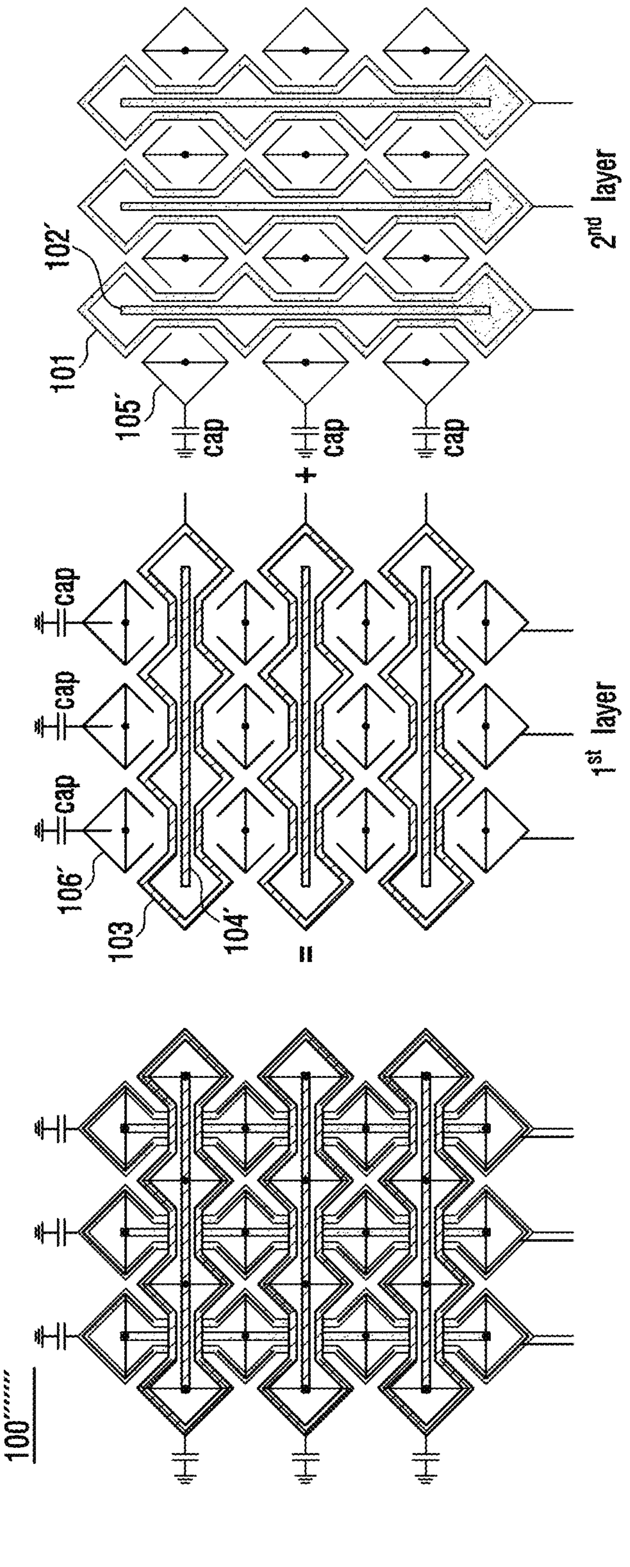
FIG. 38 is a modified example of the sensor unit according to the above-described various embodiments.

FIG. 38 is a view illustrating another modified example of the sensor unit.

When compared with the sensor unit 100A in FIG. 24, a sensor unit 100''''''' in FIG. 38 is different in a second pattern 102' and a fourth pattern 104' and further includes a plurality of fifth patterns 105', a plurality of sixth patterns 106', and a capacitor cap electrically connected to the fifth patterns 105' and the sixth patterns 106'. Since the rest components are the same as each other, different portions will be described in detail below.

The second pattern 102' may be a bar pattern disposed in the first pattern 101 and extending in the second direction. Here, the second pattern 102' may have a constant width. The second pattern 102' is disposed on the same layer (2nd layer) as the first pattern 101.

The fourth pattern 104' may be a bar pattern disposed in the third pattern 103 and extending in the first direction. Here, the fourth pattern 104' may have a constant width. The fourth pattern 104' is disposed on the same layer (1st layer) as the third pattern 103.

The plurality of fifth patterns 105' are disposed on the same layer (2nd layer) as the plurality of first patterns 101 and arranged in the first direction and the second direction. The plurality of fifth patterns 105' may be arranged between the plurality of first patterns 101.

Each of the fifth patterns 105' has a shape corresponding to and overlapping a main pattern part of the third pattern 103 disposed on a different layer (1st layer). Also, the fifth pattern 105' is electrically connected through the via and the fourth pattern 104' disposed on another layer (1st layer).

The fifth patterns 105' electrically connected to one fourth pattern 104' among the plurality of fifth patterns 105' are arranged in the second direction. Here, a predetermined capacitor cap is connected to the fifth pattern 105' disposed at the other edge among the fifth patterns 105' arranged in the second direction. Also, the capacitor cap may be grounded. Here, the fifth pattern 105' disposed at the other edge among the fifth patterns 105' arranged in the second direction represents a pattern electrically connected to and spaced farthest from the control unit 300 in FIG. 24 Although not shown in the drawing, the capacitor cap may be connected between the fifth pattern 105' and ELVSS of a display panel (not shown). Also, the capacitor cap may have one end connected to the fifth pattern 105' and the other end connected to another layer (1st layer) on which the third pattern 103, the fourth pattern 104', and sixth pattern 106' are disposed.

The plurality of fifth patterns 105' may form the mutual capacitance Cm in the vertical direction with the plurality of third patterns 103. Also, since the fifth pattern 105' is electrically connected to the fourth pattern 104' in the third pattern 103, the third pattern 103 may form the mutual capacitance Cm with the fifth pattern 105' in addition to the fourth pattern 104'.

The plurality of sixth patterns 106' are disposed on the same layer (1st layer) as the plurality of third patterns 103 and arranged in the first direction and the second direction. The plurality of sixth patterns 106' may be arranged between the plurality of third patterns 103.

Each of the sixth patterns 106 has a shape corresponding to and overlapping the main pattern part of the first pattern 101 disposed on another layer (2nd layer). Also, the sixth pattern 106' is electrically connected through the via and the second pattern 102' disposed on another layer (2nd layer).

The sixth patterns 106' electrically connected to one second pattern 102' among the plurality of sixth patterns 106' are arranged in the first direction. Here, a predetermined capacitor cap is connected to the sixth pattern 106' disposed at the other edge among the sixth patterns 106' arranged in the first direction. Also, the capacitor cap may be grounded. Here, the sixth pattern 106' disposed at the other edge among the sixth patterns 106' arranged in the first direction represents a pattern electrically connected to and spaced farthest from the control unit 300 in FIG. 24 Although not shown in the drawing, the capacitor cap may be connected between the sixth pattern 106' and the ELVSS of the display panel (not shown). Also, the capacitor cap may have one end connected to the sixth pattern 106' and the other end connected to another layer (2nd layer) on which the third pattern 101, the second pattern 102', and the fifth pattern 105' are disposed.

The plurality of sixth patterns 106' may form the mutual capacitance Cm in the vertical direction with the plurality of first patterns 101. Also, since the sixth pattern 106' is electrically connected to the second pattern 102' in the first pattern 101, the first pattern 101 may form the mutual capacitance Cm with the sixth pattern 106' in addition to the second pattern 102'.

As described above, the sensor unit 100""" in FIG. 38 may form the mutual capacitance in the vertical direction as well as the horizontal direction of the first pattern 101 and the mutual capacitance in the vertical direction as well as the horizontal direction of the third pattern 103. Thus, in the stylus sensing mode, the voltage value outputted from the sensing circuit unit of the control unit 300 may increase to improve the stylus sensing sensitivity.

Since each of the second pattern 102' and the fourth pattern 104' does not have a diamond-shaped main pattern part unlike the second pattern 102 and the fourth pattern 104 of the sensor unit 100A of FIG. 24, when the display panel is disposed below the sensor unit 100""", visibility may be further improved in comparison with the sensor unit 100A of FIG. 24.

The sensor unit 100""" in FIG. 38 may be also driven in the touch sensing mode, the antenna driving mode, and the stylus sensing mode by the control unit 300 as with the sensor unit 100A in FIG. 24. Also, the various combinations of the <table 1> may be applied to the sensor unit 100""" of FIG. 38. Thus, the sensor unit 100""" of FIG. 38 may be driven in one of the touch sensing mode, the antenna driving mode, and the stylus sensing mode through various methods by the control unit 300.

Although not shown in the drawing, the capacitor cap may be electrically connected to the other ends of the plurality of second and fourth patterns 102 and 104 without the fifth and sixth patterns 105' and 106'. Furthermore, in the above-described sensor units according to various embodiments, the other ends of the plurality of second and fourth patterns may be connected to the capacitor instead of being connected to each other.

Figure 39:
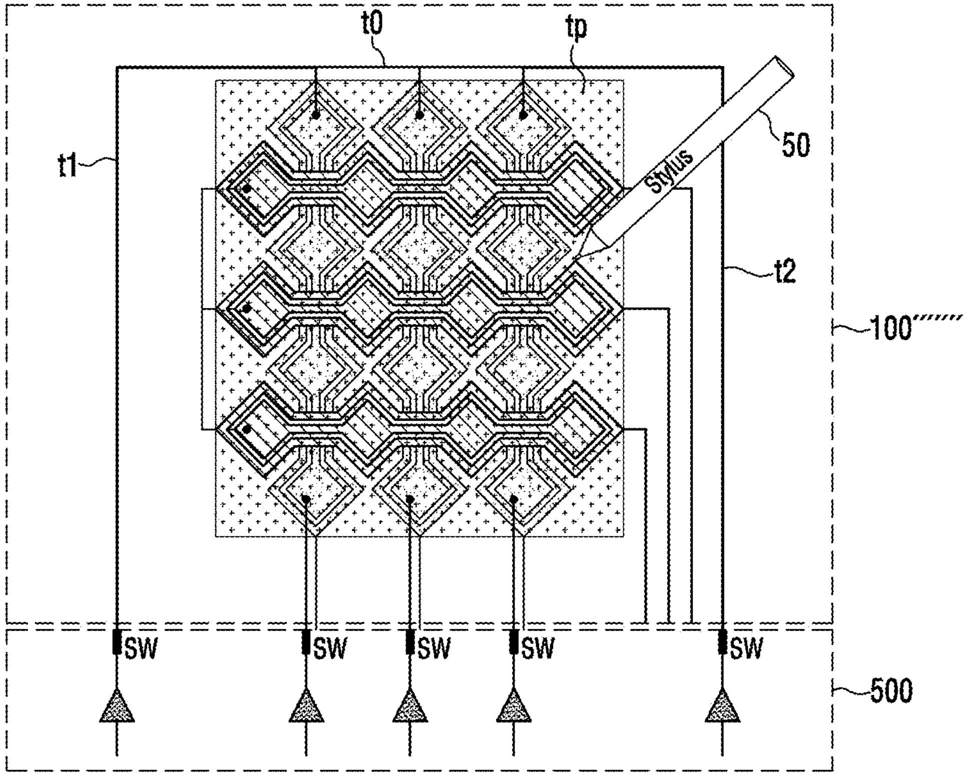
FIG. 39 is a modified example of the sensor unit according to the above-described various embodiments.

FIG. 39 is a view illustrating another modified example of the sensor unit.

In case of the sensor unit 100A of FIG. 24, when the stylus pen 1 is disposed on a right edge (or left edge) of the sensor unit 100A, the stylus pen 1 may not provide a sufficient magnetic field, and an amplitude of a signal emitted from the stylus pen 1 is not large enough. In order to solve the above-described problem, a sensor unit 100""" in FIG. 39 further includes a first trace t1 and a second trace t2 in comparison with the sensor unit 100A in FIG. 24.

The first trace t1 and the second trace t2 are directly connected to a conductive trace t0 electrically connecting the other end of the plurality of second patterns 102 to each other and disposed on a non-active area outside an active area tp (or touch area) of the touch input device. Here, at least a portion of the conductive trace t0 may be disposed outside the active area tp. The active area tp represents an area that is directly touched by an object, e.g., a finger or the stylus pen 10, and the non-active area is disposed around the active area tp. The non-active area may be, e.g., a bezel area.

Specifically, the first trace t1 may be disposed on the non-active area outside the active area tp, and have one end directly connected to the conductive trace to and the other end connected to the driving circuit unit of the control unit 300 through a switch sw in one of the touch driving mode, the touch sensing mode, the antenna driving mode, and the stylus sensing mode.

The second trace t2 may be disposed on the non-active area outside the active area tp and have one end directly connected to the conductive trace to and the other end connected to the driving circuit unit of the control unit 300 through a switch sw in the antenna driving mode.

The first trace t1 may be disposed on the non-active area while surrounding one side of both left and right sides of the active area tp, and the second trace t2 may be disposed on the non-active area while surrounding the other side of the active area tp.

Although the stylus pen 1 is disposed at one edge of the active area tp when the first trace t1, the second trace t2, and the sensor unit 100" are driven in the antenna driving mode as with FIG. 25, the stylus pen may provide a sufficient magnetic field signal. Thus, in the touch input device including the sensor unit 100" in FIG. 39, the stylus pen 1 may receive a sufficient magnetic field signal and emit a sufficient signal although the stylus pen 1 is disposed on any portion of the active area tp.

Each of the first and second traces t1 and t2 of the sensor unit 100" in FIG. 39 may correspond to one channel in FIG. 25, and the driving method such as that in FIG. 25 may be directly used.

The sensor unit 100" in FIG. 39 may be also driven in the touch sensing mode, the antenna driving mode, and the stylus sensing mode by the control unit 300 as with the sensor unit 100A in FIG. 24. Also, the various combinations of the <table 1> may be applied to the sensor unit 100" of FIG. 39. Thus, the sensor unit 100" of FIG. 39 may be driven in one of the touch sensing mode, the antenna driving mode, and the stylus sensing mode through various methods by the control unit 300.

Figure 40:
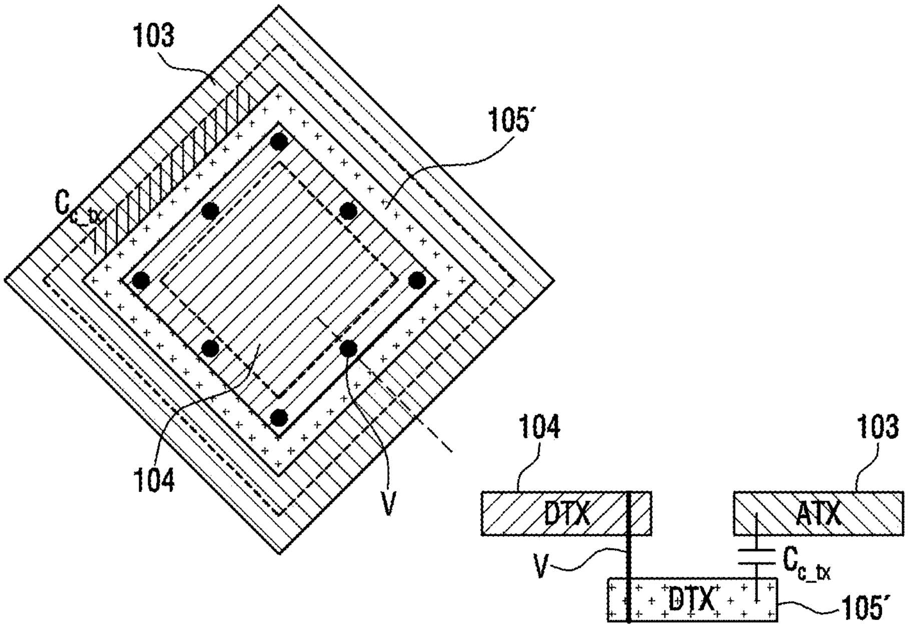

FIG. 40 is a view for explaining a first modified example of the fifth pattern 105 in FIG. 33.

Referring to FIG. 40, a fifth pattern 105' is disposed on a layer different from a layer on which the third pattern 103 and the fourth pattern 104 are disposed.

The fifth pattern 105' may have a shape corresponding to the third pattern 103. For example, the fifth pattern 105' may have a diamond shape and a diamond-shaped opening therein.

The fifth pattern 105' may have one portion overlapping the third pattern 103 in the vertical direction and the other portion overlapping the fourth pattern 104 in the vertical direction. For example, an outer edge of the fifth pattern 105' may overlap an inner edge of the third pattern 103 disposed on another layer. Also, an inner edge of the fifth pattern 105' may overlap an outer edge of the fourth pattern 104 disposed on another layer.

The fifth pattern 105' is electrically connected to the fourth pattern 104 disposed on another layer through a conductive via v. Here, the via v may be provided in plurality, and a plurality of vias v may be arranged on outer edge of the fourth pattern 104.

The plurality of fifth patterns 105' may form the mutual capacitance Cm in the vertical direction with the third patterns 103 disposed on another layer. Also, since the fifth pattern 105' is electrically connected to the fourth pattern 104 in the third pattern 103 through the via v, the third pattern 103 may form a mutual capacitance Cc_tx with the fifth pattern 105' in addition to the fourth pattern 104.

Although not shown in the drawing, the sixth pattern 106 in FIG. 33 may have the same shape as the fifth pattern 105' in FIG. 40. Here, a sixth pattern (not shown) may have an outer edge overlapping an inner edge of the first pattern 101 disposed on another layer and an inner edge overlapping an outer edge of the second pattern 102 disposed on another layer. Also, the sixth pattern (not shown) may be electrically connected to the second pattern 102 disposed on another layer through the conductive via. Likewise, the sixth pattern (not shown) may form the mutual capacitance in the vertical direction with the first pattern 101. Since the sixth pattern (not shown) is electrically connected to the second pattern 102 in the first pattern 101, the first pattern 101 may form the mutual capacitance Cc_tx with the sixth pattern (not shown) in addition to the second pattern 102.

As described above, the sensor unit including the modified example of the fifth pattern 105' in FIG. 40 may form the mutual capacitance in the vertical direction as well as the horizontal direction of the third pattern 103, and the sensor unit including the modified example of the sixth pattern (not shown) may also form the mutual capacitance in the vertical direction as well as the horizontal direction of the first pattern 101. Thus, in the stylus sensing mode, the voltage value outputted from the sensing circuit unit of the control unit may increase to improve the stylus sensing sensitivity.

Figure 41:
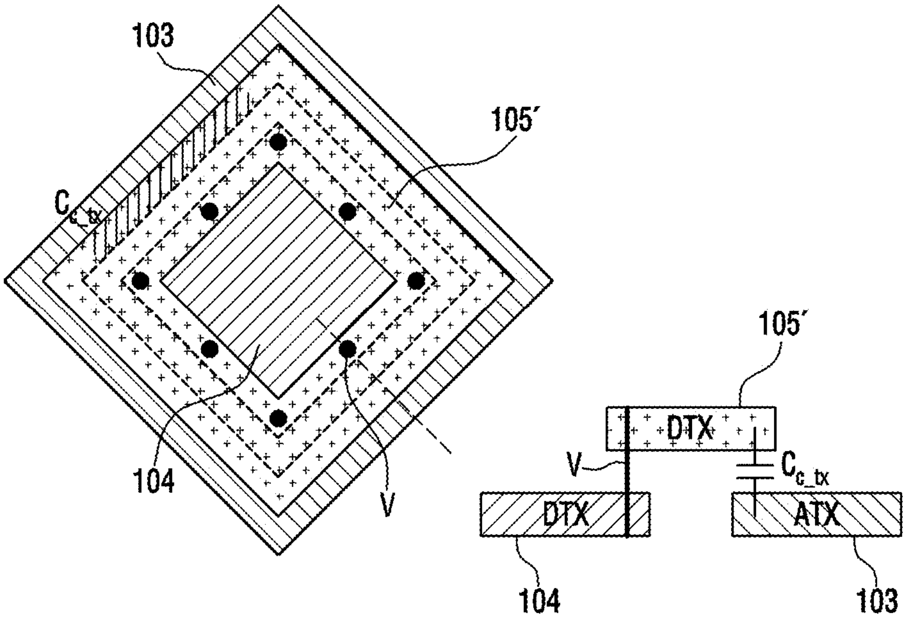
FIG. 41 is a view illustrating a modified example of FIG. 40.

FIG. 41 is a view illustrating a modified example of FIG. 40; and

FIG. 40 is a view illustrating a state in which the fifth pattern 105' is disposed below the third and fourth patterns 103 and 104, and on the contrary, FIG. 41 is a view illustrating a state in which the fifth pattern 105' is disposed on the third and fourth patterns 103 and 104.

A structure of the fifth pattern 105" in FIGS. 40 and 41 may be applied to the above-described sensor units according to various embodiments.

Figure 42:
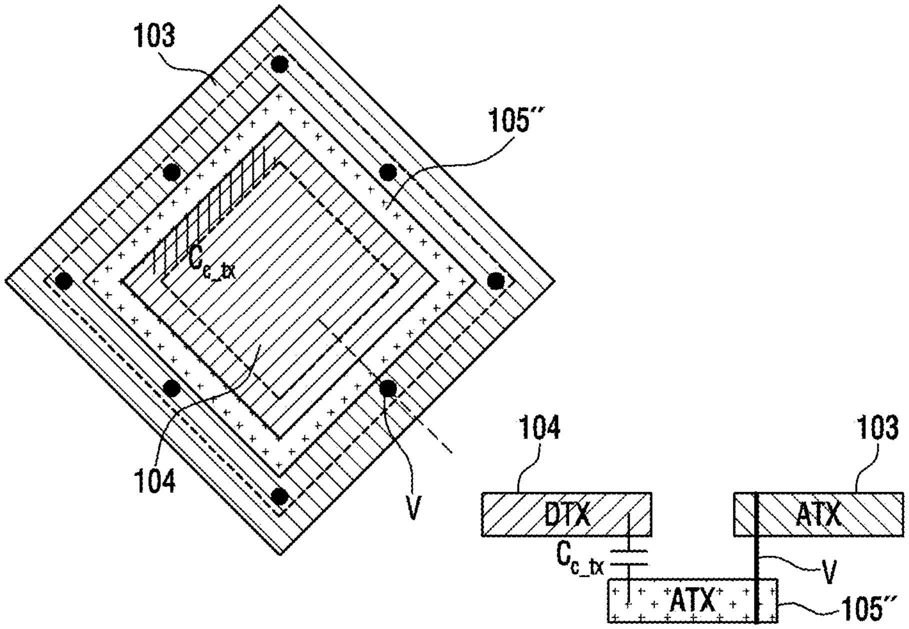
FIG. 42 is a view for explaining a modified example of a fifth pattern 105' in FIG. 40.

FIG. 42 is a view for explaining a modified example of the fifth pattern 105' in FIG. 40.

Referring to FIG. 42, a fifth pattern 105" has the same shape and position as the fifth pattern 105' in FIG. 40. The fifth pattern 105" is different from the fifth pattern 105' in FIG. 40 in that the fifth pattern 105" is electrically connected to the third pattern 103 disposed on another layer through the conductive via v. Also, the via v is disposed on an inner edge of the third pattern 103.

Since the fifth pattern 105" is electrically connected to the third pattern 103 disposed on another layer, the fourth pattern 104 may form a mutual capacitance Cc_Tx in the vertical direction with the fifth pattern 105".

Also, the sensor unit including the modified example of the fifth pattern 105" in FIG. 42 may form the mutual capacitance in the vertical direction as well as the horizontal direction.

Figure 43:
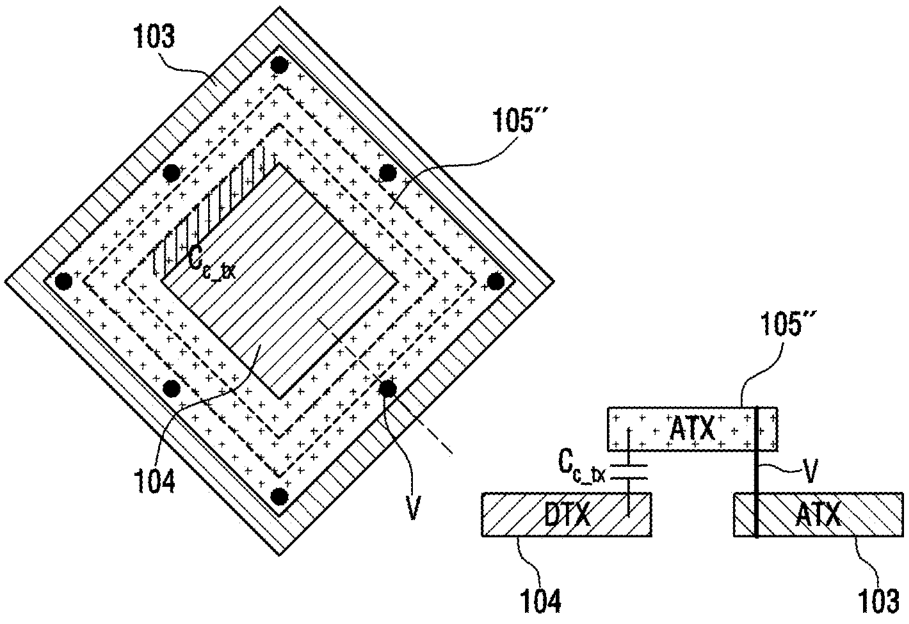
FIG. 43 is a view illustrating a modified example of FIG. 42.

FIG. 43 is a view illustrating a modified example of FIG. 42.

FIG. 42 is a view illustrating a state in which the fifth pattern 105" is disposed below the third and fourth patterns 103 and 104, and on the contrary, FIG. 43 is a view illustrating a state in which the fifth pattern 105" is disposed on the third and fourth patterns 103 and 104.

A structure of the fifth pattern 105" in FIGS. 42 and 43 may be applied to the above-described sensor units according to various embodiments.

Figure 44:
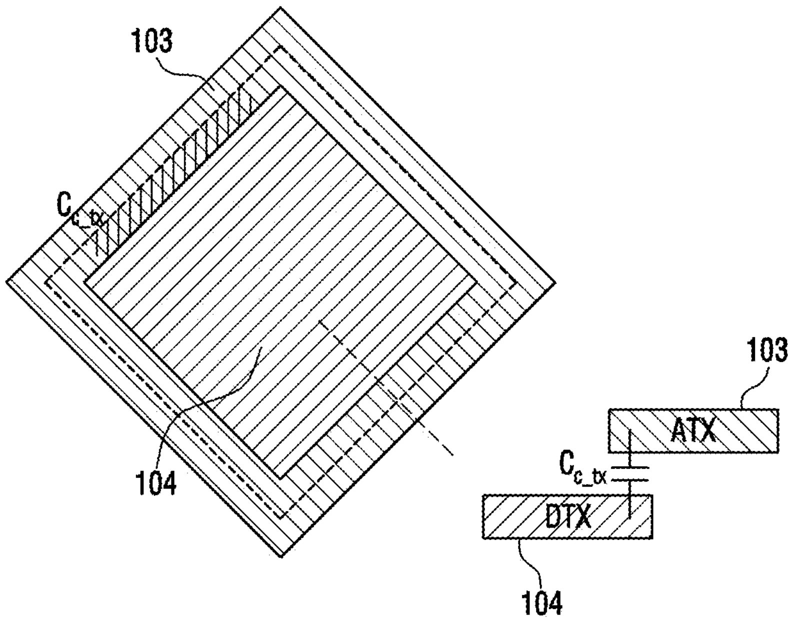
FIGS. 44 and 45 are views for explaining modified examples of a third pattern 103 and a fourth pattern 104 in the sensor unit in FIG. 34 or 35.
Figure 45:
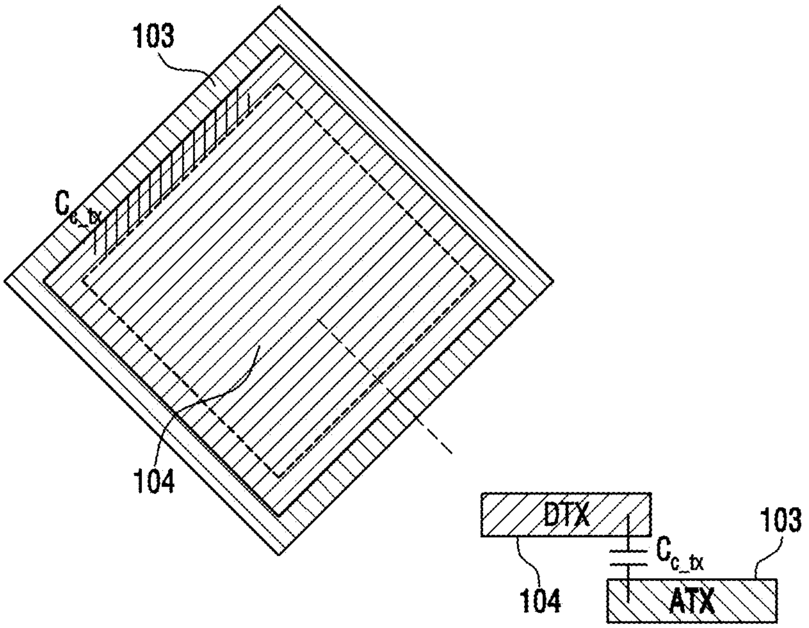

FIGS. 44 and 45 are views for explaining modified examples of a third pattern 103 and a fourth pattern 104 in the sensor unit in FIG. 34 or 35.

Referring to FIGS. 44 and 45, the third pattern 103 and the fourth pattern 104 according to a modified example are disposed on different layers, and a portion of the third pattern 103 and a portion of the fourth pattern 104 overlap each other in the vertical direction. For example, an inner edge of the third pattern 103 may overlap an outer edge of the fourth pattern 104 in the vertical direction. FIG. 44 is a view illustrating a state in which the third pattern 103 is disposed on the fourth pattern 104, and FIG. 45 is a view illustrating a state in which the third pattern 103 is disposed below the fourth pattern 104.

A sensor unit including the third and fourth patterns 103 and 104 in FIGS. 44 and 45 may form the mutual capacitance Cc_Tx in the vertical direction instead of the horizontal direction. Although not shown in the drawing, the first and second patterns 101 and 102 in FIGS. 34 and 35 may have the same structures as that in FIGS. 44 and 45

A structure according to the modified example in FIGS. 44 and 45 may be applied to the above-described various embodiments.

Although the embodiments of the present invention have been described, it is understood that the present invention should not be limited to these embodiments but various changes and modifications can be made by one ordinary skilled in the art within the spirit and scope of the present invention as hereinafter claimed.

The invention claimed is:

1. A touch input device that drives a stylus pen comprising a resonance circuit unit and senses a pen signal from the stylus pen, the touch input device comprising:

a cover layer;

a display unit disposed below the cover layer;

a single sensor unit disposed between the cover layer and the display unit, and comprising a pattern for sensing touch and at least one pattern for driving the stylus pen and sensing the pen signal;

a shielding unit disposed below the display unit, wherein the shielding unit comprises a magnetic field shielding sheet disposed below the display unit and a conductive layer disposed below the magnetic field shielding sheet, and wherein the shielding unit has a permeability and a thickness, which allow a change rate of an inductance value of the resonant circuit unit to be −10% to +10% of a reference inductance value, and wherein an amount of increase in inductance value of the resonant circuit unit caused by the magnetic shielding sheet and an amount of decrease in inductance value of the resonant circuit unit caused by the conductive layer are equal to each other, or a sum of the amount of increase and the amount of decrease is −10% to +10% of the reference inductance value.

2. The touch input device of claim 1, wherein the shielding unit has a permeability of 10 or more to 300 or less.

3. The touch input device of claim 1, wherein the shielding unit has a thickness of 10 μm or more to 300 μm or less.

4. The touch input device of claim 1, wherein the inductance value of the resonance circuit unit when the stylus pen is moved upward to a predetermined height from a touch surface of the touch input device is −10% to +10% of an inductance value of the resonance circuit unit when the stylus pen is disposed on the touch surface.

5. The touch input device of claim 1, wherein an inductance value of the resonance circuit unit when the stylus pen is disposed perpendicular to a touch surface of the touch input device and then tilted at a predetermined angle is −10% to +10% of an inductance value when the stylus pen is disposed perpendicular to the touch surface.

6. The touch input device of claim 1, wherein the conductive layer comprises at least one slit.

7. The touch input device of claim 6, wherein the slit has a shape extending from one edge of the conductive layer in an inward direction of the conductive layer.

8. The touch input device of claim 6, wherein the slit has a shape of a dotted line in a horizontal or vertical direction of the conductive layer.

* * * * *